(12) United States Patent
Chase et al.

(10) Patent No.: US 6,446,444 B1
(45) Date of Patent: Sep. 10, 2002

(54) DIGITAL SIGNAL PROCESS CONTROL OF STIRLING CYCLE CRYOGENIC COOLER DRIVE AND HIGH TEMPERATURE SUPERCONDUCTING FILTER TEMPERATURE CONTROL LOOP

(75) Inventors: David R. Chase, Santa Barbara; David S. Cooper, Orcutt; Jon D. Burnsed, Goleta; Anthony C. Jones, Santa Barbara, all of CA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 0 days.

(21) Appl. No.: 09/872,280

(22) Filed: May 31, 2001

(51) Int. Cl.$^7$ .................................................. F25B 9/00
(52) U.S. Cl. ................................. 62/6; 60/520; 62/908
(58) Field of Search ........................ 62/6, 908; 60/520

(56) References Cited

U.S. PATENT DOCUMENTS

| | | | |
|---|---|---|---|
| 4,417,448 A | * 11/1983 | Horn et al. .......................... | 62/6 |
| 4,543,793 A | * 10/1985 | Chellis et al. ....................... | 62/6 |
| 4,567,726 A | * 2/1986 | Vitale et al. ........................ | 62/6 |
| 4,902,952 A | * 2/1990 | Lavery ............................... | 62/6 |
| 5,018,357 A | * 5/1991 | Livingstone et al. .............. | 62/6 |
| 5,535,593 A | * 7/1996 | Wu et al. ........................... | 62/6 |
| 5,813,235 A | * 9/1998 | Peterson ............................ | 62/6 |
| 6,098,409 A | 8/2000 | Chase | |

* cited by examiner

Primary Examiner—Ronald Capossela
(74) Attorney, Agent, or Firm—Lyon & Lyon LLP

(57) ABSTRACT

Systems and methods for regulating, for example, the temperature of high temperature superconducting (HTSC) thin film filters used in connection with a Stirling cycle cryocooler. The system employs a digital signal processor-based control system. The system includes a cryocooler drive control loop for controlling the cryocooler drive in response to a measured cryocooler driving current and a cryocooler driving current set point. The system also includes a temperature control loop for generating the cryocooler driving current set point in response to either a cooldown profile algorithm or a comparison between a measured temperature and a set point temperature stored in DSP memory.

13 Claims, 7 Drawing Sheets

DIGITAL SIGNAL PROCESS CONTROL OF STIRLING CYCLE CRYOGENIC COOLER DRIVE AND HIGH TEMPERATURE SUPERCONDUCTING FILTER TEMPERATURE CONTROL LOOP

This application is related to U.S. patent application Ser. No. 09/204,897, now issued as U.S. Pat. No. 6,098,409. This patent is incorporated by reference as if set forth fully herein.

A portion of the disclosure of this patent document contains material which is subject to copyright protection. The copyright owner has no objection to the facsimile reproduction by any one of the patent disclosure, as it appears in the Patent and Trademark patent files or records, but otherwise reserves all copyright rights whatsoever.

BACKGROUND OF THE INVENTION

The field of the present invention is control systems and, more particularly, systems and methods for effecting control of a Stirling cycle cryocooler as well as the control of high temperature superconducting thin film filter subsystems.

Recently, substantial attention has been devoted to the development of high temperature superconducting radio frequency (RF) filters for use in, for example, mobile telecommunications systems. However, such filters are extremely temperature sensitive. By their very nature, high temperature superconducting (HTSC) materials are temperature dependent. At temperatures above their "transition temperatures," the materials behave like an insulator, and at temperatures below the transition temperature, the materials become superconducting.

Further, when a HTSC film is fabricated into a RF filter, temperature fluctuations stemming from kinetic inductance of the filter may have a substantial effect upon the operation of the filter and, in particular, upon the center-frequency of the filter. Similarly, fluctuations in temperature may have a substantial impact upon certain non-linear behavior characteristics of HTSC thin film filters. While the non-linear behavior characteristics of a HTSC thin film filter may have a relatively mild effect upon filter operation at temperatures below the transition temperature, the same cannot be said for the kinetic inductance effect. Further, as the temperature of operation of a HTSC thin film filter approaches, for example, the transition temperature of the filter, relatively minor fluctuations in the operating temperature can have very significant effects upon filter operation. Stated somewhat differently, as HTSC thin film filter systems are operated closer and closer to their respective transition temperatures, more and more care must be taken to control the temperature of the operating environment. Thus, it will be appreciated that HTSC thin film filter systems must be maintained at stable operating temperatures if proper operation of the systems is to be maintained. This is particularly so where HTSC filters are to be operated at or near their respective transition temperatures.

Those skilled in the art also will appreciate that increased temperature stability generally is required when more "narrow-band" filters are utilized within a HTSC filter system. The reason for this is that relatively small changes in operating temperatures (e.g., +/−1° K) may have a substantial impact upon the range of filter operation, particularly if a filter is operated at or near its transition temperature. Indeed, such changes in operating temperature may cause the center frequency of a HTSC filter to vary by as much as 100 kHz.

Now, because maximum advantage may be obtained through the use of HTSC thin film filters when the filters are operated in a narrow-band mode at approximately the transition temperature, those skilled in the art will appreciate that it is highly desirable, if not essential, to maintain very precise control of the operating temperatures of HTSC thin film filter systems.

Those skilled in the art also will appreciate that, when multiple HTSC filters are disposed, for example, within the dewar of a cryocooler, and the cryocooler is mounted, for example, on a telecommunications tower, substantial temperature control issues may arise. Simply put, a tower-mounted cryocooler will need to provide more lift (i.e., more "cold") on a hot afternoon than would be required on a cold night. Further, as the ambient temperature of the environment within which a HTSC filter system is mounted varies, temperature gradients will result between the system cold source (i.e., the cold finger of the system cryocooler) and the cold stage or location where the HTSC filters are located. In addition, with respect to tower mount applications, there is a conflict between the need to have the fastest possible cooldowns to the point of maximum allowable temperature on the heat reject of the cryocooler while at the same time, not overdriving the cryocooler.

U.S. Pat. No. 6,098,409 ("the '409 patent"), which is incorporated by reference herein, discloses a multi-stage temperature controller that includes first and second control loops. The first loop is used to regulate the cold finger temperature of, for example, a Stirling cycle cryocooler. The second loop is used to set a reference for the first loop based upon a comparison between a reference signal and a signal received from a cold stage temperature filter. Analog circuitry, for example, as shown in FIGS. 2–6C in the '409 patent is employed to control the cryocooler temperature of the HTSC thin film filters.

Analog-based control systems for controlling the cryocooler drive and temperature of the HTSC filters, while useful, have several drawbacks. First, the analog technologies employed increases the overall cost of the device. Since the analog-based circuitry requires a large number of parts, reliability of the device is reduced to a certain extent since there are more parts which could potentially fail. Along these same lines, the increased parts count contributes to additional weight for the product. In addition, the analog-based design makes it difficult to change control parameters and algorithms for new products, or, alternatively, makes it difficult to improve upon the performance characteristics of existing products. Finally, analog circuitry changes its characteristics with respect to time (i.e., the age of the device) and temperature whereas digital-based control systems are more stable.

A need exists for a digital-based control system for control of the cryocooler drive and the temperature of the HTSC filters. The system preferably has a reduced parts count which advantageously reduces the overall weight and cost of the system. Similarly, overall reliability of the device is improved through the implementation of a digital-based control system. The DSP-based control system advantageously has a tighter temperature control algorithm that allows for the construction of sharper HTSC filters (i.e., filters which differentiate one frequency from another, where adjacent frequencies are progressively more close to one another), and reduces the need for filter margin in the filter specification, which allows for even higher performance systems.

SUMMARY OF THE INVENTION

In a first aspect of the invention, a temperature and drive controller includes a cryocooler drive loop for controlling the cryocooler drive in response to a measured cryocooler driving current and a cryocooler driving current set point. A temperature control loop is provided and generates the cryocooler driving current set point in response to either a cooldown profile algorithm or a comparison between a measured temperature and a set point temperature stored in DSP memory. The temperature and drive control loops are implemented using a digital signal processor.

In a second separate aspect of the invention, a HTSC thin film filter system for use with a Stirling cycle cryocooler having a temperature and drive controller includes a Stirling cycle cryocooler having a cold finger, a heat-sink including a plurality HTSC thin film filter substrates mounted thereon in micro-enclosures, the cold finger of the Stirling cycle cryocooler mating with the heat-sink, at least one micro-enclosure temperature sensor, and a temperature and drive controller according to a first aspect of the invention.

In a third separate aspect of the invention, a method of controlling the temperature of a cryocooler cold finger that is used to regulate the temperature of a HTSC filter system cold stage includes the steps of measuring the temperature of at least one temperature sensor, inputting a signal corresponding to the measured temperature of the at least one temperature sensor to a temperature controller, comparing the signal corresponding to the temperature of the at least one temperature sensor to a signal corresponding to a set point temperature, and outputting a digital value corresponding to a set point cryocooler driving current to a cryocooler drive controller based on the comparison. Next, the cryocooler driving current is measured, and a signal corresponding to the cryocooler driving current is input to the cryocooler drive controller. The signal corresponding to the cryocooler driving current is compared with the digital value corresponding to the set point cryocooler driving current and a cryocooler driving current is output to a cryocooler based on the comparison between the cryocooler driving current with the digital value corresponding to the set point cryocooler driving current.

In a fourth separate aspect of the invention, the cryocooler drive loop of the first aspect is used with a temperature control loop that generates the cryocooler driving current set point in response to a cooldown profile algorithm stored in DSP memory.

In a fifth separate aspect of the invention, the cryocooler drive loop of the first aspect is used with a temperature control loop that generates the cryocooler driving current set point in response to a comparison between a measured temperature and a set point temperature.

Accordingly, it is an object of the present invention to provide an improved method and apparatus for controlling the drive and temperature of a cryocooler for use with HTSC filters. The apparatus has fewer components since the control is implemented using a digital signal processor-based control system. The apparatus preferably has tighter temperature control than previous analog-based designs. In addition, the apparatus can be updated with new parameters, software, and control algorithms to improve its performance characteristics. Other objects and features of the present invention will become apparent from consideration of the following description taken in conjunction with the accompanying drawings.

DETAILED DESCRIPTION OF PREFERRED EMBODIMENTS

Figure 1:
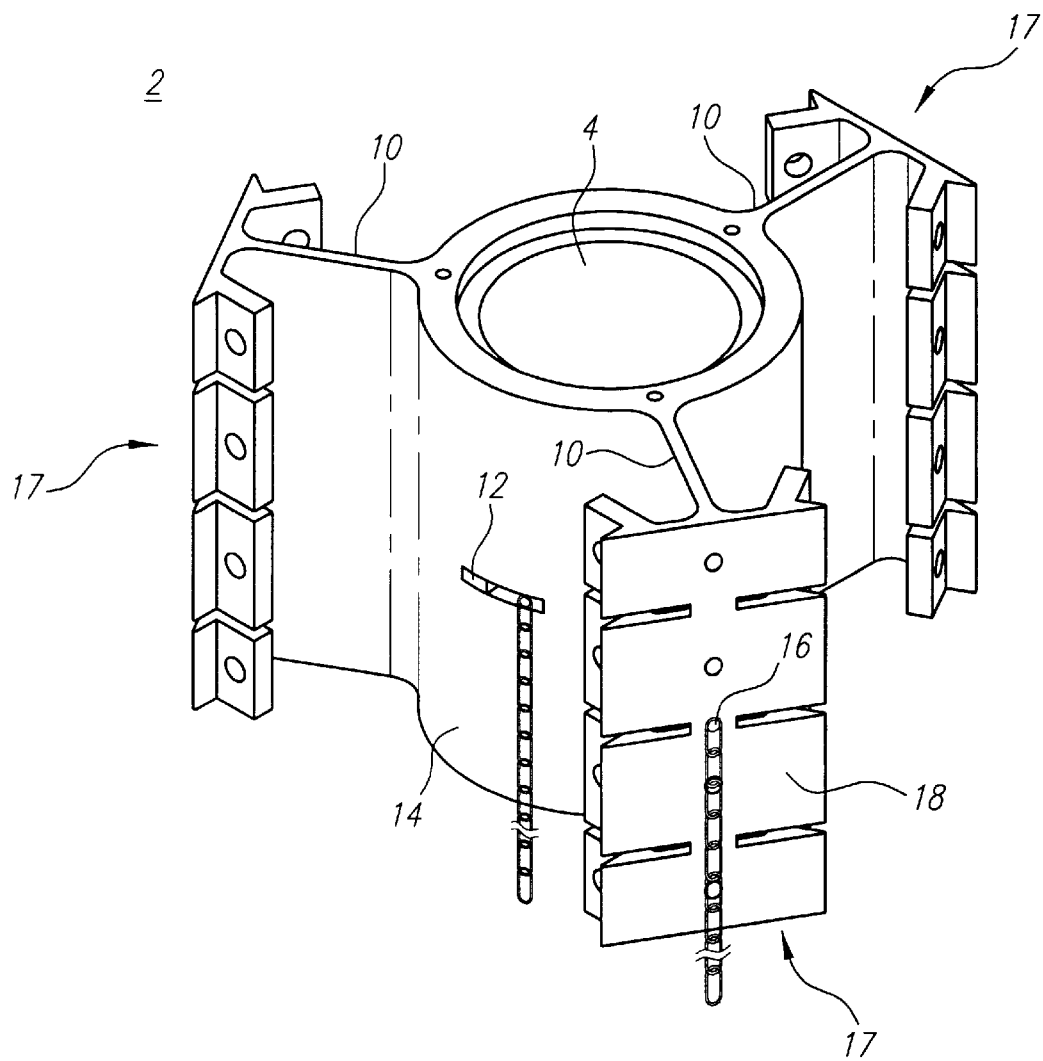
FIG. 1 is a perspective view of a heat-sink for use with a cryocooler in a drive and temperature control system in accordance with the present invention.
Figure 2:
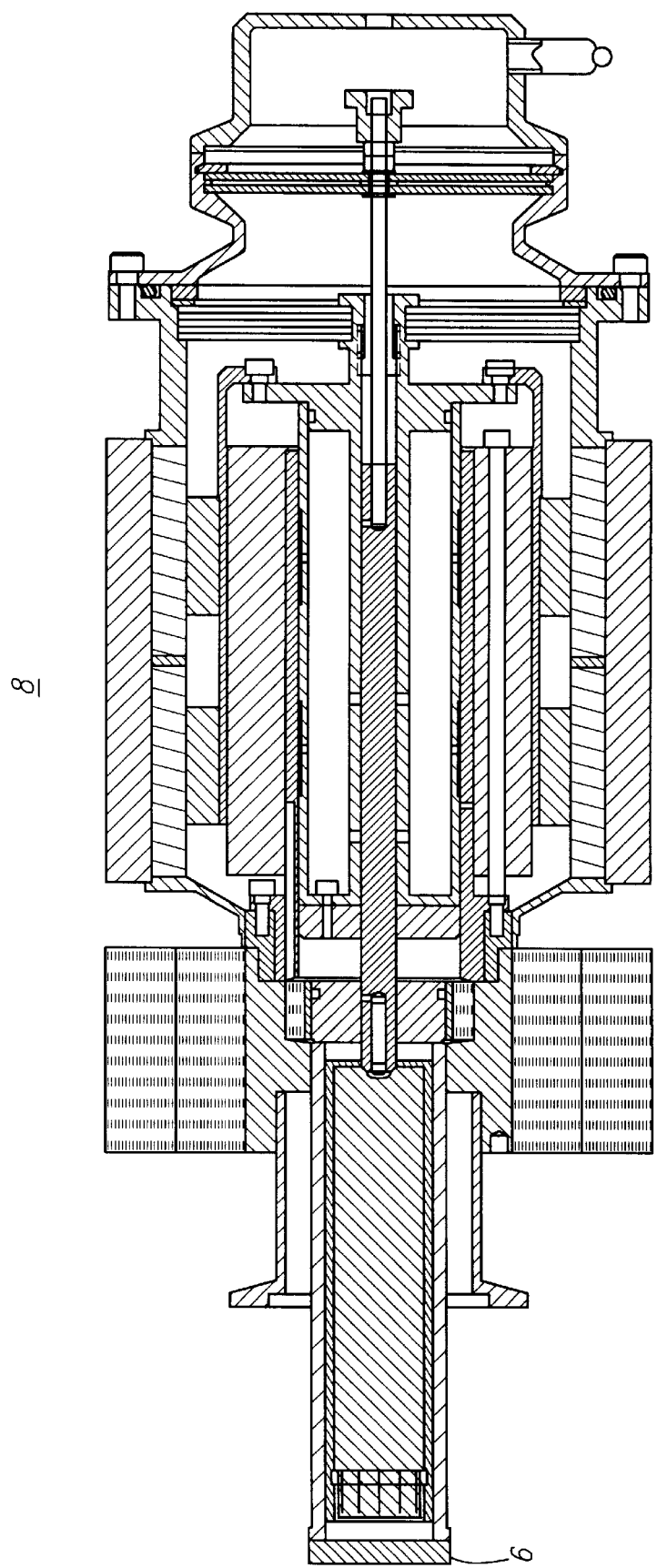
FIG. 2 is a side view illustrating a cryocooler including a cold finger.

Turning now to the drawings, FIG. 1 provides an illustration of one type of heat-sink 2 that may support a plurality of HTSC thin film filter substrates (HTSC filters 3 as shown for example in FIGS. 3 and 4) in accordance with the present invention. In one preferred embodiment of the invention, the heat-sink 2 is generally symmetric in shape and has central cavity 4 for mating with a cold finger 6 of, for example, a Stirling cycle cryocooler 8 (shown in FIG. 2). In addition, the heat-sink 2 has a plurality of T-shaped radially extending extremities 10 that provide mounts for a corresponding number of HTSC filter assembly carrier packages (not shown). It will be noted that a cold finger temperature sensor 12 may be affixed to a main body portion 14 of the heat-sink 2, and that one or more cold stage temperature sensor(s) 16 may be affixed to a central portion of an external surface 18 of the T-shaped extremities 10 (i.e., cold stage 17).

Figure 3:
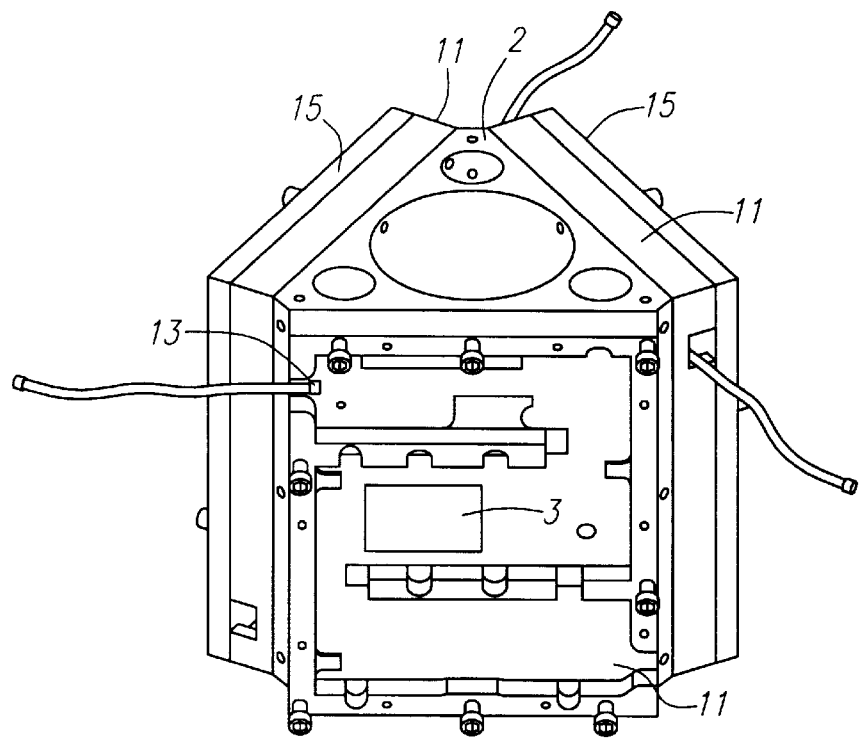
FIG. 3 is an isometric view of a heat-sink having micro-enclosures thereon for use with a cryocooler in a drive and temperature control system in accordance with the present invention.
Figure 4:
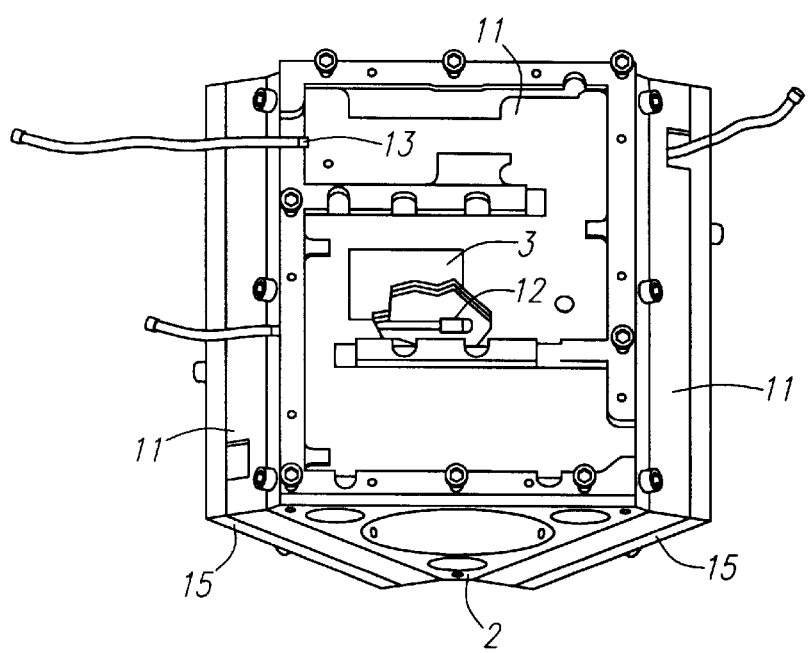
FIG. 4 is an isometric view of a heat-sink having micro-enclosures thereon wherein a portion of the micro-enclosure and HTSC filter are cut away to show a cold finger temperature sensor.

Alternatively, as shown for example in FIGS. 3 and 4, a temperature sensor 13 may be affixed near the HTSC filter 3 inside a micro-enclosure 11. FIGS. 3 and 4 show three separate micro-enclosures 11 on the external surfaces of the heat-sink 2. Two of the micro-enclosures 11 are shown with caps or tuning lids 15 mounted thereon. The facing micro-enclosure 11 in FIGS. 3 and 4, however, has the cap 15 removed. In FIG. 4, a cold finger temperature sensor 12 is shown in addition to the micro-enclosure temperature sensors 13. Thus, it will be appreciated that the cold finger temperature sensor 12 may be used to monitor with fairly close approximation a temperature of a cold finger 6 of an associated cryocooler 8, and the cold stage temperature sensor(s) 16 or the micro-enclosure temperature sensor 13 may be used to monitor with fairly close approximation the temperatures of any HTSC filters 3 that are mounted to the heat-sink 2. A cryocooler 8 of the type that might be used in accordance with the present invention is described in U.S. Pat. No. 6,141,971, which is entitled "Cryocooler Motor with Split Return Iron" and is hereby incorporated by reference as set forth fully herein.

Alternative heat-sink 2 geometries can also be employed other than the specific embodiment shown in FIG. 1. For example, FIGS. 3 and 4 illustrates a preferred heat-sink 2 that is used in conjunction with the present apparatus and method. In this embodiment, the heat-sink 2 has a generally triangular shape, with micro-enclosures 11 mounted on the three exterior surfaces. The invention however, is not limited to particular shape or construction of the heat-sink 2.

Figure 5A:
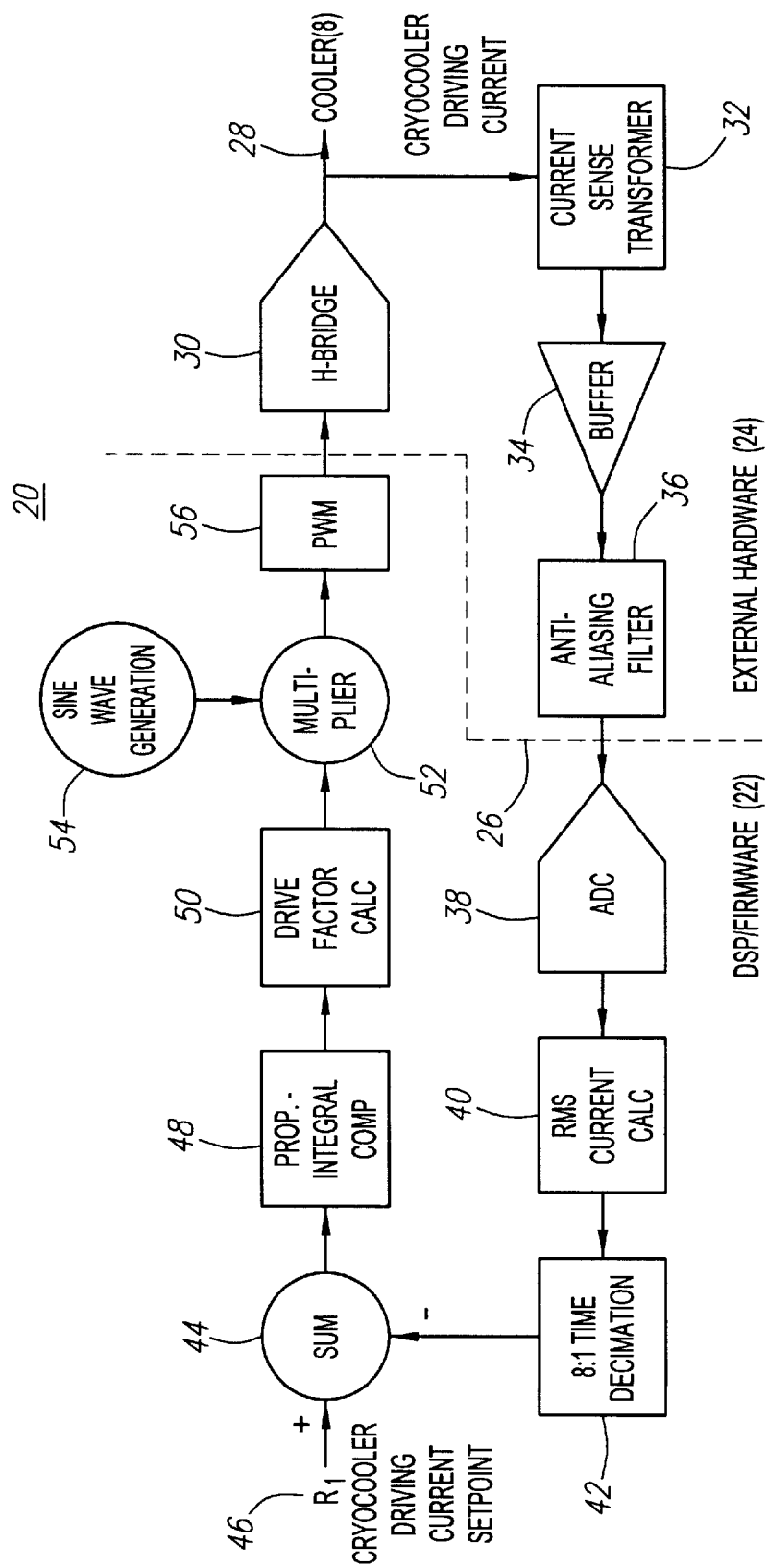
FIG. 5(a) is a block diagram illustrating the cryocooler drive digital signal processing (DSP) control system.
Figure 5B:
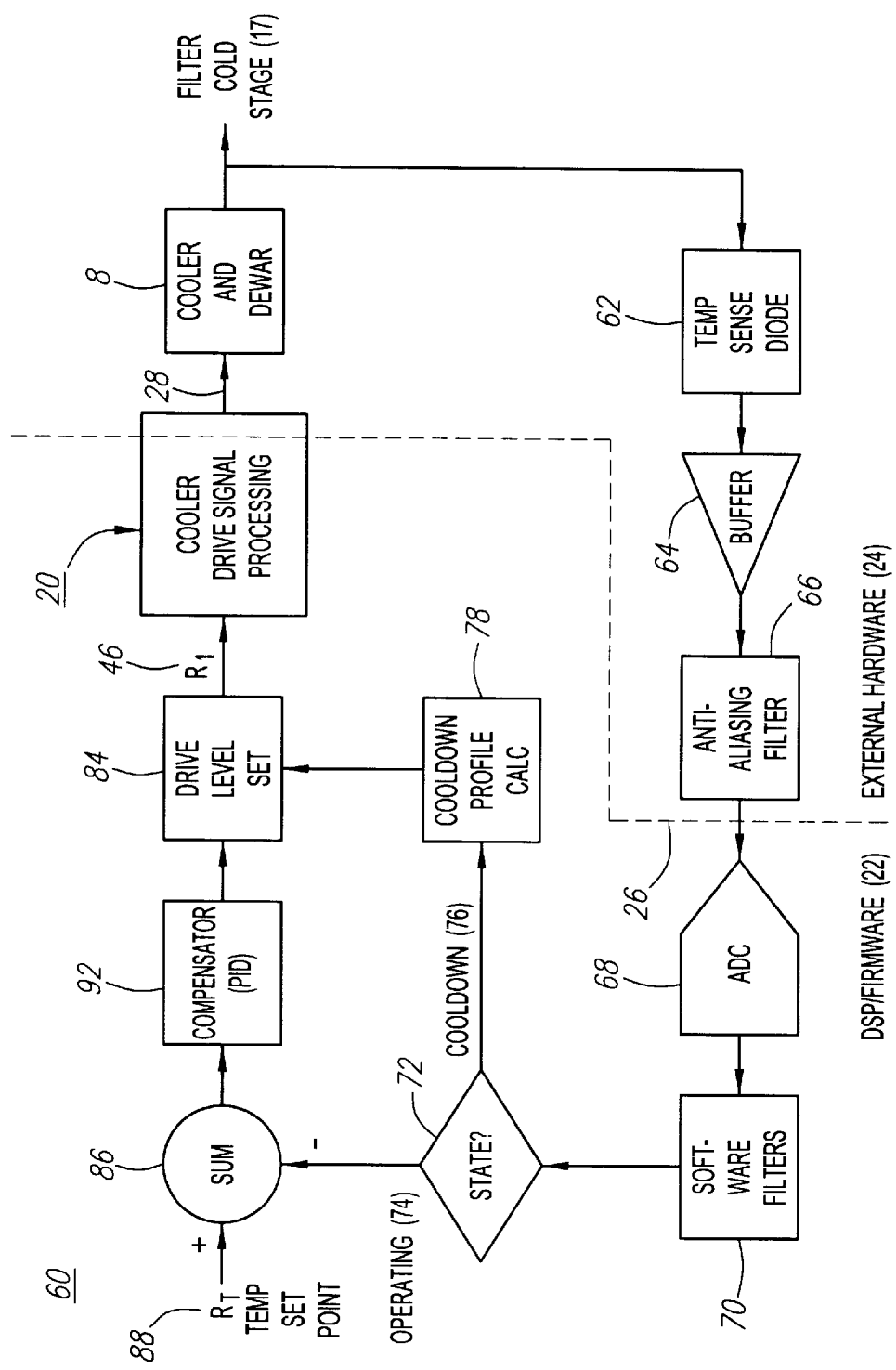
FIG. 5(b) is a block diagram illustrating the temperature control loop digital signal processing (DSP) control system.

FIG. 5(*a*) schematically illustrates the cryocooler drive digital signal processing (DSP) control system 20 (cryocooler drive controller). The DSP control system 20 includes a DSP/Firmware aspect 22 and an analog-based external hardware aspect 24. The separation between the DSP/Firmware aspect 22 and the external hardware aspect 24 is shown by dashed line 26 in FIG. 5(*a*). With respect to the external hardware aspect 24, a cryocooler driving current 28 that is produced by an H-bridge circuit 30 is passed through a current sense transformer 32. An analog signal corresponding to the cryocooler driving current 28 is amplified in a buffer 34. From the buffer 34, the signal passes through an anti-aliasing filter 36, such as, for example, a low pass filter to avoid aliasing. At this point, the analog signal is converted to a digital representation via the analog-to-digital (ADC) converter 38. After digitizing the signal, the root-mean-square (RMS) current 40 is calculated and undergoes 8:1 time decimation 42. The time-decimated signal is added via adder 44 to a cryocooler driving current set point 46. The added signal is then subject to proportional integral compensation 48 and a drive factor calculation 50 is made. A multiplier 52 that receives a software-constructed sine wave via a look-up table 54 and multiplies the output from the calculated drive factor 50 and input to the pulse-width-modulator (PWM) 56. The digital PWM output is input to the external hardware H-bridge circuit 30 which, in turn, outputs a cryocooler driving current 28 to drive the cryocooler 8.

FIG. 5(*b*) schematically illustrates the temperature control loop digital signal processing (DSP) control system 60 (temperature controller). The cryocooler drive digital signal processing (DSP) control system 20, which is integrated into the temperature control loop digital signal processing (DSP) control system 60 is also shown in FIG. 5(*b*). As with the cryocooler drive digital signal processing (DSP) control system 20, the temperature control loop digital signal processing (DSP) control system 60 includes a DSP/Firmware aspect 22 and an analog-based external hardware aspect 24. The separation between the DSP/Firmware aspect 22 and the external hardware aspect 24 is shown by dashed line 26 in FIG. 5(*b*). With regard to the external hardware aspect 24, the cryocooler 8 is schematically shown receiving a cryocooler driving current 28 from the cryocooler drive digital signal processing (DSP) control system 20. One or more temperature sensor diodes 62 measure the temperature at a particular location. The analog signal corresponding to the measured temperature is then amplified and level-shifted in a buffer 64.

In a preferred embodiment, the temperature sensor (i.e. the temperature sensor diode 62) detects the temperature directly on the HTSC filter 3 within a micro-enclosure 11. The temperature sensor diode 62, can, however, measure the temperature of the cryocooler 8 and/or HTSC filters 3 at other locations such as, for example, at the cold finger 6, the cold stage 17, inside the dewar of the cryocooler 8, and on the heat sink 2. It should be noted that a combination of one or more of these temperature sensor diodes 62 may be used to monitor the temperature of the cryocooler 8 and/or HTSC filters 3.

From the buffer 64, the signal passes through an anti-aliasing filter 66, such as, for example, a low pass filter to avoid aliasing. The analog signal is then converted to a digital representation via the analog-to-digital (ADC) converter 68. The digital signal is then subject to various software filtering 70 to remove residual noise. Examples include digital low pass filtering and median value filtering.

The temperature control loop digital signal processing (DSP) control system 60 then determines the state 72 of the cryocooler 8, i.e., whether the cryocooler is in the standard operation mode 74, or alternatively, in the cooldown mode 76. When the DSP control system 60 determines that the cryocooler is in the cooldown mode (i.e., the temperature needs to be rapidly reduced to just below the critical HTSC temperature), a cooldown profile 78 is calculated. Generally, the cooldown profile varies as a function of the heat-exchanger temperature 80, ambient temperature 90, and cryocooler temperature 82 (shown as inputs to digital signal processor 100 in FIG. 6). The cooldown profile 78 may also be calculated using a combination of heat-exchanger temperature 80, ambient temperature 90, cryocooler temperature 82 (which can be measured using a single temperature sensor diode 62 or multiple sensor diodes 62 as explained above), and motor back-EMF from measured cryocooler drive voltage and drive current (or other parameter) to provide a fast cooldown without overdriving the cryocooler 8. Once the cooldown profile 78 is calculated, the cryocooler driving current set point 46 is established 84 and input to the cryocooler drive digital signal processing (DSP) control system 20.

If the temperature control loop digital signal processing (DSP) control system 60 detects that the cryocooler 8 is in the operating state 74, then the digital signal is added via adder 86 to a temperature set point 88. The temperature set point 88 is provided as a set number stored in DSP memory (alternatively, the temperature set point 88 can be obtained through a look-up table and/or linear interpolation), which generally is a function of ambient temperature 90 and determined offline by observation of the filter center-frequency vs. ambient temperature 90. By using the temperature set point 88, residual temperature control errors due to ambient temperature 90 variations (due primarily to component variations) are reduced. The use of the temperature set point 88 (and digital compensation for ambient temperature 90 errors) extends the operating range of the overall system and improves the center-frequency accuracy of the control system. The added signal is preferably subject to proportional integral derivative (PID) compensation 92 and cryocooler driving current set point 46 is established 84 and input to the cryocooler drive digital signal processing (DSP) control system 20.

Figure 6:
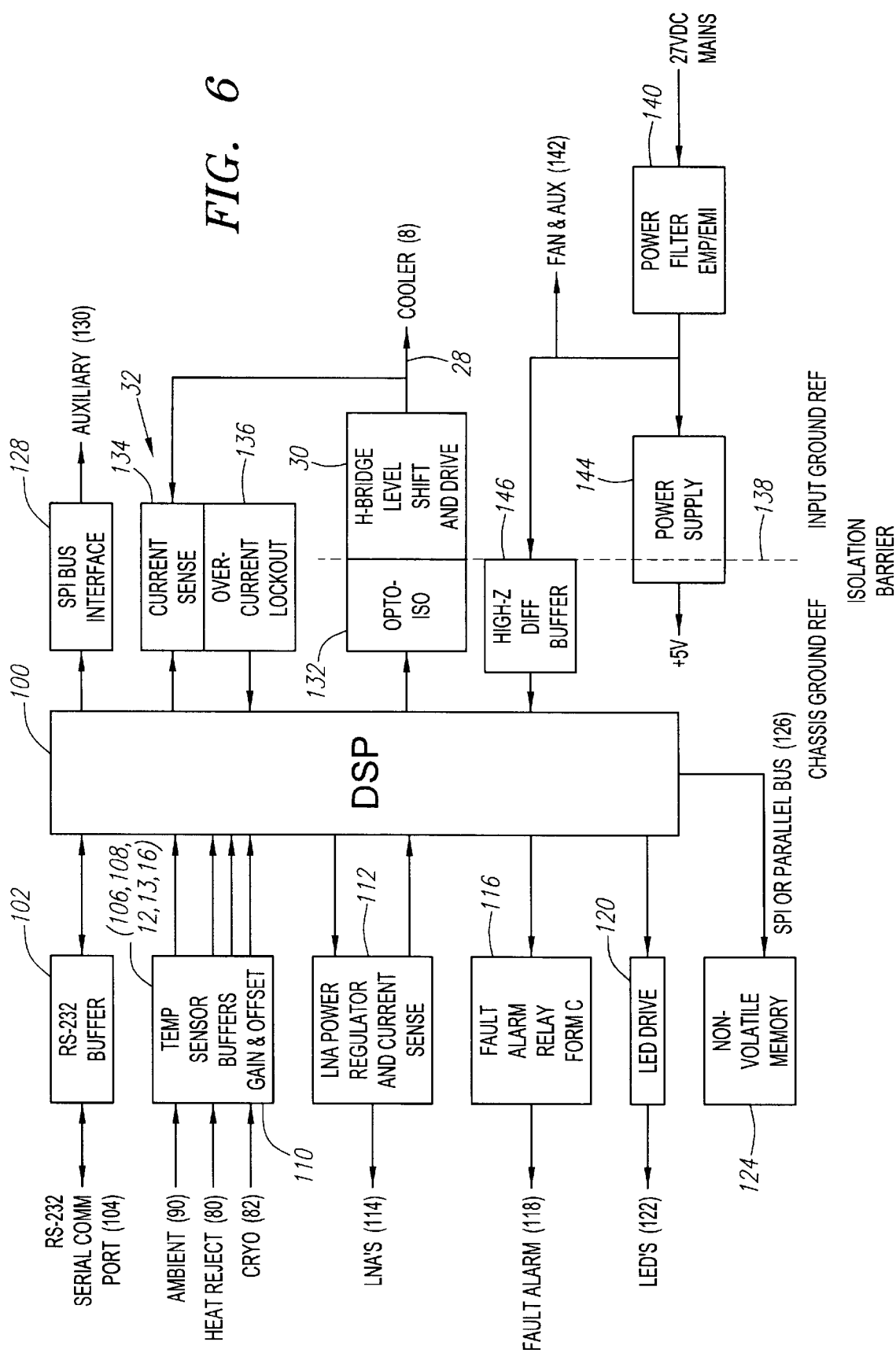
FIG. 6 illustrates the DSP board block diagram for a preferred embodiment of the present invention.

FIG. 6 illustrates a DSP board block diagram showing preferred embodiment of the DSP control system. The system includes a digital signal processor 100 connected to a RS-232 buffer 102 that is coupled to a RS-232 serial communications port 104. The communications port 104 is used to communicate with the DSP 100 to, for example, change control parameters and control algorithms. The DSP 100 also receives inputs from an optional ambient temperature sensor 106, a heat reject sensor 108, and a cryocooler temperature sensor (i.e., temperature sensor diodes 62). It should be emphasized that the ambient temperature sensor 106 is, however, optional and the DSP control system can operate without this input.

Between the DSP 100 and the sensors are temperature sensor buffers and a gain & offset component 110. The DSP 100 is also preferably outputs to and receives inputs from a low noise amplifier (LNA) power regulator and current sense 112 which, in turn, outputs to multiple low noise amplifiers 114. A fault alarm relay 116 is coupled to the DSP 100 to switch appropriate fault alarms 118. An LED driver 120 is also coupled to the DSP for driving multiple LED's 122 for the purpose of quick visual indication of the state of the device.

For the storage of software, control parameters, control algorithms and the like, the DSP 100 is connected to a non-volatile memory 124 via a Serial Peripheral Interface (SPI) or parallel bus 126. A separate bus 128, preferably a SPI bus is coupled to the DSP 100 for connection to an auxiliary control port 130, which is used for controlling other subsystems in the overall device, such as Variable RF Amplifier Gain.

For the control of the cyrocooler 8, a drive signal is sent to the H-bridge circuit 30 after passing through an optical isolator 132. The H-bridge circuit 30 and the DSP 100 are separated by an isolation barrier 138. The H-bridge circuit 30 outputs a cryocooler driving current 28 to the cryocooler 8. For control purposes, the cryocooler driving current 28 is returned to the DSP 100 via a current sense transformer 32 having a current sense element 134 and an optional overcurrent lock-out element 136. The overcurrent lock-out 136 is a hardware failsafe that prevents shorted current conditions from harming the H-Bridge. It provides an interrupt to the DSP to examine the failure condition and reset operation, if necessary. 27 V direct current is passed through power filter 140 to provide power for a fan and other auxiliary components 142. A power supply 144 provides +5 V direct current that is used to power the DSP system and other on-board circuitry. The high impedance buffer 146 is a differential amplifier that allows measurement of the input voltage, but maintains the high impedance between the input voltage return and signal common grounds.

Figure 7:
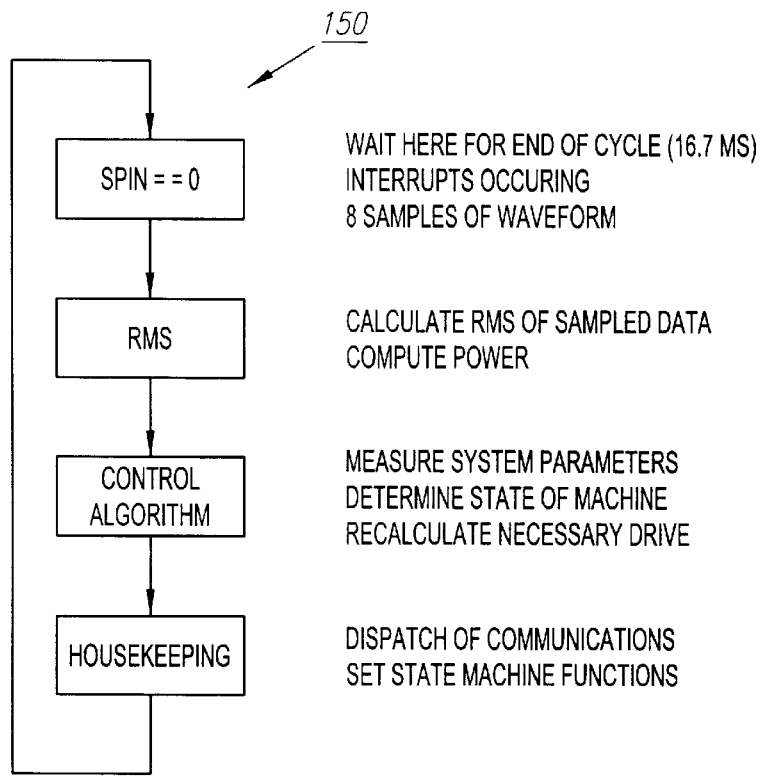
FIG. 7 illustrates a flow chart for the software pace loop kernel used in implementing the control system of the present invention.
Figure 8:
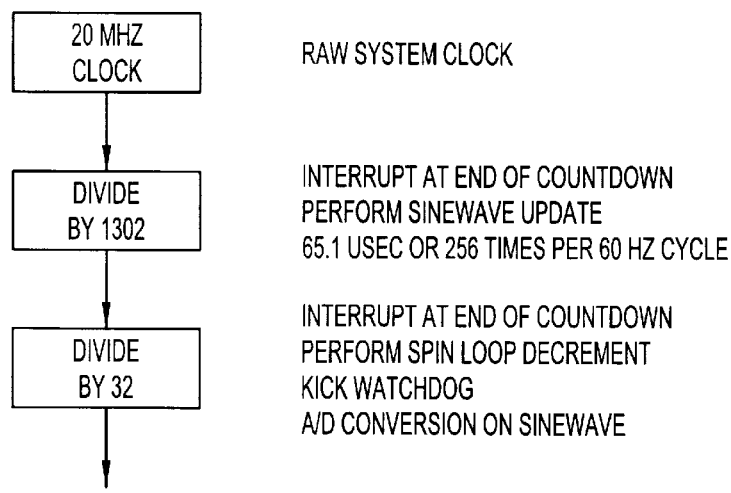
FIG. 8 illustrates the software interrupts used in connection with the software pace loop kernel illustrated in FIG. 7.

FIG. 7 shows the software pace loop kernel 150 that is employed with the DSP based control system. The software pace loop kernel 150 is based on a spin-loop non-maskable interrupt driven real-time operating system. This kernel employs a spin mode that allows for timer interrupts as depicted in FIG. 8 to complete execution of the generation of one full cycle of a 60 Hz (16.7 milliseconds) sine wave, and the corresponding RMS measurements of the sensed current. At the end of this cycle, the calculation of RMS current is made, for example. Then, other calculations are made for drive loop and temperature loop control, such as the drive loop error calculation, PI compensation, drive factor calculation, the temperature loop filtering, error calculation, PID compensation, and drive level set. Finally, RS-232 communications (through the on-chip UART) and state machine functions are dispatched before returning to the spin mode.

FIG. 8 shows the software interrupts used in the software pack loop kernel 150 disclosed in FIG. 7, and specifically in the first block spin mode. From the raw 20 MHz system clock, an internal counter divides by 1302 to produce interrupts at 65.1 microseconds, for example. This interrupt is used as the sine wave generator to update the on-chip PWM to produce the PWM pseudo-voltage value at that point in the sine wave. This interrupt interval is also divided by 32, for example, to produce a 2.08 millisecond interval interrupt, which is when the cryocooler driving current 28 is sampled and watchdog is pulsed. The failsafe watchdog and lockout, for example always maintain the highest priority, and the sine wave generation maintains the next highest priority to insure that the integrity of the sine wave shape is maintained. Communications are handled under the lowest priority.

During operation of the device, the cryocooler 8 drive is preferably controlled for the purpose of producing maximum drive allowable without causing damage to the cryocooler 8 through overstroking, by using criteria either stored in a look-up table within DSP memory and/or by calculations made within the DSP.

While the invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

Attached hereto is an Appendix of the software code modules: VECTORS.ASM, TASKS.H, NCP.MAP, NCP.MAK, NCP.CMD (LINKER), KERNEL.H, ISRS.ASM, GLOBAL.H, C_REGS.H, BOOT.ASM, AFUNCS.ASM, EEPROM.C, KERNEL.C, MAIN.C, MISC.C, PARSER.C, TASKS.C, and MAKEFILE that are used to functionally implement one preferred embodiment of the DSP-based control system. The development tool (environment), TI (Texas Instruments) Code Composer version 4.10.36 for TMS320C2XX, can be used to compile, assemble and link the given files into executable code.

APPENDIX

```
VECTORS.ASM MODULE
;
;==============================================================================
;   program name  : NCP.OUT
;    module name  : VECTORS.ASM
;     copyrights  : Copyright (c) 2000 by Superconductor Technologies
;
;        synopsis : Maps the interrupt vectors
;                   _c_int0             defined in BOOT.ASM
;                   GISR2               defined in ISRS.ASM
;                   GISR3               defined in ISRS.ASM
;                   GISR5               defined in ISRS.ASM
;                   PHANTOM             defined in VECTORS.ASM
;
;==============================================================================

; ===== external declarations
==============================================
            .global     RESET
            .ref        _c_int0
            .ref        GISR2, GISR3, GISR5

; ===== global declarations (defined here)
==================================
            .bss        _pCount, 1       ; count variable for phantom ISR
            .global     _pCount          ; and make it global .asect      ".vectors", 0    ; define vector space
RESET       B           _c_int0          ; Reset vector           0x0000-0x0001
INT1        B           PHANTOM          ; Interrupt level 1      0x0002-0x0003
INT2        B           GISR2            ; Interrupt level 2      0x0004-0x0005
INT3        B           GISR3            ; Interrupt level 3      0x0006-0x0007
INT4        B           PHANTOM          ; Interrupt level 4      0x0008-0x0009
INT5        B           GISR5            ; Interrupt level 5      0x000A-0x000B
INT6        B           PHANTOM          ; Interrupt level 6      0x000C-0x000D
RESERVED    B           PHANTOM          ; Reserved               0x000E-0x000F
SW_INT08    B           PHANTOM          ; software interrupt     0x0010-0x0011
SW_INT09    B           PHANTOM          ; software interrupt     0x0012-0x0013
SW_INT10    B           PHANTOM          ; software interrupt     0x0014-0x0015
SW_INT11    B           PHANTOM          ; software interrupt     0x0016-0x0017
SW_INT12    B           PHANTOM          ; software interrupt     0x0018-0x0019
SW_INT13    B           PHANTOM          ; software interrupt     0x001A-0x001B
SW_INT14    B           PHANTOM          ; software interrupt     0x001C-0x001D
SW_INT15    B           PHANTOM          ; software interrupt     0x001E-0x001F
SW_INT16    B           PHANTOM          ; software interrupt     0x0020-0x0021
TRAP        B           PHANTOM          ; TRAP                   0x0022-0x0023
NMI         B           PHANTOM          ; NMI                    0x0024-0x0025
EMU_TRAP    B           PHANTOM          ; Emulator trap          0x0026-0x0027
SW_INT20    B           PHANTOM          ; software interrupt     0x0028-0x0029
SW_INT21    B           PHANTOM          ; software interrupt     0x002A-0x002B
```

```
    SW_INT22    B       PHANTOM         ; software interrupt    0x002C-0x002D
    SW_INT23    B       PHANTOM         ; software interrupt    0x002E-0x002F
    SW_INT24    B       PHANTOM         ; software interrupt    0x0030-0x0031
    SW_INT25    B       PHANTOM         ; software interrupt    0x0032-0x0033
    SW_INT26    B       PHANTOM         ; software interrupt    0x0034-0x0035
    SW_INT27    B       PHANTOM         ; software interrupt    0x0036-0x0037
    SW_INT28    B       PHANTOM         ; software interrupt    0x0038-0x0039
    SW_INT29    B       PHANTOM         ; software interrupt    0x003A-0x003B
    SW_INT30    B       PHANTOM         ; software interrupt    0x003C-0x003D
    SW_INT31    B       PHANTOM         ; software interrupt    0x003E-0x003F .text
;
;==============================================================================
; function name : PHANTOM
;      synopsis : Catches, and counts, calls to unimplemented ISR's
;
;==============================================================================
PHANTOM
            LAC     _pCount             ; increment pCount
            ADDK    #1
            SACL    _pCount
            SETC    XF
            EINT                        ; re-enable interrupts
            RET .end

TASKS.H MODULE if !defined( TASKS_H )
define     TASKS_H
// -------------------------------------------------------------------
//   program name : NCP.OUT
//    module name : TASKS.H
//     copyrights : Copyright (c) 2000 by Superconductor Technologies
//
//       synopsis :
// ------------------------------------------------------------------- include  "kernel.h"

// ----- function prototypes --------------------------------------

/* tasks.c 05/10/100 16.25.58 */
void MeasMotorCurrent (pTCB tcb);
void MeasTemps (pTCB tcb);
void ADCMeas (pTCB tcb);
void StateMachine (pTCB tcb);
void SciInputReady (pTCB tcb);
```

```
    void SciOutputReady (pTCB tcb);
    void OperationMonitor (pTCB tcb);
    void SysDataOut (pTCB tcb);
    void InitTasksModule (void);

#endif     /*** TASKS_H ***/

NCP.MAP MODULE

*******************************************************************************
TMS320C1x/C2x/C2xx/C5x COFF Linker            Version 7.00
*******************************************************************************
>> Linked Fri May 11 18:26:07 2001

OUTPUT FILE NAME:     <ncp.out>
ENTRY POINT SYMBOL: "_c_int0"  address: 00000040

MEMORY CONFIGURATION name        origin      length       used      attributes    fill
         --------    --------    ---------    --------  ----------    --------
PAGE 0:  VECS        00000000    000000040    00000040    RWIX
         RESET       00000040    000000040    0000003a    RWIX
         PROG        00000080    000001e80    00001b7a    RWIX PAGE 1:  MMRS        00000000    000000060    00000000    RWIX
         B2          00000060    000000020    00000000    RWIX
         BSS         00000200    000000180    00000141    RWIX
         STACK       00000380    000000080    00000080    RWIX

SECTION ALLOCATION MAP output                                      attributes/
  section     page    origin      length      input sections
  --------    ----    ----------  ----------  -----------------
  .vectors    0       00000000    00000040
                      00000000    00000040    VECTORS.obj (.vectors)

.reset      0       00000040    00000021
                      00000040    00000021    BOOT.obj (.reset)

.text       0       00000080    00001a47
                      00000080    00000113    EEPROM.obj (.text)
                      00000193    0000001a    AFUNCS.obj (.text)
                      000001ad    00000064    MAIN.obj (.text)
                      00000211    00000110    MISC.obj (.text)
                      00000321    000000bd    PARSER.obj (.text)
                      000003de    00001188    TASKS.obj (.text)
                      00001566    000000f6    KERNEL.obj (.text)
```

264/278

```
                       0000165c    0000009c    BOOT.obj (.text)
                       000016f8    00000208    ISRS.obj (.text)
                       00001900    00000006    VECTORS.obj (.text)
                       00001906    0000008d    RTS2XX.LIB : idiv.obj (.text)
                       00001993    000000ea               : ldiv.obj (.text)
                       00001a7d    0000000c               : lmpy.obj (.text)
                       00001a89    0000000f               : lsl.obj (.text)
                       00001a98    0000002e               : saverest.obj (.text)
                       00001ac6    00000001               : f_error.obj (.text)

.const    0     00001b00    000000e4
                       00001b00    000000c8    PARSER.obj (.const)
                       00001bc8    0000001c    MAIN.obj (.const)

.bss      1     00000200    00000141    UNINITIALIZED
                       00000200    00000056    TASKS.obj (.bss)
                       00000256    00000000    PARSER.obj (.bss)
                       00000256    00000000    BOOT.obj (.bss)
                       00000256    00000000    MISC.obj (.bss)
                       00000256    00000000    EEPROM.obj (.bss)
                       00000256    00000000    AFUNCS.obj (.bss)
                       00000256    00000000    RTS2XX.LIB : idiv.obj (.bss)
                       00000256    00000000               : lsl.obj (.bss)
                       00000256    00000000               : lmpy.obj (.bss)
                       00000256    00000000               : f_error.obj (.bss)
                       00000256    00000000               : saverest.obj (.bss)
                       00000256    00000000               : ldiv.obj (.bss)
                       00000256    00000007    ISRS.obj (.bss)
                       0000025d    00000001    VECTORS.obj (.bss)
                       00000280    0000004c    MAIN.obj (.bss)
                       00000300    00000041    KERNEL.obj (.bss)

.stack    1     00000380    00000080    UNINITIALIZED
                       00000380    00000000    BOOT.obj (.stack)

.data     1     00000000    00000000    UNINITIALIZED
                       00000000    00000000    EEPROM.obj (.data)
                       00000000    00000000    RTS2XX.LIB : f_error.obj (.data)
                       00000000    00000000               : saverest.obj (.data)
                       00000000    00000000               : lsl.obj (.data)
                       00000000    00000000               : lmpy.obj (.data)
                       00000000    00000000               : ldiv.obj (.data)
                       00000000    00000000               : idiv.obj (.data)
                       00000000    00000000    VECTORS.obj (.data)
                       00000000    00000000    ISRS.obj (.data)
                       00000000    00000000    BOOT.obj (.data)
                       00000000    00000000    KERNEL.obj (.data)
                       00000000    00000000    TASKS.obj (.data)
                       00000000    00000000    PARSER.obj (.data)
                       00000000    00000000    MISC.obj (.data)
                       00000000    00000000    MAIN.obj (.data)
                       00000000    00000000    AFUNCS.obj (.data)

.cinit    0     00001be4    0000004f
                       00001be4    0000000c    TASKS.obj (.cinit)
```

264/278

```
                          00001bf0    00000042      KERNEL.obj (.cinit)
                          00001c32    00000001      --HOLE-- [fill = 0000]

.switch   0    00000061    00000019
                    00000061    00000019            TASKS.obj (.switch)

GLOBAL SYMBOLS address    name                       address    name
     -------    ----                       -------    ----
     00000200   .bss                       00000000   edata
     00000000   .data                      00000000   .data
     00000080   .text                      00000000   RESET
     000016f8   GISR2                      00000040   _c_int0
     00001719   GISR3                      00000080   .text
     00001763   GISR5                      00000080   __STACK_SIZE
     00001906   I$$DIV                     000000c9   _EEPROM_Read
     00001942   I$$MOD                     0000012c   _EEPROM_Write
     00001ab0   I$$REST                    00000193   _BlockMove
     00001a98   I$$SAVE                    000001ad   _main
     00001993   L$$DIVS                    000001c3   _InitMainModule
     00001a05   L$$DIVU                    00000200   .bss
     000019ce   L$$MODS                    00000200   _SCI
     00001a25   L$$MODU                    00000201   _ADC
     00001a7d   L$$MPY                     00000202   _DIO
     00001a89   L$$SL                      00000203   _SPI
     00000000   RESET                      0000020c   _TcEk0
     00000513   _ADCMeas                   0000020d   _TcEk1
     00000201   _ADC                       0000020e   _Vin
     0000021d   _AsciiToLong               0000020f   _Tcsn
     00000193   _BlockMove                 00000210   _lPidSp
     00000202   _DIO                       00000211   _clock
     000000c9   _EEPROM_Read               00000212   _Tcsw
     0000012c   _EEPROM_Write              00000213   _TcsnDataIndex
     00000240   _IlnaHiCurrent             00000214   _TcUk0
     00000224   _Ilna                      00000216   _SmCurrentPhase
     00000252   _IlnaLoCurrent             00000217   _TcUk1
     00000219   _ImEk0                     00000219   _ImEk0
     0000021c   _ImEk1                     0000021b   _TcLastD
     00000247   _ImHiLimit                 0000021c   _ImEk1
     00000241   _ImLoLimit                 0000021d   _AsciiToLong
     00000235   _ImOut                     0000021e   _LastSmErrorBitFlag
     0000024b   _ImSpCoolDown_b            0000021f   _SmErrorBitFlag
     0000024d   _ImSp                      00000220   _Vlna
     00000250   _ImSpCoolDown_m            00000221   _TcsnHiTemp
     0000022b   _ImUk0                     00000222   _TcLastI
     0000022d   _ImUk1                     00000224   _Ilna
     000002c4   _ImotBuf                   00000225   _TcKd
     00001617   _InitKernelModule          00000226   _TcKi
     000001c3   _InitMainModule            00000227   _TcsnLoTemp
     00000c5d   _InitTasksModule           00000228   _TcKp
     0000021e   _LastSmErrorBitFlag        00000229   _TcLimI
     00000292   _LongToAscii               0000022b   _ImUk0
     000003de   _MeasMotorCurrent          0000022d   _ImUk1
```

| | | | |
|---|---|---|---|
| 0000045e | _MeasTemps | 0000022f | _TambHiTemp |
| 00000237 | _NvAddress | 00000230 | _TcsnData |
| 00000b62 | _OperationMonitor | 00000235 | _ImOut |
| 00000243 | _RunTimeAcc | 00000237 | _NvAddress |
| 00000200 | _SCI | 00000238 | _TcswLoTemp |
| 00000203 | _SPI | 00000239 | _TcSp |
| 000009cf | _SciInputReady | 0000023a | _TambLoTemp |
| 00000a7f | _SciOutputReady | 0000023b | _lCdSp |
| 000002b4 | _SciRxBuf | 0000023d | _SmStatusBitFlag |
| 000002b1 | _SciRxHead | 0000023e | _TrejHiTemp |
| 000002b0 | _SciRxTail | 0000023f | _VinLoVolts |
| 00000280 | _SciTxBuf | 00000240 | _IlnaHiCurrent |
| 000002b2 | _SciTxIndex | 00000241 | _ImLoLimit |
| 00000216 | _SmCurrentPhase | 00000243 | _RunTimeAcc |
| 00000254 | _SmCurrentState | 00000245 | _VinHiVolts |
| 0000021f | _SmErrorBitFlag | 00000246 | _TrejLoTemp |
| 00000255 | _SmLastState | 00000247 | _ImHiLimit |
| 0000023d | _SmStatusBitFlag | 00000249 | _Tamb |
| 000002a8 | _SpiRxBuf | 0000024a | _TcswHiTemp |
| 000002a0 | _SpiTxBuf | 0000024b | _ImSpCoolDown_b |
| 000002b3 | _SpinVar | 0000024d | _ImSp |
| 0000062a | _StateMachine | 0000024f | _TcLastTcsn |
| 00000bf2 | _SysDataOut | 00000250 | _ImSpCoolDown_m |
| 0000022f | _TambHiTemp | 00000252 | _IlnaLoCurrent |
| 00000249 | _Tamb | 00000253 | _Trej |
| 0000023a | _TambLoTemp | 00000254 | _SmCurrentState |
| 00001566 | _TaskDispatcher | 00000255 | _SmLastState |
| 0000020c | _TcEk0 | 00000256 | _sIndex |
| 0000020d | _TcEk1 | 00000257 | _sValue |
| 00000225 | _TcKd | 00000258 | _sOffset |
| 00000226 | _TcKi | 00000259 | _sGain |
| 00000228 | _TcKp | 0000025a | _ckticks |
| 0000021b | _TcLastD | 0000025c | _selFlags |
| 00000222 | _TcLastI | 0000025d | _pCount |
| 0000024f | _TcLastTcsn | 00000280 | _SciTxBuf |
| 00000229 | _TcLimI | 00000292 | _LongToAscii |
| 00000239 | _TcSp | 000002a0 | _SpiTxBuf |
| 00000214 | _TcUk0 | 000002a8 | _SpiRxBuf |
| 00000217 | _TcUk1 | 000002b0 | _SciRxTail |
| 00000221 | _TcsnHiTemp | 000002b1 | _SciRxHead |
| 00000227 | _TcsnLoTemp | 000002b2 | _SciTxIndex |
| 0000020f | _Tcsn | 000002b3 | _SpinVar |
| 00000230 | _TcsnData | 000002b4 | _SciRxBuf |
| 00000213 | _TcsnDataIndex | 000002c4 | _ImotBuf |
| 0000024a | _TcswHiTemp | 00000300 | _nTCB |
| 00000212 | _Tcsw | 00000321 | _parse |
| 00000238 | _TcswLoTemp | 00000340 | _gPosts |
| 00000253 | _Trej | 00000341 | end |
| 0000023e | _TrejHiTemp | 000003de | _MeasMotorCurrent |
| 00000246 | _TrejLoTemp | 0000045e | _MeasTemps |
| 0000020e | _Vin | 00000513 | _ADCMeas |
| 00000245 | _VinHiVolts | 0000062a | _StateMachine |
| 0000023f | _VinLoVolts | 000009cf | _SciInputReady |
| 00000220 | _Vlna | 00000a7f | _SciOutputReady |
| 00000080 | __STACK_SIZE | 00000b62 | _OperationMonitor |

```
00000040 _c_int0              00000bf2 _SysDataOut
00001b00 _c_map               00000c5d _InitTasksModule
0000025a _ckticks             00001566 _TaskDispatcher
00000211 _clock               00001617 _InitKernelModule
00001bdf _csACK               000016f8 GISR2
00001bdb _csNAK               00001719 GISR3
00001bc8 _csVersion           00001763 GISR5
00001ac6 _f$$error            00001800 _sTable
00000340 _gPosts              00001906 I$$DIV
0000023b _lCdSp               00001942 I$$MOD
00000210 _lPidSp              00001993 L$$DIVS
000001ad _main                000019ce L$$MODS
00001b89 _map                 00001a05 L$$DIVU
00000300 _nTCB                00001a25 L$$MODU
0000025d _pCount               00001a7d L$$MPY
00000321 _parse               00001a89 L$$SL
00001b80 _r_map               00001a98 I$$SAVE
00000259 _sGain               00001ab0 I$$REST
00000256 _sIndex              00001ac6 _f$$error
00000258 _sOffset             00001ac7 etext
00001800 _sTable              00001b00 _c_map
00000257 _sValue              00001b80 _r_map
0000025c _selFlags            00001b89 _map
00001be4 cinit                00001bc8 _csVersion
00000000 edata                00001bdb _csNAK
00000341 end                  00001bdf _csACK
00001ac7 etext                00001be4 cinit
ffffffff pinit                ffffffff pinit

[127 symbols]

NCP.MAK MODULE

/************* Code Composer V1 Project Data ********************
    The following section contains data generated by Code Composer
    to store project information like build options, source filenames
    and dependencies.

[command filename]
Ncp.cmd 17

[Project Root]
J:\GROUPS\SYSENG\NCP3G

[build options]
3
Linker    = "-c -e _C_int0 -f 0 -m ncp.map -o ncp.out -stack 128 -x "
Assembler = "-glsw -v2xx "
Compiler  = "-gks -v2xx -mr -als -x0 -frJ:\GROUPS\SYSENG\NCP3G "

[source files]
vectors.asm 970506018 1
isrs.asm 989607964 1
boot.asm 979936552 1
```

264/278

```
     C:\tic2xx\c2000\cgtools\lib\rts2xx.lib 0 1
     Kernel.c 970785288 1
     Tasks.c 989630750 1
     Parser.c 986596910 1
 5   Misc.c 970506004 1
     Main.c 989621678 1
     F243REGS.INC 0 0
     tasks.h 971720612 0
     globals.h 989621450 0
10   kernel.h 971720612 0
     time.h 0 0
     C_Regs.h 971132012 0
     Afuncs.asm 970242254 1
     Eeprom.c 971726518 1
15   21341

[dependencies]
     0 -802
     1 9:14 -4036
20   1 9:13 -9644
     0 -802
     2 10:11 11:12 -28634
     3 11:19 10:20 14:21 7444
     1 11:11 -31022
25   1 11:11 -31022
     3 11:11 10:12 14:13 2357
     0 -802
     1 12:13 -12589
     1 13:22 -17471
30   1 11:13 -11774
     0 -802
     1 11:14 -1942
     0 -802
     2 11:11 14:12 500
35
     [version]
     2.0
     */
     -c -e _C_int0 -f 0 -m ncp.map -o ncp.out -stack 128 -x
40   "EEPROM.obj"
     "AFUNCS.obj"
     "MAIN.obj"
     "MISC.obj"
     "PARSER.obj"
45   "TASKS.obj"
     "KERNEL.obj"
     "BOOT.obj"
     "ISRS.obj"
     "VECTORS.obj"
50   "C:\TIC2XX\C2000\CGTOOLS\LIB\RTS2XX.LIB"
     "NCP.CMD"
     /******** End of Project Data Generated by Code Composer ********/

55   NCP.CMD (LINKER) MODULE
```

OC-82240.2

```
/***************************************************************************/
/* file name : NCP.CMD                                                     */
/* synopsis  : This is the linker command file.                            */
/*             Note that the linker refers to PROGRAM memory as PAGE 0 and */
/*             DATA memory as PAGE 1. The memory map is setup for the      */
/*             TMS320F243 device, i.e.,                                    */
/*               ROM (PAGE 0)                                              */
/*                  Interrupt vectors   = 0x0000 - 0x003F  (64 words)      */
/*                  Executable code     = 0x0040 - 0x1FFF  (8128 words)    */
/*               RAM (PAGE 1)                                              */
/*                  Memory-Mapped regs  = 0x0000 - 0x005F  (96 words)      */
/*                  DARAM B2            = 0x0060 - 0x007F  (32 words)      */
/*                  DARAM B0            = 0x0200 - 0x02FF  (256 words)     */
/*                  DARAM B1            = 0x0300 - 0x037F  (128 words)     */
/*                  DARAM STK           = 0x0380 - 0x03FF  (128 words)     */
/*                  Peripherials        = 0x7000 - 0x73FF  (1024 words)    */
/*                  Event Manager       = 0x7400 - 0x743F  (64 words)      */
/*                  external RAM        = 0x8000 - 0xFFFF  (32768 words)   */
/*                                                                         */
/*             Not all memory spaces are utilized.                         */
/***************************************************************************/

MEMORY
{
  PAGE 0 :    VECS    : origin =  0000h, length =   0040h  /* VECTORS   */
              RESET   : origin =  0040h, length =   0040h  /* RESET     */
              PROG    : origin =  0080h, length = 01E80h   /* PROGRAM   */

PAGE 1 :    MMRS    : origin =  0000h, length =   0060h  /* MEM MAP   */
              B2      : origin =  0060h, length =   0020h  /* DARAM B2  */
              BSS     : origin =  0200h, length =   0180h  /* DARAM B0  */
              STACK   : origin =  0380h, length =   0080h  /* STK       */
}

SECTIONS
{
  .vectors    : > VECS    PAGE = 0    /* Interrupt vector table  */
  .reset      : > RESET   PAGE = 0    /* Reset vector            */
  .text       : > PROG    PAGE = 0    /* Code                    */
  .const      : > PROG    PAGE = 0    /* put constants in ROM    */
  .bss        : > BSS     PAGE = 1    /* Uninitialized data      */
  .stack      : > STACK   PAGE = 1    /* stack space             */
}

MAKEFILE MODULE

#$(CC)    = -gks -v2xx -mb -als -x1 -frJ:\GROUPS\SYSENG\NCP3G
#$(ASM)   = -glsw -v2xx
#$(LINK)  = -c -e _C_int0 -f 0 -heap 128 -m ncp.map -o ncp.out -stack 128 -
x
#$(OBJS)  = TASKS.OBJ

```

```
TASKS.OBJ      : TASKS.C
                 dspcl TASKS.C

KERNAL.H MODULE if !defined( KERNEL_H )
define    KERNEL_H
// -------------------------------------------------------------------
// program name : NCP.OUT
//   module name : KERNEL.H
//    copyrights : Copyright (c) 2000 by Superconductor Technologies
//       synopsis :
// ------------------------------------------------------------------- include   "globals.h"

// ----- macro definitions --------------------------------------------- define    MAXTICKS       0xFFFFFFFF
define    DIFFTIME( old, new ) \
              (((new)>(old)) ? ((new)-(old)) : ((MAXTICKS-(old))+(new+1)))

// 'pends' and 'posts' events
#define    SCI_RX_DATA_READY   0x0001   // EOS (i.e. CR) found in SciRxBuf[]
#define    SCI_TX_DATA_READY   0x0002   // SciTxBuf[] has data to send
#define    SCI_TX_BUSY         0x0004   // Serial ISR is busy sending data
define    SYS_DATA_OUT        0x0008   // start the system data out task // ----- typedef's ----------------------------------------------------- typedef    unsigned long   TICKS;     // timer tick counter
typedef    unsigned int    EVENTS;    // pend, post events typedef    struct tcb_tag* pTCB;
typedef    void (*TASK_FUNCTION)( pTCB );

typedef struct tcb_tag   // ----- Task Control Block
  {
    UINT           state;            // current state of TCB FSM
    TASK_FUNCTION  func;             // pointer to task function
    TICKS          delay;            // ticks to delay running the task
    TICKS          last;             // ticks last time task executed
    EVENTS         pends;            // events on which the task is
  blocking
    EVENTS         posts;            // events posted by this task
  } TCB;

// ----- external declarations ----------------------------------------- extern EVENTS     gPosts;            // kernel.c
```

```
// ----- function prototypes ------------------------------------------
-

/* kernel.c 05/10/100 16.34.48 */
int TaskDispatcher (void);
void InitKernelModule (void);

#endif      /*** KERNEL_H ***/

ISRS.ASM MODULE

;
;===============================================================================
;    program name  : NCP.OUT
;      module name : ISRS.ASM - Interrupt Service Routines
;       copyrights : Copyright (c) 2000 by Superconductor Technologies
;         synopsis : ISR's are gathered in this file;
; --------------------------------------------------------------------
;
;         history  : 04/13/01   DSC    Added code in the serial interrupt handler
;                                      to ignore spaces (i.e., 0x20)
;
;===============================================================================
            .include    F243REGS.INC
            .global     I$$SAVE, I$$REST ; ===== external declarations
=================================================
            .ref        _SpinVar        ; defined in main.c
            .ref        _SciRxBuf       ; defined in main.c
            .ref        _SciRxTail      ; defined in main.c
            .ref        _SciTxBuf       ; defined in main.c
            .ref        _SciTxIndex     ; defined in main.c
            .ref        _ImotBuf        ; defined in main.c
            .ref        _gPosts         ; defined in kernel.c ; **** IMPORTANT
    ;********************************************************
    ; These definitions MUST match those in the C modules which they
    ; represent, otherwise unpredictable results will occure
    ;
BUF32       .set        32              ; globals.h
BUF16       .set        16              ; globals.h
CR          .set        13              ; globals.h
LF          .set        10              ; globals.h
SCIRXREADY  .set        00001h          ; kernel.h - SCI_RX_DATA_READY
    ;
    ; **** IMPORTANT
    ;********************************************************

; ===== global declarations (defined here)
====================================
            .global     GISR2, GISR3, GISR5
            .global     _sIndex, _sValue, _sOffset, _sGain, _sTable
```

```
            .global     _ckticks, _selFlags

.bss        _sIndex, 1
            .bss        _sValue, 1
            .bss        _sOffset, 1
            .bss        _sGain, 1
            .bss        _ckticks, 2     ; unsigned long ckticks ;
;==============================================================================
; SELECTION FLAG - select various options
;    0x0001          - echo characters back to the terminal (see BOOT.ASM)
;
;
;==============================================================================
            .bss        _selFlags, 1    ; selection bit flag
            .text
;
;==============================================================================
;       interrupt : 2
;          vector : 0x0004
;         modifies : SSTx, ACC
;         synopsis : Interrupts handled here;
;                    Name      Description               PIVR      Handled
;                    --------  ------------------------  --------  --------
;                    CMP1INT   Compare 1                 0x0021    NO
;                    CMP2INT   Compare 2                 0x0022    NO
;                    CMP3INT   Compare 3                 0x0023    NO
;                    TPINT1    Timer 1 period            0x0027    YES
;                    TCINT1    Timer 1 compare           0x0028    NO
;                    TUFINT1   Timer 1 underflow         0x0029    NO
;                    TOFINT1   Timer 1 overflow          0x002A    NO
;
;                    TPINT1 - GP timer 1 period interrupt
;                    This timer runs the PWM system
;
;==============================================================================
GISR2
    ; save the c run-time state
            CALL        I$$SAVE              ; AR0=BP, AR1=SP ; figure out which peripheral generated the interrupt
            LDP         #PIVR >> 7h          ; DP = 0x7000
            LACL        PIVR                 ; get the interrupt vector into ACC
            XOR         #0027h
            BCND        GISR2_EXIT, NEQ      ; GP timer 1 period interrupt ; ===== GP Timer 1 period interrupt
;===============================================
T1PINT_SISR
            SETC        SXM
            LDP         #_sIndex             ; sIndex = (++sIndex) % 256;
            LACL        _sIndex              ;
            ADD         #1                   ;
```

```
                AND     #00FFh          ;
                SACL    _sIndex         ;

ADD     #_sTable        ; sValue = sTable[ sIndex ]
                TBLR    _sValue         ;

LT      _sValue         ; sValue = sValue * sGain
                MPY     _sGain          ;   note: sGain is in Q15 format
                PAC                     ;         and needs to be scaled
                RPT     #14
                SFR ADD     _sOffset        ; sValue = sValue + sOffset LDP     #CMPR1 >> 7     ; DP = 0x7400
                SACL    CMPR1           ; CMPR1 = sValue, PWM1,2

; reset the GP timer 1 period interrupt flag
                LDP     #EVIFRA >> 7
                LACL    EVIFRA          ; ACC = *(0x742F)
                OR      #0080h          ; ACC |= 0x0080
                SACL    EVIFRA          ; *(0x742F) = ACC

GISR2_EXIT

; restore the C run-time state
                B       I$$REST

;
;===============================================================================
;       interrupt : 3
;          vector : 0x0006
;         modifies : SSTx, ACC, AR2
;         synopsis : Interrupts handled here;
;                    Name    Description              PIVR     Handled
;                    ------- ------------------------ -------- --------
;                    TPINT2  Timer 2 period           0x002B   YES
;                    TCINT2  Timer 2 compare          0x002C   NO
;                    TUFINT2 Timer 2 underflow        0x002D   NO
;                    TOFINT2 Timer 2 overflow         0x002E   NO
;
;                    TPINT2 - GP timer 2 period interrupt
;                        This interrupt -
;                        kicks the watch dog timer
;                        decrements the spin variable (see main.c)
;                        updates the system clock
;                        takes the ImotBuf measurement
;
;===============================================================================
GISR3
        ; save the c run-time state
                CALL    I$$SAVE         ; AR0=BP, AR1=SP
                CLRC    SXM ; figure out which peripheral generated the interrupt
```

```
            LDP     #PIVR >> 7h         ; DP = 0x7000
            LACL    PIVR                ; get the interrupt vector into ACC
            XOR     #002Bh
            BCND    GISR3_EXIT, NEQ     ; GP timer 2 period interrupt ; ===== GP Timer 2 period interrupt
============================================
        T2PINT_SISR
            ; kick the watch dog
            LDP     #WDKEY >> 7
            SPLK    #05555h, WDKEY      ; these two instructions
            SPLK    #0AAAAh, WDKEY      ; reset the watch dog counter ; setup the ADC to get ImotBuf data
            LDP     #ADCTRL2 >> 7       ; setup Direct addressing for the ADC
        regs
            LACL    ADCFIFO1            ; clear the FIFO
            LACL    ADCFIFO1            ; clear the FIFO LAR     AR2, #ADCTRL1       ; point AR2 to the ADC ctrl reg #1
            MAR     *, AR2              ; and make AR2 the current AR
            LACL    *                   ; load the reg into the ACC
            AND     #0FFF0h             ; mask off channel select
            OR      #0108h              ; setup ADC1, ch4
            SACL    *
            OR      #0001h              ; and start conversion
            SACL    *, AR1

; decrement the _SpinVar variable
            LDP     #_SpinVar           ;
            LACL    _SpinVar            ; spin -= 1
            SUB     #1                  ;
            BCND    $1, GEQ             ; if( spin < 0 )
            LACL    #0                  ;   spin = 0
        $1
            SACL    _SpinVar            ;

; update the system clock
            LDP     #_ckticks           ; ckticks++
            LACL    _ckticks            ;   ACC.LO = ckticks.LSW
            ADD     _ckticks+1, 16      ;   ACC.HI = ckticks.MSW
            ADD     #1                  ;   ACC.LO = ACC.LO + 1
            SACL    _ckticks            ;   ckticks.LSW = ACC.LO
            SACH    _ckticks+1          ;   ckticks.MSW = ACC.HI ; make the ImotBuf measurement
            SUB     #1
            AND     #0007h              ; take the ckticks value and mod it
        with 8
            LDP     #_ImotBuf           ; and then add to array offset
            ADD     #_ImotBuf           ;
            SACL    *                   ; store on the stack (AR1) and point
        to ADC
```

```
                LDP     #_ckticks           ; get the current ckticks count to use
    as the
                LACL    _ckticks            ; index into the ImotBuf array
                SUB     #1                  ;
                AND     #0007h              ; mask off 3 LSB's
                OR      #0FF40h LDP     #ADCTRL2 >> 7       ; setup Direct addressing for the ADC
    regs
    $2
                LACL    ADCTRL2             ; get ADCTRL2 into the ACC
                AND     #0018h              ; and see if FIFO #1 has any data
    ready
                BCND    $2, EQ              ; spin until it does
                LACL    ADCFIFO1            ; then load it into the ACC
                RPT     #5                  ; and right shift it by 6
                SFR                         ; note the SXM is cleared so not sign
    extended
                LAR     AR2, *, AR2         ; AR2 holds the destination address
                SACL    *, 0, AR1           ; so put the results there and reset
    SP to AR1

; reset the GP timer 3 period interrupt flag
                LDP     #EVIFRB >> 7
                LACL    EVIFRB              ; ACC = *(0x7430)
                OR      #0001h              ; ACC |= 0x0001
                SACL    EVIFRB              ; *(0x7430) = ACC GISR3_EXIT
        ; restore the C run-time state
                B       I$$REST
                .newblock ;
    =================================================================================
    ;       interrupt : 5
    ;          vector : 0x000A
    ;        modifies : SSTx, ACC, AR1, AR2, AR3
    ;         synopsis : Interrupts handled here;
    ;                       Name    Description                   PIVR    Handled
    ;                       -----   --------------------------    ------  -------
    ;                       SPIINT  SPI, low priority             0x0005  NO
    ;                       RXINT   SCI rc, low priority          0x0006  YES
    ;                       TXINT   SCI tx, low priority          0x0007  YES
    ;                       CANMBINT CAN mailbox, low priority    0x0040  NO
    ;                       CANERINT CAN error, low priority      0x0041  NO
    ;
    =================================================================================
    GISR5
        ; save the C run-time state
                CALL    I$$SAVE             ; AR1 = SP, AR0 = BP
                SAR     AR0, *+
                SAR     AR1, *
                LAR     AR0, #2
                LAR     AR0, *0+, AR2       ; AR2 = LVP
```

```
                LAR     AR2, #1h            ; point to first arg in local frame
                MAR     *0+

; figure out which peripheral generated the interrupt
 5              LDP     #PIVR >> 7h         ; DP = 0x7000
                LACL    PIVR                ; get the interrupt vector into ACC
                XOR     #0005h              ; if PIVR == 5
                BCND    SPIINT_SISR, EQ     ;   goto SPIINT_SISR
                LACL    PIVR                ; get the interrupt vector into ACC
10              XOR     #0006h              ; if PIVR == 6
                BCND    SCIRXINT_SISR, EQ   ;   goto SCIRXINT_SISR
                LACL    PIVR                ;
                XOR     #7h                 ; else if PIVR == 7
                BCND    SCITXINT_SISR, EQ   ;   goto SCITXINT_SISR
15              B       GISR5_EXIT          ; else
                                            ;   goto GISR5_EXIT
        ;
        ; ===== SCI receiver interrupt (low
        priority)=================================
20      ; Received characters are put into a circular queue. Overflow is wrapped
        ; around. When a CR is found the SCI_RX_DATA_READY event is signaled
        ; and the main kernel routine that handles the incoming serial data
        ; is triggered.
        ;
25      SCIRXINT_SISR:
                LDP     #SCICCR >> 7        ; if( SCIRXST.RXDRY == 1 )
                BIT     SCIRXST, 9          ;
                BCND    SCI_RX_ERROR, NTC   ;
                LACL    SCIRXBUF            ; {
30              SACL    *
        ;
        ;========================================================================
        ; 04/13/01 - check for the space character. If found throwaway and return
        ;
35      ;========================================================================
                AND     #~20h, 0
                BCND    $5, NEQ
                B       GISR5_EXIT          ;   return 40      ;
        ;========================================================================
        ; UPCASE - BEGIN
        ;
        ;========================================================================
45      $5
                LACL    *
                SUB     #'a', 0
                BCND    $3, NC
                LACL    *
50              SUB     #'z', 0
                BCND    $3, C
                LACL    *
                AND     #0DFh
                SACL    *
55      $3
```

```
                LACL    *
        ;
==============================================================================
        ; UPCASE - END
5       ;
==============================================================================

;
==============================================================================
10      ; ECHO - BEGIN
        ;
==============================================================================
                LAR     AR3, #_selFlags
                MAR     *, AR3
15              BIT     *, 15, AR2          ; test the ECHO bit
                BCND    $4, NTC
                SACL    *                   ; save the incomming character
        $1                                  ;
                BIT     SCICTL2, 9          ; test the tx buffer to see if it's
20      empty
                BCND    $1, NTC             ; and spin until it is
                                            ;
                LACL    SCICTL2             ; load the SCI control reg #2
                AND     #0FEh               ; and disable interrupts
25              SACL    SCICTL2             ; store it back
                LACL    *                   ; retrieve the character we saved
                SACL    SCITXBUF            ; and ship it out the serial port
        $2                                  ;
                BIT     SCICTL2, 9          ; spin until the tx buffer is empty
30      again
                BCND    $2, NTC             ;
                                            ;
                LACL    SCICTL2             ; get SCI control reg #2
                OR      #01h                ; and re-enable the interrupts
35              SACL    SCICTL2             ; store it back
                                            ;
                LACL    *                   ; get the received char back again
        ;
==============================================================================
40      ; ECHO - END
        ;
==============================================================================
        $4
                AND     #7Fh, 0             ;   ch = SCIRXBUF & 0x7F
45              SACL    *+, 0               ;
                                            ;
                LDP     #_SciRxTail         ;   SciRxBuf[ SciRxTail ] = ch
                LACL    _SciRxTail          ;
                ADD     #_SciRxBuf          ;
50              SACL    *, 0                ;
                LAR     AR3, *-             ;
                LACL    *, AR3              ;
                SACL    *, AR2              ;
                                            ;
```

264/278

```
                LACC    _SciRxTail          ;   SciRxTail = (++SciRxTail) %
        SCIRXLEN
                ADD     #1                  ;
                AND     #BUF16-1, 0         ;
                SACL    _SciRxTail          ;
                                            ;   if( ch == 0x0D )
                LACL    *                   ;
                XOR     #CR                 ;
                BCND    GISR5_EXIT, NEQ     ;
                SACL    *+, 0               ;   {
                LACC    _SciRxTail          ;       SciRxBuf[ SciRxTail ] = 0
                ADD     #_SciRxBuf          ;
                SACL    *, 0                ;
                LAR     AR3, *-             ;
                LACL    *, AR3              ;
                SACL    *, AR2              ;
                LACC    _SciRxTail          ;       SciRxTail = (++SciRxTail) %
        SCIRXLEN
                ADD     #1                  ;
                AND     #BUF16-1, 0         ;
                SACL    _SciRxTail          ;
                                            ;
                LDP     #_gPosts            ;       gPosts |= SCI_RX_DATA_READY
                LACC    _gPosts             ;
                OR      #SCIRXREADY         ;
                SACL    _gPosts             ;   }
                                            ;
                B       GISR5_EXIT          ;   return ; RX_ERROR error flag is set!
        SCI_RX_ERROR:
                LACL    SCICTL1             ; this could be either RX ERROR
                AND     #0DFh, 0            ; or BRKDT. Either way we need to
                SACL    SCICTL1             ;
                NOP                         ; issue a software reset of the SCI
                OR      #020h, 0            ; state machine
                SACL    SCICTL1             ;
                B       GISR5_EXIT          ; return ;
; ===== SCI transmitter interrupt (low
priority)================================
; Loading a character into SCITXBUF generates an interrupt. Because the
; output data is NULL terminated we can test on that character to
; stop sending data.
;
SCITXINT_SISR:
                LAR     AR2, #2h            ; - make AR2 the LVP
                MAR     *0+                 ;
                LDP     #_SciTxIndex        ; SciTxIndex = SciTxIndex + 1
                LACL    _SciTxIndex         ;
                ADD     #1h, 0              ;
                SACL    _SciTxIndex         ;
                SACL    *                   ; - save a copy of SciTxIndex
                SUB     #BUF32, 0           ; if( SciTxIndex <= SCITXBUFLEN )
```

264/278

```
            BCND    GISR5_EXIT, GEQ    ;   {
            LACL    *-                 ;       ch = SciTxBuf[ SciTxIndex ]
            ADD     #_SciTxBuf         ;
            SACL    *, 0               ;
            LAR     AR3, *, AR3        ;
            LACL    *, AR2             ;
            BCND    GISR5_EXIT, EQ     ;       if( ch != 0 )
            LDP     #SCICCR >> 7       ;           SCITXBUF = ch
            SACL    SCITXBUF           ;   }
            B       GISR5_EXIT         ; return ;
; ===== SPI interrupt (low priority)=========================================
;
SPIINT_SISR:
;           B       GISR5_EXIT         ; return ;
; ===== return from interrupt
=================================================
;
GISR5_EXIT:
    ; restore the C run-time state
            MAR     *, AR1             ; restore AR1 = SP
            SBRK    #3                 ; clean up local variable space
            LAR     AR0, *             ; restore the origional FP
            B       I$$REST
            .newblock ;
================================================================================
; Sine lookup table
;   256 entries = 360 degrees
;   These values are based on the timers being setup for 65.1uS interrupts.
;   This value comes from (1/60)*(1/256) = 65.1uS. The 60Hz sinusoid is divided
;   into 256 parts and the ISR updates the PWM register every interrupt.
;
================================================================================
            .text
                                       ;INDEX    VALUE
_sTable     .word   0000h              ;   0         0
            .word   0007h              ;   1         7
            .word   000Fh              ;   2        15
            .word   0016h              ;   3        22
            .word   001Eh              ;   4        30
            .word   0026h              ;   5        38
            .word   002Dh              ;   6        45
            .word   0035h              ;   7        53
            .word   003Ch              ;   8        60
            .word   0044h              ;   9        68
            .word   004Bh              ;  10        75
            .word   0053h              ;  11        83
            .word   005Ah              ;  12        90
```

```
        .word   0061h   ;   13      97
        .word   0069h   ;   14      105
        .word   0070h   ;   15      112
        .word   0077h   ;   16      119
        .word   007Eh   ;   17      126
        .word   0085h   ;   18      133
        .word   008Ch   ;   19      140
        .word   0093h   ;   20      147
        .word   0099h   ;   21      153
        .word   00A0h   ;   22      160
        .word   00A6h   ;   23      166
        .word   00ADh   ;   24      173
        .word   00B3h   ;   25      179
        .word   00B9h   ;   26      185
        .word   00BFh   ;   27      191
        .word   00C5h   ;   28      197
        .word   00CBh   ;   29      203
        .word   00D1h   ;   30      209
        .word   00D7h   ;   31      215
        .word   00DCh   ;   32      220
        .word   00E1h   ;   33      225
        .word   00E7h   ;   34      231
        .word   00ECh   ;   35      236
        .word   00F1h   ;   36      241
        .word   00F5h   ;   37      245
        .word   00FAh   ;   38      250
        .word   00FFh   ;   39      255
        .word   0103h   ;   40      259
        .word   0107h   ;   41      263
        .word   010Bh   ;   42      267
        .word   010Fh   ;   43      271
        .word   0113h   ;   44      275
        .word   0116h   ;   45      278
        .word   011Ah   ;   46      282
        .word   011Dh   ;   47      285
        .word   0120h   ;   48      288
        .word   0123h   ;   49      291
        .word   0125h   ;   50      293
        .word   0128h   ;   51      296
        .word   012Ah   ;   52      298
        .word   012Ch   ;   53      300
        .word   012Eh   ;   54      302
        .word   0130h   ;   55      304
        .word   0132h   ;   56      306
        .word   0133h   ;   57      307
        .word   0134h   ;   58      308
        .word   0135h   ;   59      309
        .word   0136h   ;   60      310
        .word   0137h   ;   61      311
        .word   0137h   ;   62      311
        .word   0137h   ;   63      311
        .word   0138h   ;   64      312
        .word   0137h   ;   65      311
        .word   0137h   ;   66      311
        .word   0137h   ;   67      311
```

264/278

```
        .word   0136h   ;   68    310
        .word   0135h   ;   69    309
        .word   0134h   ;   70    308
        .word   0133h   ;   71    307
        .word   0132h   ;   72    306
        .word   0130h   ;   73    304
        .word   012Eh   ;   74    302
        .word   012Ch   ;   75    300
        .word   012Ah   ;   76    298
        .word   0128h   ;   77    296
        .word   0125h   ;   78    293
        .word   0123h   ;   79    291
        .word   0120h   ;   80    288
        .word   011Dh   ;   81    285
        .word   011Ah   ;   82    282
        .word   0116h   ;   83    278
        .word   0113h   ;   84    275
        .word   010Fh   ;   85    271
        .word   010Bh   ;   86    267
        .word   0107h   ;   87    263
        .word   0103h   ;   88    259
        .word   00FFh   ;   89    255
        .word   00FAh   ;   90    250
        .word   00F5h   ;   91    245
        .word   00F1h   ;   92    241
        .word   00ECh   ;   93    236
        .word   00E7h   ;   94    231
        .word   00E1h   ;   95    225
        .word   00DCh   ;   96    220
        .word   00D7h   ;   97    215
        .word   00D1h   ;   98    209
        .word   00CBh   ;   99    203
        .word   00C5h   ;  100    197
        .word   00BFh   ;  101    191
        .word   00B9h   ;  102    185
        .word   00B3h   ;  103    179
        .word   00ADh   ;  104    173
        .word   00A6h   ;  105    166
        .word   00A0h   ;  106    160
        .word   0099h   ;  107    153
        .word   0093h   ;  108    147
        .word   008Ch   ;  109    140
        .word   0085h   ;  110    133
        .word   007Eh   ;  111    126
        .word   0077h   ;  112    119
        .word   0070h   ;  113    112
        .word   0069h   ;  114    105
        .word   0061h   ;  115     97
        .word   005Ah   ;  116     90
        .word   0053h   ;  117     83
        .word   004Bh   ;  118     75
        .word   0044h   ;  119     68
        .word   003Ch   ;  120     60
        .word   0035h   ;  121     53
        .word   002Dh   ;  122     45
```

```
.word   0026h       ;   123      38
.word   001Eh       ;   124      30
.word   0016h       ;   125      22
.word   000Fh       ;   126      15
.word   0007h       ;   127       7
.word   0000h       ;   128       0
.word   0FFF9h      ;   129      -7
.word   0FFF1h      ;   130     -15
.word   0FFEAh      ;   131     -22
.word   0FFE2h      ;   132     -30
.word   0FFDAh      ;   133     -38
.word   0FFD3h      ;   134     -45
.word   0FFCBh      ;   135     -53
.word   0FFC4h      ;   136     -60
.word   0FFBCh      ;   137     -68
.word   0FFB5h      ;   138     -75
.word   0FFADh      ;   139     -83
.word   0FFA6h      ;   140     -90
.word   0FF9Fh      ;   141     -97
.word   0FF97h      ;   142    -105
.word   0FF90h      ;   143    -112
.word   0FF89h      ;   144    -119
.word   0FF82h      ;   145    -126
.word   0FF7Bh      ;   146    -133
.word   0FF74h      ;   147    -140
.word   0FF6Dh      ;   148    -147
.word   0FF67h      ;   149    -153
.word   0FF60h      ;   150    -160
.word   0FF5Ah      ;   151    -166
.word   0FF53h      ;   152    -173
.word   0FF4Dh      ;   153    -179
.word   0FF47h      ;   154    -185
.word   0FF41h      ;   155    -191
.word   0FF3Bh      ;   156    -197
.word   0FF35h      ;   157    -203
.word   0FF2Fh      ;   158    -209
.word   0FF29h      ;   159    -215
.word   0FF24h      ;   160    -220
.word   0FF1Fh      ;   161    -225
.word   0FF19h      ;   162    -231
.word   0FF14h      ;   163    -236
.word   0FF0Fh      ;   164    -241
.word   0FF0Bh      ;   165    -245
.word   0FF06h      ;   166    -250
.word   0FF01h      ;   167    -255
.word   0FEFDh      ;   168    -259
.word   0FEF9h      ;   169    -263
.word   0FEF5h      ;   170    -267
.word   0FEF1h      ;   171    -271
.word   0FEEDh      ;   172    -275
.word   0FEEAh      ;   173    -278
.word   0FEE6h      ;   174    -282
.word   0FEE3h      ;   175    -285
.word   0FEE0h      ;   176    -288
.word   0FEDDh      ;   177    -291
```

```
        .word   0FEDBh    ;   178     -293
        .word   0FED8h    ;   179     -296
        .word   0FED6h    ;   180     -298
        .word   0FED4h    ;   181     -300
        .word   0FED2h    ;   182     -302
        .word   0FED0h    ;   183     -304
        .word   0FECEh    ;   184     -306
        .word   0FECDh    ;   185     -307
        .word   0FECCh    ;   186     -308
        .word   0FECBh    ;   187     -309
        .word   0FECAh    ;   188     -310
        .word   0FEC9h    ;   189     -311
        .word   0FEC9h    ;   190     -311
        .word   0FEC9h    ;   191     -311
        .word   0FEC8h    ;   192     -312
        .word   0FEC9h    ;   193     -311
        .word   0FEC9h    ;   194     -311
        .word   0FEC9h    ;   195     -311
        .word   0FECAh    ;   196     -310
        .word   0FECBh    ;   197     -309
        .word   0FECCh    ;   198     -308
        .word   0FECDh    ;   199     -307
        .word   0FECEh    ;   200     -306
        .word   0FED0h    ;   201     -304
        .word   0FED2h    ;   202     -302
        .word   0FED4h    ;   203     -300
        .word   0FED6h    ;   204     -298
        .word   0FED8h    ;   205     -296
        .word   0FEDBh    ;   206     -293
        .word   0FEDDh    ;   207     -291
        .word   0FEE0h    ;   208     -288
        .word   0FEE3h    ;   209     -285
        .word   0FEE6h    ;   210     -282
        .word   0FEEAh    ;   211     -278
        .word   0FEEDh    ;   212     -275
        .word   0FEF1h    ;   213     -271
        .word   0FEF5h    ;   214     -267
        .word   0FEF9h    ;   215     -263
        .word   0FEFDh    ;   216     -259
        .word   0FF01h    ;   217     -255
        .word   0FF06h    ;   218     -250
        .word   0FF0Bh    ;   219     -245
        .word   0FF0Fh    ;   220     -241
        .word   0FF14h    ;   221     -236
        .word   0FF19h    ;   222     -231
        .word   0FF1Fh    ;   223     -225
        .word   0FF24h    ;   224     -220
        .word   0FF29h    ;   225     -215
        .word   0FF2Fh    ;   226     -209
        .word   0FF35h    ;   227     -203
        .word   0FF3Bh    ;   228     -197
        .word   0FF41h    ;   229     -191
        .word   0FF47h    ;   230     -185
        .word   0FF4Dh    ;   231     -179
        .word   0FF53h    ;   232     -173
```

```
        .word    0FF5Ah        ;  233   -166
        .word    0FF60h        ;  234   -160
        .word    0FF67h        ;  235   -153
        .word    0FF6Dh        ;  236   -147
        .word    0FF74h        ;  237   -140
        .word    0FF7Bh        ;  238   -133
        .word    0FF82h        ;  239   -126
        .word    0FF89h        ;  240   -119
        .word    0FF90h        ;  241   -112
        .word    0FF97h        ;  242   -105
        .word    0FF9Fh        ;  243    -97
        .word    0FFA6h        ;  244    -90
        .word    0FFADh        ;  245    -83
        .word    0FFB5h        ;  246    -75
        .word    0FFBCh        ;  247    -68
        .word    0FFC4h        ;  248    -60
        .word    0FFCBh        ;  249    -53
        .word    0FFD3h        ;  250    -45
        .word    0FFDAh        ;  251    -38
        .word    0FFE2h        ;  252    -30
        .word    0FFEAh        ;  253    -22
        .word    0FFF1h        ;  254    -15
        .word    0FFF9h        ;  255     -7

.end                   ; ISRS.ASM

GLOBALS.H MODULE if !defined( GLOBALS_H )
define     GLOBALS_H
// -----------------------------------------------------------------
//
// program name : NCP.OUT
// module name  : GLOBALS.h
//   copyrights : Copyright (c) 2000 by Superconductor Technologies
//     synopsis : Header file with non-static function declarations and
//                global variable declarations.
//    Revisions : 3.0.xx (8/25/00)
//                    Complete rewrite of the command set including new
//                    FSM tables and command handlers (see Tasks.c)
//                3.1.xx (8/26/00)
//                    Rewrite of the task handling, including the TCB
//                    structure, remove dynamic memory allocation
//                    and putting TCB in an array.
// ----------------------------------------------------------------- include    <time.h>                    // get the Standard library time
if defined( CLOCKS_PER_SEC )           // functions and undef the macro
#undef      CLOCKS_PER_SEC              // that determines ticks-per-sec
#endif                                  // so we can defined our own,
define     CLOCKS_PER_SEC   480        // based on a 2.083mS tick define     DEVELOPMENT                 // define this for development code
if !defined( DEVELOPMENT )             // and undef (or comment out) for
```

264/278

```
        #define    RELEASE                    // production release code
        #endif define    TOWER_MOUNT_CODE           // define if this is tower mount code
5                                             // and comment out if half-rack
                                              // NOTE: Tower mount code effects
                                              // code in ISRS.ASM, specifically
                                              // the SELECTION FLAG variable that
                                              // controls echoing characters back
10                                            // down the serial port. That code
                                              // has to be handled seperately.

// ----- global typedef's ---------------------------------------------

15      typedef   unsigned int    UINT;
        typedef   unsigned long   ULONG;
        typedef   int             BOOL;

// ----- MACRO definitions --------------------------------------------
20          // Text buffer lengths for SCI and SPI buffers
            // for efficiency (i.e. MOD's are easy) these buffer sizes are powers of 2
            // IMPORTANT: These definitions MUST match those in the .ASM module where
            //            they are also declared, otherwise unpredictable
        results will
25          //            occure.
            //
        #define    BUF8            8          // generic buffer lengths
        #define    BUF16           16
        #define    BUF32           32
30      #define    BUF64           64

// Boolean definitions
        #define    FALSE           0          // typical boolean definitions
        #define    TRUE            !FALSE     // which is typedef'd above
35
            // ASCII definitions
        #define    LF              0x0A       // linefeed int 10
        #define    CR              0x0D       // carriage return int 13

40          // hardware definitions
        #define    LED1            0x0008     // IOPA3
        #define    LED2            0x0010     // IOPA4
        #define    LED3            0x0020     // IOPA5

45          // definitions used by the state machine
        #define    MIN_IMOT        0L         // this number corresponds to 0App if !defined( TOWER_MOUNT_CODE )
        //#define  MAX_IMOT        220L       // this number corresponds to ~30App
50      #define    MAX_IMOT        190L       // this number corresponds to ~26App
        (12V)
        #define    POWER_INCR      0x00010000L // defined for 12V coolers
        #else
        #define    MAX_IMOT        90L        // this number corresponds to ~12App
55      (48V)
```

OC-82240.2          41

```
#define     POWER_INCR      0x00008000L  // defined for 48V coolers
endif define     TCSW_300K       230          // Tcsw @ 300K, estimated from xfer
func
#define     TCSW_70K        965          // Tcsw @ 70K, estimated from xfer
func // definitions for breaking the following addresses apart
define     HI( x )         ( (x>>8) & 0x00FF )
#define     LO( x )         ( x & 0x00FF )

// definitions used by the selFlags (in isrs.asm)
#define     ECHO            0x0001

// definitions locating data in EEPROM space
#define     NVADDR_KP       0x0780       // Kp constant              - 2 bytes
#define     NVADDR_KI       0x0782       // Ki constant              - 2 bytes
#define     NVADDR_KD       0x0784       // Kd constant              - 2 bytes
#define     NVADDR_KIL      0x0786       // Ki limit constant        - 4 bytes
#define     NVADDR_TSP      0x078A       // Tsp constant             - 2 bytes
#define     NVADDR_TREJ_LO  0x078C       // TrejLoTemp constant      - 2 bytes
#define     NVADDR_TREJ_HI  0x078E       // TrejHiTemp constant      - 2 bytes
#define     NVADDR_TAMB_LO  0x0790       // TambLoTemp constant      - 2 bytes
#define     NVADDR_TAMB_HI  0x0792       // TambHiTemp constant      - 2 bytes
#define     NVADDR_ILNA_LO  0x0794       // IlnaLoCurrent const      - 2 bytes
#define     NVADDR_ILNA_HI  0x0796       // IlnaHiCurrent const      - 2 bytes
#define     NVADDR_VIN_LO   0x0798       // VinLoVolts constant      - 2 bytes
#define     NVADDR_VIN_HI   0x079A       // VinHiVolts constant      - 2 bytes
#define     NVADDR_TCSW_LO  0x079C       // TcswLoTemp constant      - 2 bytes
#define     NVADDR_TCSW_HI  0x079E       // TcswHiTemp constant      - 2 bytes
#define     NVADDR_TCSN_LO  0x07A0       // TcsnLoTemp constant      - 2 bytes
#define     NVADDR_TCSN_HI  0x07A2       // TcsnHiTemp constant      - 2 bytes
#define     NVADDR_IM_LO    0x07A4       // ImLoLimit constant       - 4 bytes
#define     NVADDR_IM_HI    0x07A8       // ImHiLimit constant       - 4 bytes
define     NVADDR_END      0x07AC // ----- global declarations --------------------------------------------
extern volatile ULONG   ckticks;         // isrs.asm
extern volatile UINT    sGain;           // isrs.asm
extern          UINT    selFlags;        // isrs.asm
extern volatile int     SpinVar;         // main.c
extern volatile int     ImotBuf[];       // main.c
extern volatile char    SciTxBuf[];      // main.c
extern volatile char    SciRxBuf[];      // main.c
extern volatile int     SciTxIndex;      // main.c
extern volatile int     SciRxHead;       // main.c
extern volatile int     SciRxTail;       // main.c
extern volatile char    SpiTxBuf[];      // main.c
extern volatile char    SpiRxBuf[];      // main.c extern const    char    csVersion[];     // main.c
extern const    char    csNAK[];         // main.c
extern const    char    csACK[];         // main.c
```

```
// ----- global function prototypes ----------------------------------------

/* main.c 16/10/100 12.08.02 */
void InitMainModule (void);

/* parser.c 02/10/100 11.00.20 */
int parse (char *sbuf,
           char *command,
           int *index,
           char *operator,
           long *argument);

/* eeprom.c 16/10/100 12.09.46 */
ULONG EEPROM_Read (UINT addr, UINT size);
void EEPROM_Write (UINT addr, ULONG data, UINT size);

#endif    /*** GLOBALS_H ***/

C_REGS.H MODULE if !defined( C_REGS_H )
define   C_REGS_H
// --------------------------------------------------------------------------
//  program name : NCP.OUT
//    module name : C_REGS.H
//    copyrights : Copyright (c) 2000 by Superconductor Technologies
//                 460 Ward Drive
//                 Santa Barbara, CA
//  synopsis : Definitions of TMS320F243 hardware registers suitable for
//             using in a C program
// -------------------------------------------------------------------------- include  "globals.h"

// ----- Digital IO -------------------------------------------------------- typedef struct DigitalIOtag
{
    UINT    OCRA;        // Output control reg A       @ 0x7090
    UINT    t00;         // reserved space             @ 0x7091
    UINT    OCRB;        // Output control reg B       @ 0x7092
    UINT    t01;         // reserved space             @ 0x7093
    UINT    t02;         // reserved space             @ 0x7094
    UINT    t03;         // reserved space             @ 0x7095
    UINT    t04;         // reserved space             @ 0x7096
    UINT    t05;         // reserved space             @ 0x7097
    UINT    PADATDIR;    // Port A data direction reg  @ 0x7098
    UINT    t06;         // reserved space             @ 0x7099
    UINT    PBDATDIR;    // Port B data direction reg  @ 0x709A
    UINT    t07;         // reserved space             @ 0x709B
```

```
       UINT     PCDATDIR;       // Port C data direction reg   @ 0x709C
       UINT     t08;            // reserved space              @ 0x709D
       UINT     PDDATDIR;       // Port D data direction reg   @ 0x709E
       UINT     t09;            // reserved space              @ 0x709F
    } *pDIO;
    // usage : pDIO DIO = (pDIO) 0x7090;

// ----- SCI Module Registers -------------------------------------- typedef struct SCItag
    {
       UINT     SCICCR;         // Communications Control reg  @ 0x7050
       UINT     SCICTL1;        // SCI Control reg 1           @ 0x7051
       UINT     SCIHBAUD;       // Baud Rate MSbyte            @ 0x7052
       UINT     SCILBAUD;       // Baud Rate LSbyte            @ 0x7053
       UINT     SCICTL2;        // SCI Control reg 2           @ 0x7054
       UINT     SCIRXST;        // Receiver Status             @ 0x7055
       UINT     SCIRXEMU;       // EMU Data Buffer             @ 0x7056
       UINT     SCIRXBUF;       // Receiver Data Buffer        @ 0x7057
       UINT     t01;
       UINT     SCITXBUF;       // Transmit Data Buffer        @ 0x7059
       UINT     t02;
       UINT     t03;
       UINT     t04;
       UINT     t05;
       UINT     t06;
       UINT     SCIPRI;         // Priority/Emulation Control  @ 0x705F
    } *pSCI;
    // usage : pSCI SCI = (pSCI) 0x7050;

// ----- ADC Module Registers -------------------------------------- typedef struct ADCtag
    {
       UINT     ADCTRL1;        // ADC Control Register 1      @ 0x7032
       UINT     t01;
       UINT     ADCTRL2;        // ADC Control Register 2      @ 0x7034
       UINT     t02;
       UINT     ADCFIFO1;       // FIFO Register for ADC #1    @ 0x7036
       UINT     t03;
       UINT     ADCFIFO2;       // FIFO Register for ADC #2    @ 0x7038
    } *pADC;
    // usage : pADC ADC = (pADC) 0x7032;

// ----- SPI Module Registers -------------------------------------- typedef struct SPItag
    {
       UINT     SPICCR;         // Configuration Control reg   @ 0x7040
       UINT     SPICTL;         // Operation Control reg       @ 0x7041
       UINT     SPISTS;         // Status reg                  @ 0x7042
       UINT     t01;            // reserved                    @ 0x7043
       UINT     SPIBRR;         // Baud Rate reg               @ 0x7044
       UINT     t02;            // reserved                    @ 0x7045
       UINT     SPIRXEMU;       // Emulation Buffer reg        @ 0x7046
```

```
        UINT     SPIRXBUF;      // Serial Receive Buffer reg    @ 0x7047
        UINT     SPITXBUF;      // Serial Transmit Buffer reg   @ 0x7048
        UINT     SPIDAT;        // Serial Data reg              @ 0x7049
        UINT     t03;           // reserved                     @ 0x704A
        UINT     t04;           // reserved                     @ 0x704B
        UINT     t05;           // reserved                     @ 0x704C
        UINT     t06;           // reserved                     @ 0x704D
        UINT     t07;           // reserved                     @ 0x704E
        UINT     SPIPRI;        // Priority Control reg         @ 0x704F
} *pSPI;
// usage : pSPI SPI = (pSPI) 0x7040;

#endif    /*** C_REGS_H ***/

BOOT.ASM MODULE

WATCHDOG    .set     1                    ; 0 disables, 1 enables
;
;================================================================================
;    program name : NCP.OUT
;    module name  : BOOT.ASM
;    copyrights   : Copyright (c) 2000 by Superconductor Technologies
;
;    synopsis     : The boot code follows
;
;================================================================================

.include    F243REGS.INC

; ===== constant declarations
=================================================
T_PWM       .set        028Bh            ; PWM period = 651*2*50nS = 65.1uS
                                         ; 65.1uS = 15.36kHz ; ===== external declarations
=================================================
            .global     _main            ; defined in MAIN.C
            .ref        _pCount          ; defined in VECTORS.ASM
            .ref        _sIndex          ; defined in ISRS.ASM
            .ref        _sValue          ; defined in ISRS.ASM
            .ref        _sGain           ; defined in ISRS.ASM
            .ref        _sOffset         ; defined in ISRS.ASM
            .ref        _ckticks         ; defined in ISRS.ASM
            .ref        _selFlags        ; defined in ISRS.ASM ; ===== global declarations (defined here)
=================================================
            .global     _c_int0          ; defined here
            .global     cinit __stack:    .usect      ".stack", 0      ; Size is determined by the linker
```

```
                .text
        ; option -stack in the .CMD file
                .sect       ".reset"        ; declare a RESET location so the
                                            ; linker can put it at absolute 0x0040
                                            ; for the serial loader
        ;
        ;================================================================================
        ; function name : _c_int0
        ;       synopsis : 1) set up stack
        ;                  2) initialize
        ;                  3) call main
        ;
        ;================================================================================
        _c_int0:                            ; entry point from reset vector
                SETC    INTM                ; Disable interrupts ; Initialize status bit fields *NOT* initialized at reset
                CLRC    XF                  ; Turn off xf bit
                CLRC    SXM                 ; Clear Sign Extension Mode
                CLRC    OVM                 ; Reset Overflow Mode
                CLRC    CNF                 ; Config Block B0 to Data mem.

; initialize the stack and frame pointers
                LAR     AR0, #__stack       ; set up frame pointer
                LAR     AR1, #__stack       ; set up stack pointer

MAR     *, AR0              ; AR = 0

; in case the stack over/under flows reset on return
                LACL    #0000h              ; start of hw stack init code
                SACL    *                   ; vectors for underflow
                PSHD    *
                PSHD    *
                PSHD    *
                PSHD    *
                PSHD    *
                PSHD    *
                PSHD    *
                PSHD    *

; process initialization tables
                LACC    #cinit
                ADD     #1h
                BCND    skip, EQ
                CALL    _var_init, *, AR1

; initialize everything else
        skip:
                CALL    _hw_init            ; initialize GP Timer 1, interrupt
                CALL    _main, AR1          ; start the program terminate:
                B       terminate           ; for now, catch the fatal error
                                            ; of returning from main (should
                                            ; never happen) here
```

```
                .text
;
;==============================================================================
;   function name : _hw_init
;       synopsis : 1) initialize any global variables
;                  2) setup the digital IO ports
;                  3) initialize the watchdog
;                  4) setup Event Manager
;                  5) setup the PWM outputs
;                  6) setup the timers
;                  8) enable core interrupts
;
;==============================================================================
_hw_init ;
        ; initialize the watchdog ---------------------------------------------
        ;
                LDP     #WDCR >> 7          ; watch dog registers @ 7020

.if WATCHDOG
                CLRC    XF                  ; clear the error LED
                BIT     WDCR, 8             ; test the WD FLAG
                BCND    $1, NTC             ; if it's set the WD timed out
                SETC    XF                  ; so indicate
$1:
                SPLK    #0AFh, WDCR         ; enable watch dog at 2.4Hz rate
        .else
                SPLK    #0EFh, WDCR         ; disable the watch dog
        .endif
                SPLK    #05555h, WDKEY      ; these two instructions
                SPLK    #0AAAAh, WDKEY      ; reset the watch dog counter ;
        ; initialize any global variables -------------------------------------
        ;
                LACL    #0
                LDP     #_pCount
                SACL    _pCount             ; pCount    = 0
                LDP     #_sIndex
                SACL    _sIndex             ; sIndex    = 0
                LDP     #_sValue
                SACL    _sValue             ; sValue    = 0
                LDP     #_sGain
                SACL    _sGain              ; sGain     = 0
                LDP     #_ckticks
                SACL    _ckticks            ; ckticks.lo = 0
                SACH    _ckticks+1          ; ckticks.hi = 0
                LDP     #_sOffset
                LACL    #T_PWM              ; ACC.LO    = T_PWM
                SFR                         ; T_PWM >>= 1
                SACL    _sOffset            ; sOffset   = T_PWM/2
```

OC-82240.2                              47

```
            LDP     #_selFlags
            LACC    #0001h              ; turn on by default - ECHO
            SACL    _selFlags
        ;
        ; setup IO output ------------------------------------------------------
        ;
        ;   OCRA     - Output Control Register A
        ;   OCRB     - Output Control Regiater B
        ;   PADATDIR - I/O port A Data and Direction register
        ;   PBDATDIR - I/O port B Data and Direction register
        ;   PCDATDIR - I/O port C Data and Direction register
        ;   PDDATDIR - I/O port D Data and Direction register
        ;
        ;   OCRA ::= 0x00C3 - SCITX,RX, CMP1,2
        ;   OCRA ::= 0x0303 - SCITX,RX, CMP3,4
        ;   OCRA ::= 0x0C03 - SCITX,RX, CMP5,6
        ;
            LDP     #OCRA >> 7          ; DP <= 0x7080
            SPLK    #000C3h, OCRA       ; OCRA[15-8]=0   => IOPB[7-0]
                                        ; OCRA[7-6]=1    => PWM2, PWM1
                                        ; OCRA[5-2]=0    => IOPA[5-2]
                                        ; OCRA[1-0]=1    => SCIRXD, SCITXD
            SPLK    #001FCh, OCRB       ; OCRB[15-10]=0  => reserved
                                        ; OCRB[9]=0      => IOPD1
                                        ; OCRB[8]=1      => IOPD0
                                        ; OCRB[7]=1      => CANRX
                                        ; OCRB[6]=1      => CANTX
                                        ; OCRB[5]=1      => SPISTE
                                        ; OCRB[4]=1      => SPICLK
                                        ; OCRB[3]=1      => SPISOMI
                                        ; OCRB[2]=1      => SPISIMO
                                        ; OCRB[1]=0      => /BIO
                                        ; OCRB[0]=0      => XF SPLK    #03800h, PADATDIR   ; PORTA[5-3]     => output,low
            SPLK    #00F00h, PBDATDIR   ; PORTB[7-4]     => input,low
                                        ; PORTB[3-0]     => output,low
            SPLK    #00000h, PCDATDIR   ; PORTC[7-0]     => input,low (don't care)
            SPLK    #0FC1Ch, PDDATDIR   ; PORTD[7]       => output,lo - BYP_RLY
                                        ; PORTD[6]       => output,lo - FLT_RLY
                                        ; PORTD[5]       => output,lo - /LNA_SD
                                        ; PORTD[4]       => output,hi - /EEPROM_WP
                                        ; PORTD[3]       => output,hi - /EEPROM_EN
                                        ; PORTD[2]       => output,hi - /EEPROM_HOLD
                                        ; PORTD[1]       => input,lo  - XINT2
                                        ; PORTD[0]       => input,lo  - /LNA_ERR
        ;
```

```
        ; setup Event Manager ------------------------------------------------
        ;
            LDP     #GPTCON >> 7        ; DP = 0x7400
            SPLK    #0080h, EVIMRA      ; enable T1PINT interrupt
            SPLK    #0001h, EVIMRB      ; 0x0001 = enable T2PINT interrupt
            SPLK    #0000h, EVIMRC      ; mask all C interrupts
            SPLK    #0FFFFh, EVIFRA     ; clear A interrupt flags
            SPLK    #0FFFFh, EVIFRB     ; clear B interrupt flags
            SPLK    #0FFFFh, EVIFRC     ; clear C interrupt flags LDP     #GPTCON >> 7
            SPLK    #0040h, GPTCON      ; 0x0400 = T2TOADC starts ADC on
T2PINT
                                        ; 0x0040 = compare output enable ;
        ; setup ADC's -------------------------------------------------------
        ;
            LDP     #ADCTRL1 >> 7
            SPLK    #0C808h, ADCTRL1    ; enable ADC1, disable interrupts,
                                        ; setup ADCIN4 as input
            SPLK    #03800h, ADCTRL2    ; low priority int, just in case
            LACL    ADCTRL1             ; get ADC control reg #1
            OR      #0100h              ; clear the interrupt flag bit
            SACL    ADCTRL1
            LACL    ADCFIFO1            ; clear all the FIFO's
            LACL    ADCFIFO1
            LACL    ADCFIFO2
            LACL    ADCFIFO2

;
        ; setup SPI registers -----------------------------------------------
        ;
            LDP     #SPICCR >> 7        ; DP = 0x7040
            SPLK    #0007h, SPICCR      ; 8-bit character length
            SPLK    #000Eh, SPICTL      ; delay clock, master mode, talk
            SPLK    #0013h, SPIBRR      ; baud rate = 1MHz
            SPLK    #0020h, SPIPRI      ; complete sequence
            LACL    #0080h
            OR      SPICCR
            SACL    SPICCR ;
        ; setup SCI registers -----------------------------------------------
        ;
            LDP     #SCICCR >> 7        ; DP = 0x7050
            SPLK    #0007h, SCICCR      ; COM:baud,n,8,1
            SPLK    #0043h, SCICTL1     ; enable transmit, receive modes,
                                        ; RX err interrupt
            SPLK    #0003h, SCICTL2     ; enable TXRDY, RXRDY/BRKDT...
            SPLK    #0000h, SCIHBAUD    ; ... interrupts
```

```
;;          SPLK    #0040h, SCILBAUD    ; baud rate registers = 38400
            SPLK    #0081h, SCILBAUD    ; baud rate registers = 19200
            SPLK    #0078h, SCIPRI      ; interrupt priorities low, free run
            SPLK    #0063h, SCICTL1     ; bring SCI out of reset
    ;
    ; setup the PWM outputs ------------------------------------------------
    ;
    ; ACTR ::= 0x000F - CMP1=HI, CMP2=HI
    ; ACTR ::= 0x00F0 - CMP3=HI, CMP4=HI
    ; ACTR ::= 0x0F00 - CMP5=HI, CMP6=HI
    ;
    ; DBTCON ::= 0x0A24 - DEADBAND = 1.0uS
    ; DBTCON ::= 0x0F24 - DEADBAND = 1.5uS
    ; DBTCON ::= 0x0A28 - DEADBAND = 2.0uS
    ; DBTCON ::= 0x0F28 - DEADBAND = 3.0uS
    ;
            LDP     #GPTCON >> 7        ; DP = 0x7400
            SPLK    #000Fh, ACTR        ; CMP1=HI, CMP2=HI
            SPLK    #0F28h, DBTCON      ; deadband = 3.0uS
            SPLK    #T_PWM/2, CMPR1     ; T_PWM/2
            SPLK    #8600h, COMCON      ;
    ;
    ; setup the timers -----------------------------------------------------
    ;
    ; GP timer 1 = 130.2uS
    ; GP timer 2 = 2.08mS (GPT1*16) and is sync'd with GPT1
    ;
            LDP     #GPTCON >> 7        ; DP = 0x7400
            SPLK    #T_PWM, T2CMPR      ; T2 interrupt = 2.08mS
            SPLK    #0000h, T2CNT       ; initiaize T2 counter
            SPLK    #8D81h, T2CON       ; x/32 prescaler, T1CON TENABLE,
                                        ;   T1CON period
            SPLK    #T_PWM, T1PR        ; T1 period = 651*2*50nS=65.1uS
            SPLK    #T_PWM, T1CMPR      ; T1 interrupt = 65.1uS
            SPLK    #0000h, T1CNT       ; initialize the counter reg
            SPLK    #8800h, T1CON       ; cont up/down counting
            SPLK    #8840h, T1CON       ; start ;
    ; initialize the system clock ------------------------------------------
    ;
    ;

;
    ; mask/unmask and enable core interrupts -------------------------------
    ;
            LDP     #0
            SPLK    #00016h, IMR        ; mask all interrupts,
                                        ;   except INT2, INT3 & INT5
            SPLK    #000FFh, IFR        ; clear all core interrupt flags
            CLRC    INTM                ; enable core interrupts
```

```
      ; done
              RET
              .newblock
      ;
      ;==============================================================================
      ; function name : _var_init
      ;       synopsis : Process initialization tables. Tables are in program
      ;                  memory in the following format;
      ;
      ;                  .word   <length of init data in words>
      ;                  .word   <address of variable to initialize>
      ;                  .word   <init data>
      ;                  .word   ...
      ;
      ;                  The init table is terminated with a zero length
      ;
      ;==============================================================================
      _var_init:

ADRK    #2h                     ; allocate two words of local memory
              LACC    #cinit                  ; load accumulator with base of table
              MAR     *, AR0

; read the initialization record header.
        ; An initialization record with a zero length terminates the list
      loop:
              TBLR    *+                      ; read length
              ADD     #1
              TBLR    *                       ; read address LAR     AR2, *-                 ; load variable address into ar2
              LAR     AR3, *, AR3             ; load count into ar3
              BANZ    copy, *-, AR2           ; check for end of table ; end-of-list, return to caller
              MAR     *, AR1                  ; restore the SP
              SBRK    #2h                     ; deallocate local variables
              RET                             ; return to _c_int0

; perform copy of data from program memory to data (.bss) memory
      copy:
              ADD     #1                      ; increment pointer to data
              TBLR    *+, AR3                 ; copy data from program to variable
              BANZ    copy, *-, AR2           ; until count is zero ADD     #1                      ; point to beginning of next record
              B       loop, AR0               ; go process next record .end                            ; BOOT.ASM

AFUNCS.ASM MODULE
```

```
;
;===============================================================================
;    program name : NCP.OUT
;     module name : AFUNCS.ASM - Assembly functions
;      copyrights : Copyright (c) 2000 by Superconductor Technologies
;
;        synopsis : Misc functions that are better written in assembly
language
;                  (1) String constants that reside in program memory and
;                      moved by the BlockMove_PM2DM() function
;
;===============================================================================

.global    _BlockMove

.text
;
;===============================================================================
;   function name : BlockMove
;            call : BlockMove( (const void*)PMsrc, (void*)DMdest )
;        synopsis : Does a block move from program memory to data memory.
;                   Strings are expected to be in PASCAL format (i.e. length,
;                   then data). This function can be interrupted (i.e. it
;                   doesn't use the RPT counter)
; register usage : AR0 = frame pointer
;                  AR1 = stack pointer
;                  AR2 = base pointer
;                  AR3 = pointer to source (length+data), then count
;                  AR4 = pointer to destination (data)
;                  ACC
;
;===============================================================================
_BlockMove
            POPD       *+              ; *SP++ = RET
            SAR        AR0, *+         ; *SP++ = FP (i.e., AR0)
            SAR        AR1, *          ; *SP   = SP (i.e., AR1)
            LAR        AR0, #1         ; AR0 = 1
            LAR        AR0, *0+, AR2   ; AR0 = *SP (i.e. AR1), SP += 1, CAR = AR2
            LAR        AR2, #-3        ; AR2 = -3
            MAR        *0+             ; AR2 <= points to the arguments on the stack
;
            LAR        AR3, *-         ; AR3 = source
            LAR        AR4, *+         ; AR4 = dest
            LACL       *, AR1          ; ACC = source addr
            TBLR       *               ; get length into local memory
            LACL       *               ; get length into ACC
            SUB        #1              ; and decrement by 1
            SACL       *               ; store it back
            LAR        AR3, *, AR2     ; just to get it in AR3
            LACL       *, AR4          ; get the source address again
$1:
            ADD        #1
            TBLR       *+, AR3         ; do it
```

```
            BANZ    $1, *-, AR4
        ;
            MAR     *, AR1          ; pop off frame
            SBRK    #2              ;
            LAR     AR0, *-         ; restore frame pointer
            PSHD    *               ; put return address back on hardware
    stack
            RET                     ; and return
            .newblock .end                    ; AFUNCS.ASM
```

EEPROM.C MODULE
```
// ---------------------------------------------------------------------
//   program name : NCP.OUT
//    module name : EEPROM.C
//     copyrights : Copyright (c) 2000 by Superconductor Technologies, Inc.
//       synopsis : All functions that handle SPI interfacing
// --------------------------------------------------------------------- include "globals.h"
include "C_Regs.h"

extern pSPI SPI;                    // see tasks.c
extern pDIO DIO;                    // see tasks.c // ---------------------------------------------------------------------
//       function : SpiShift
//      arguments : length - number of bytes to shift (8 max)
//        returns : nothing
//       synopsis : Expects that the data (including dummy data) is already
//                  available in SpiTxBuf[]. SpiRxBuf will be over-written.
//                  Also expects that the SPI device is already selected.
// --------------------------------------------------------------------- static void SpiShift( int length )
{
  int  index;

index = SPI->SPIRXBUF;            // do a dummy read of the input buffer
  index = 0;
  while( length > index )
    {
      while( SPI->SPISTS & 0x0020 );    // wait for TX buffer to be clear
      SPI->SPITXBUF = SpiTxBuf[ index ] << 8;
      while( !(SPI->SPISTS & 0x0040) ); // wait for RX buffer to be full
      SpiRxBuf[ index ] = SPI->SPIRXBUF & 0x00FF;
      index++;
    }
}
```

```
//  ------------------------------------------------------------------
//      function : EEPROM_Read
//      arguments : addr - 16-bit address (upper 5 bits are ignored)
//                  size - number of bytes to retrieve (4 max)
//      returns  : byte, word or long depending on 'size' parameter
//      synopsis : Data is shifted into SpiRxBuf[]. It is assumed to be in
//                 Big Endian format (MSB .... LSB). It is then converted
//                 into long or word depending on the 'size' argument.
//  ------------------------------------------------------------------
ULONG EEPROM_Read( UINT addr, UINT size )
  {
  char *cptr = (char*)SpiTxBuf, *tail;
  ULONG data = 0L;

*cptr++ = 0x0003;                  // READ instruction
  *cptr++ = HI( addr );
  *cptr++ = LO( addr );

DIO->PDDATDIR &= ~0x0008;          // assert EEPROM_EN
  SpiShift( size+3 );                // shift the data out
  DIO->PDDATDIR |= 0x0008;           // de-assert EEPROM_EN cptr = (char*)SpiRxBuf + 3;
  tail = cptr + size;
  do
    {
    data <<= 8;
    data += (*cptr++ & 0x00FF);
    }
  while( tail != cptr );

return data;
  }

//  ------------------------------------------------------------------
//      function : EEPROM_Write
//      arguments : addr - 16-bit address (upper 5 bits are ignored)
//                  data - byte, word or long data to be written
//                  size - number of bytes to transmit (4 max)
//      returns  : nothing
//      synopsis : Writes up to long size data to EEPROM storage. Data is
//                 assumed to be in Big Endian format and will be stored
//                 that way. It is further assumed that data will be either
//                 an int or a long requiring size to be either 2 or 4.
//  ------------------------------------------------------------------
void EEPROM_Write( UINT addr, ULONG data, UINT size )
  {
  char *cptr = (char*)SpiTxBuf, *tail;

// set the write enable latch
  *cptr = 0x0006;                    // WREN instruction
```

```
    DIO->PDDATDIR &= ~0x0008;              // assert EEPROM_EN
    SpiShift( 1 );                         // shift WREN out
    DIO->PDDATDIR |= 0x0008;               // de-assert EEPROM_EN

*cptr++ = 0x0002;                      // WRITE instruction
    *cptr++ = HI( addr );
    *cptr   = LO( addr );
    tail    = cptr;
    cptr += size;
    do
      {
        *cptr-- = (UINT)data & 0x00FF;
        data >>= 8;
      }
    while( tail != cptr );

DIO->PDDATDIR &= ~0x0008;              // assert EEPROM_EN
    SpiShift( size+3 );                    // shift the data out
    DIO->PDDATDIR |= 0x0008;               // de-assert EEPROM_EN
  }

//// ------------------------------------------------------------------
////    function : EEPROM_Read
////    arguments : addr - 16-bit address (upper 5 bits are ignored)
////     returns : integer at addr
////     synopsis : Returns the integer at the address
//// ------------------------------------------------------------------
//UINT EEPROM_Read( UINT addr )
// {
//   char *cptr = (char*)SpiTxBuf;
//
//   *cptr++ = 0x0003;                     // READ instruction
//   *cptr++ = HI( addr );
//   *cptr   = LO( addr );
//
//   DIO->PDDATDIR &= ~0x0008;             // assert EEPROM_EN
//   SpiShift( 5 );                        // shift the data out
//   DIO->PDDATDIR |= 0x0008;              // de-assert EEPROM_EN
//
//   return ((SpiRxBuf[3]<<8)&0xFF00) + (SpiRxBuf[4]&0x00FF);
// }
//
//// ------------------------------------------------------------------
////    function : EEPROM_Write
////    arguments : addr - 16-bit address (upper 5 bits are ignored)
////                data - word (16-bit) data to be written
////     returns : nothing
////     synopsis : Writes one integer to EEPROM storage.
//// ------------------------------------------------------------------
//void EEPROM_Write( UINT addr, UINT data )
// {
```

```
//      char *cptr = (char*)SpiTxBuf;
//
//      // set the write enable latch
//      *cptr = 0x0006;                         // WREN instruction
//      DIO->PDDATDIR &= ~0x0008;               // assert EEPROM_EN
//      SpiShift( 1 );                          // shift WREN out
//      DIO->PDDATDIR |= 0x0008;                // de-assert EEPROM_EN
//
//      *cptr++ = 0x0002;                       // WRITE instruction
//      *cptr++ = HI( addr );
//      *cptr++ = LO( addr );
//      *cptr++ = (data>>8) & 0x00FF;
//      *cptr   = data & 0x00FF;
//
//      DIO->PDDATDIR &= ~0x0008;               // assert EEPROM_EN
//      SpiShift( 5 );                          // shift the data out
//      DIO->PDDATDIR |= 0x0008;                // de-assert EEPROM_EN
// }
// -------------------------------------------------------------------------
//      function : EEPROM_Read
//      arguments : addr - 16-bit address (upper 5 bits are ignored)
//                  size - number of bytes to retrieve (4 max)
//      returns : nothing
//      synopsis : Data is returned in SpiRxBuf[]. It is assumed to be in
//                 Big Endian format (MSB .... LSB)
// -------------------------------------------------------------------------
//void EEPROM_Read( UINT addr, UINT size )
// {
//      int i, j;
//
//      i = 0;
//      SpiTxBuf[ i++ ] = 0x0003;               // READ instruction
//      SpiTxBuf[ i++ ] = HI( addr );
//      SpiTxBuf[ i++ ] = LO( addr );
//      for( j=0 ; j<size && j<5 ; j++ )
//        SpiTxBuf[ i++ ] = 0x00FF;
//
//      DIO->PDDATDIR &= ~0x0008;               // assert EEPROM_EN
//      SpiShift( i );                          // shift the data out
//      DIO->PDDATDIR |= 0x0008;                // de-assert EEPROM_EN
// }
//
// -------------------------------------------------------------------------
//      function : EEPROM_Write
//      arguments : addr - 16-bit address (upper 5 bits are ignored)
//                  data - byte, word or long data to be written
//                  size - number of bytes to transmit (4 max)
//      returns : nothing
//      synopsis : Writes up to long size data to EEPROM storage. Data is
//                 assumed to be in Big Endian format and will be stored
//                 that way. It is further assumed that data will be either
```

```
//                an int or a long requiring size to be either 2 or 4.
// -----------------------------------------------------------------------------
//void EEPROM_Write( UINT addr, ULONG data, UINT size )
// {
//   int   i, j;
//
//   i = 0;
//     // set the write enable latch
//   SpiTxBuf[ i ] = 0x0006;                // WREN instruction
//   DIO->PDDATDIR &= ~0x0008;              // assert EEPROM_EN
//   SpiShift( 1 );                         // shift WREN out
//   DIO->PDDATDIR |= 0x0008;               // de-assert EEPROM_EN
//
//   SpiTxBuf[ i++ ] = 0x0002;              // READ instruction
//   SpiTxBuf[ i++ ] = HI( addr );
//   SpiTxBuf[ i   ] = LO( addr );
//   j = i + size;
//   do
//   {
//     SpiTxBuf[ j-- ] = (UINT)data & 0x00FF;
//     data >>= 8;
//   }
//   while( j > i );
//
//   i = i + size + 1;
//   DIO->PDDATDIR &= ~0x0008;              // assert EEPROM_EN
//   SpiShift( i );                         // shift the data out
//   DIO->PDDATDIR |= 0x0008;               // de-assert EEPROM_EN
// }

// -----------------------------------------------------------------------------
//      function :
//      arguments :
//       returns :
//       synopsis :
// -----------------------------------------------------------------------------

KERNEL.C MODULE
// -----------------------------------------------------------------------------
//   program name : NCP.OUT
//    module name : KERNEL.C
//     copyrights : Copyright (c) 2000 by Superconductor Technologies
//
//       synopsis :
// ----------------------------------------------------------------------------- include   "tasks.h"              // task prototypes are declared here
include   "globals.h"
```

```
// ----- macro definitions -------------------------------------------------
#define    NUM_TASKS       (sizeof(nTCB)/sizeof(TCB))-1
// ----- global variables --------------------------------------------------
EVENTS     gPosts;                              // OS event flags
TCB        nTCB[] =
   {
     { -1, MeasMotorCurrent,   0L, 0L, 0, 0, },    // nTCB[ 0 ]
     { -1, MeasTemps,          0L, 0L, 0, 0, },    // nTCB[ 1 ]
     { -1, ADCMeas,            0L, 0L, 0, 0, },    // nTCB[ 2 ]
     { -1, StateMachine,       0L, 0L, 0, 0, },    // nTCB[ 3 ]
     { -1, SciInputReady,      0L, 0L, 0, 0, },    // nTCB[ 4 ]
     { -1, SciOutputReady,     0L, 0L, 0, 0, },    // nTCB[ 5 ]
     { -1, OperationMonitor,   0L, 0L, 0, 0, },    // nTCB[ 6 ]
     { -1, SysDataOut,         0L, 0L, 0, 0, },    // nTCB[ 7 ]
   };

// ----- local function prototypes -----------------------------------------

// -------------------------------------------------------------------------
//     function : TaskDispatcher
//     arguments : none
//     returns   : 0 for success, otherwise error
//     synopsis  : Basic task dispatcher.
//          Note : The SpinVar variable is decremented in TPINT2 ISR every
//                 2.083mS. Therefore 2.083mS * 8 = 16.67mS = 1/60 and the
//                 task manager gets called 60 times a second (i.e. every
//                 16.67mS). These times are determined by TPINT1 and TPINT2
//                 period registers.;
//          Note : The InitTasks() function must be called before calling
//                 the task manager (i.e. TaskDispatcher() ).
// -------------------------------------------------------------------------
int    TaskDispatcher( void )
  {
  TICKS    elapsedTime, currentTime;
  EVENTS   posts;
  unsigned i;

SpinVar = 8;                            // initialize the spin variable
  while( 1 )                              // do forever, or at least until
    {                                     //   a fatal error occures
    while( SpinVar > 0 );                 // wait for the timer to go off
    SpinVar = 8;                          //  and reload immediately for( i=0 ; i<=NUM_TASKS ; i++ )
      {
      currentTime = clock();
      elapsedTime = DIFFTIME( nTCB[i].last, currentTime );

// --- see if waiting on a delay
      if( elapsedTime < nTCB[i].delay )
```

```
            continue;
            nTCB[i].delay = 0L;                    // reset delay in task, if desired // --- see if waiting for a posted event
            posts = nTCB[i].pends & gPosts;
            if( nTCB[i].pends && !posts )
                continue;                          // let the task reset the event // --- if we made it this far, run the task
            nTCB[i].func( &nTCB[i] );
            nTCB[i].last = clock();
            } // for(...
        } // while( 1 )
    } // TaskDispatcher()
// -----------------------------------------------------------------------------
//     function : InitKernelModule
//     arguments : none
//     returns   : 0 if successful, !0 otherwise
//     synopsis  : Initializes the kernel. The various TCB data structure
//                 members are initialized to zero. This lets the individual
//                 initialization state (uiState=0) do task initialization.
//                 Also we want to re-initialize if the kernel resets.
// ----------------------------------------------------------------------------- void    InitKernelModule( void )
    {
    unsigned i;

// initialize OS specific data structures
    gPosts      = 0;
    for( i=0 ; i<=NUM_TASKS ; i++ )
        {
        nTCB[i].state  = -1;              // start in initialization state
        nTCB[i].delay  = 0;               // start with no delay
        nTCB[i].last   = 0;               // start with not run
        nTCB[i].pends  = 0;               // start with no pending events
        nTCB[i].posts  = 0;               // start with no posted events
        }

} // InitKernel

MAIN.C MODULE

// -----------------------------------------------------------------------------
// program name : NCP.OUT
//   module name : MAIN.C
//    copyrights : Copyright (c) 2000 by Superconductor Technologies
//
//      synopsis : main() is here as well as initialization for globals
// -----------------------------------------------------------------------------
```

```
#include    "globals.h"              // constant definitions
#include    "tasks.h"                // task function declarations
include    "C_Regs.h"               // 243 reg defs for C code // ----- global variables --------------------------------------------- volatile int    SpinVar;                 // spin variable
volatile int    ImotBuf[ BUF8 ];         // motor current measurment array
volatile char   SciTxBuf[ BUF32 ];       // SCI transmit buffer
volatile char   SciRxBuf[ BUF16 ];       // SCI receive buffer
volatile int    SciTxIndex;              // SCI transmit buffer index
volatile int    SciRxHead;               // SCI receive buffer head pointer
volatile int    SciRxTail;               // SCI receive buffer tail pointer
volatile char   SpiTxBuf[ BUF8 ];        // SPI transmit buffer
volatile char   SpiRxBuf[ BUF8 ];        // SPI receive buffer // ----- global string declarations ---------------------------------------
//
// (CONST) Strings are placed in ROM storage and copied to an appropriate
// buffer in RAM for use. They are '0' terminated - after a CR that is used
// as an EOS character - with their length as the first byte (as in PASCAL).
//
// The assmebly function 'BlockMove' does the block move from program memory
// to data memory.
//
// |--------|------|------|------|------|------|------|------|----|---|
// | LENGTH | CHAR | CHAR | CHAR | CHAR | CHAR | CHAR | CHAR | CR | 0 |
// |--------|------|------|------|------|------|------|------|----|---|
//
// ------------------------------------------------------------------------ if defined( DEVELOPMENT )
    #if !defined( TOWER_MOUNT_CODE )
const char      csVersion[] = { 18, "4.0.07,05.11.01X\r" };
    #else
const char      csVersion[] = { 18, "4.1.08,05.18.01X\r" };
    #endif
#else
    #if !defined( TOWER_MOUNT_CODE )
const char      csVersion[] = { 17, "4.0.07,05.11.01\r" };
    #else
const char      csVersion[] = { 17, "4.1.08,05.18.01\r" };
    #endif
#endif
const char      csNAK[]     = { 3, "?\r" };
const char      csACK[]     = { 4, "OK\r" };

// ----- external variable declarations --------------------------------- extern pSCI SCI;                         // see tasks.c

// ----- local function prototypes --------------------------------------
```

```
static void SignOn (void);

// ---------------------------------------------------------------------------
//    function : main
//    arguments : none
//    returns : nothing
//    synopsis : (1) Initializes all global variables
//               (2) Initializes the kernel and tasks
//               (3) starts the task dispatcher, which never returns
// --------------------------------------------------------------------------- void  main( void )
  {
    InitMainModule();                    // main.c
    InitKernelModule();                  // kernel.c
    InitTasksModule();                   // tasks.c
#if defined( TOWER_MOUNT_CODE )
    selFlags &= ~ECHO;                   // enable echo
#else
    selFlags |= ECHO;                    // enable echo
    SignOn();                            // main.c
endif TaskDispatcher();                    // kernel.c
  } // main // ---------------------------------------------------------------------------
//       function : InitMainModule
//       arguments : none
//       returns : nothing
//       synopsis : Initializes the global variables.
// --------------------------------------------------------------------------- void InitMainModule( void )
  {
    unsigned i;

SciTxIndex   = 0;
    SciRxHead    = 0;
    SciRxTail    = 0;

for( i=0 ; i<=(BUF8-1) ; i++ )
      ImotBuf[ i ] = 0;
  } // InitMainModule

// ---------------------------------------------------------------------------
//       function : SignOn
//       arguments : none
//       returns : nothing
//       synopsis : Displays the software version when the system resets
```

```
// -------------------------------------------------------------------------
static void SignOn( void )
  {
  BlockMove( &csVersion, SciTxBuf );
  SciTxIndex = 0;
  SCI->SCITXBUF = SciTxBuf[ SciTxIndex ];
  while( SciTxBuf[SciTxIndex] != 0 );
  } // SignOn

MISC.C MODULE

// -------------------------------------------------------------------------
//   program name : NCP.OUT
//    module name : MISC.C
//       synopsis : A collection of miscellaneous 'helper' functions
// ------------------------------------------------------------------------- include   "globals.h"              // includes time.h

/************************************************************************
 * Rewrites of stdlib functions                                         *
 *    clock()         returns ticks updated by GISR3 (see ISRS.ASM)     *
 *    AsciiToInt()    replaces atoi()                                   *
 *    LongToAscii()   replaces ltoa()                                   *
 ************************************************************************/

// -------------------------------------------------------------------------
//       function : clock
//      arguments : none
//        returns : Returns system time.
//       synopsis : This function is found in the TI Standard Library and is
//                  overridden here. System time is updated every 2.083mS. The
//                  macro CLOCKS_PER_SEC, defined in globals.h can be used to
//                  convert the global variable "ckticks" into seconds.
//                  See documentation in TMS320C2xx Optimizing C Compiler,
//                  Runtime-Support functions (5-57).
//          NOTES : The 2.083mS time comes from
//                  1/60/256 = 65.1uS * 32 = 2.083mS
// -------------------------------------------------------------------------
clock_t clock( void )
  {
  return ckticks;
  } // clock // -------------------------------------------------------------------------
//       function : AsciiToLong
```

```
//      arguments : cptr -  pointer to character buffer that holds the number
//                          string
//        returns : conversion of ASCII string into (long) int
//       synopsis : Converts an array of charactes into an integer. Stops
//                  on the first non-numeric character.
// ---------------------------------------------------------------------- long    AsciiToLong( char *cptr )
  {
  long  tl, sum = 0L;

tl = *cptr - '0';
  while( tl>=0 && tl<=9 )
    {
    sum = sum * 10 + tl;
    tl = *(++cptr) - '0';
    } return sum;
  } // AsciiToLong

// ----------------------------------------------------------------------

//       function : LongToAscii
//      arguments : n - number to be converted
//                  b - buffer to write the converted number to
//        returns : number of chacters in the output buffer, including
//                  NULL terminating character
//       synopsis : Replaces the TI implementation, which killed the compiler
// ---------------------------------------------------------------------- int     LongToAscii( long n, char b[] )
  {
  char    tbuf[ BUF16 ];
  int     neg = 0, i, j;

if( n<0L )
    {
    neg++;
    n = -n;
    } i = BUF16-1;
  tbuf[ i-- ] = 0;
  do
    {
    tbuf[ i-- ] = (n % 10) + '0';
    n /= 10;
    }
  while( n );
  if( neg )
    tbuf[ i-- ] = '-';

j = 0;
  while( i<BUF16 )
```

```
   b[ j++ ] = tbuf[ ++i ];

return j-1;
} // LongToAscii

PARSER.C MODULE

// -------------------------------------------------------------------------
// program name : NCP.OUT
//  module name : PARSER.C
//   copyrights : Copyright (c) 2000 by Superconductor Technologies
//
//      synopsis :
// -------------------------------------------------------------------------
include   "globals.h"                    // AsciiToInt // ---------- local variable definitions ------------------------------------
const int c_map[ 128 ] = {
// 0  1  2  3  4  5  6  7  8  9  A  B  C  D  E  F
   0, 0, 0, 0, 0, 0, 0, 0, 0, 0, 0, 0, 0, 1, 0, 0,      // 0x
   0, 0, 0, 0, 0, 0, 0, 0, 0, 0, 0, 0, 0, 0, 0, 0,      // 1x
   0, 0, 0, 0, 0, 0, 0, 0, 0, 0, 0, 0, 0, 0, 0, 0,      // 2x
   2, 2, 2, 2, 2, 2, 2, 2, 2, 2, 0, 0, 0, 3, 0, 4,      // 3x
   0, 0, 0, 0, 0, 0, 0, 0, 0, 5, 0, 0, 0, 0, 0, 0,      // 4x
   0, 0, 0, 6, 0, 0, 0, 0, 0, 0, 0, 0, 0, 0, 0, 0,      // 5x
   0, 0, 0, 0, 0, 0, 0, 0, 0, 0, 0, 0, 0, 0, 0, 0,      // 6x
   0, 0, 0, 0, 0, 0, 0, 0, 0, 0, 0, 0, 0, 0, 0, 0,      // 7x
};

const int r_map[ 9 ] = {
   0,  1,  2,  3,  4,  5,  6,  7,  8,
};

const int map[ 9 ][ 7 ] = {
//   0    1    2    3    4    5    6
   { -1, 100, -1,  -1,  -1,   6,   1, },                // 0
   { -1,  -1,  2,  -1,  -1,  -1,  -1, },                // 1
   { -1,  -1,  2,   4,   3,  -1,  -1, },                // 2
   { -1, 101, -1,  -1,  -1,  -1,  -1, },                // 3
   { -1,  -1,  5,  -1,  -1,  -1,  -1, },                // 4
   { -1, 102,  5,  -1,  -1,  -1,  -1, },                // 5
   { -1,  -1,  7,  -1,  -1,  -1,  -1, },                // 6
   { -1,  -1,  7,  -1,   8,  -1,  -1, },                // 7
   { -1, 103, -1,  -1,  -1,  -1,  -1, },                // 8
};

// ---------- local function prototypes -------------------------------------
static int next (int state, int c);
```

```
//   ---------------------------------------------------------------------
//       function : parser
//       arguments : sbuf, command, index, operator, argument
//                   [S|I] [0-9]+ = [0-9]+
//                    |    |       |   |---> argument
//                    |    |       |-------> operator
//                    |    |---------------> index
//                    |------------------->  command
//       returns  : Returns the final state (>99) if a token was found,
//                  otherwise returns -1 to indicate error
//       synopsis : Checks the string for validy then (if valid) parses the
//                  string into recognized tokens
//   ---------------------------------------------------------------------
int    parse( char *sbuf,
              char *command,
              int  *index,
              char *operator,
              long *argument )
{
  int    state = 0;
  int    i = 0;
  char   *head, *tail;

state = next( state, sbuf[i++] );
  while( state>0 && state<99 )
   state = next( state, sbuf[i++] );
  if( state > 99 )
  {
    tail = sbuf;
    *command = *tail++;              // get the command
    head = tail;                     // and advance the head pointer
    i = *tail - '0';                 // find the operation character
    while( i>=0 && i<=9 )
     i = *(++tail) - '0';
    *operator = *tail;               // get the operation
    *index = (int)AsciiToLong( head ); // get the command index
    head = ++tail;                   // reset the head pointer
    *argument = AsciiToLong( head ); // get the argument
  } return state;
} // parser

//   ---------------------------------------------------------------------
//       function : next
//       arguments : state - the current DFA state
//                   c     - the lookahead character
//       returns  : The next state, or -1 if transition not defined
//       synopsis : This function is used to walk through the state tables
//                  for the command lexical recognizer.
//       notes    : Parts of this function need to be written in assembler
//                  because the TI C compiler doesn't handle references
```

```
//              to 'const' data correctly.
//
//              (1) 'col' needs to match the number of columns in the
//                  map[row][col] array declared above!
//
//   stack layout : The activation record looks like this
//
//                   |    xxx    |
//                   -------------
//                   |     c     | <- new FP - 4
//                   -------------
//                   |   state   | <- new FP - 3
//                   -------------
//       caller     |  ret addr |
//      -----------  -------------
//       callee     |  copy FP  |
//                   -------------
//                   |  copy SP  | <- new FP
//                   -------------
//                   |    col    | <- new FP + 1
//                   -------------
//                   |   next    | <- new FP + 2
//                   -------------
//                   |    xxx    | <- new SP
//
// ------------------------------------------------------------------- static int next( int state, int c )
{
  int col;

// col = c_map[ c ];
   asm( "   MAR    *, AR3   " );     // AR = 3
   asm( "   LAR    AR3, #1H " );     // AR3 = 1
   asm( "   MAR    *0+, AR2 " );     // AR3 = AR0 +1, i.e., AR3 => col
   asm( "   LAR    AR2, #-4H " );    // AR2 = -4
   asm( "   MAR    *0+      " );     // AR2 => c
   asm( "   LACC   *, 0, AR3 " );    // ACC = *AR2
   asm( "   ADD    #_c_map, 0" );    //
   asm( "   TBLR   *, AR2   " );     // col = #c_map + c // return map[ state ][ col ];
   asm( "   LAR    AR2, #-3H " );    // AR2 => -3
   asm( "   MAR    *0+      " );     // AR2 = AR2 + AR0, i.e., AR2 => state
   asm( "   LT     *        " );     // TREG <= *AR2
   asm( "   MPY    #7H      " );     // IMPORTANT - change for # of map
columns
   asm( "   PAC             " );     // ACC = state * col
   asm( "   CLRC   SXM      " );
   asm( "   ADD    #_map    " );
   asm( "   ADRK   #4H      " );
   asm( "   ADD    *, 0     " );
   asm( "   TBLR   *        " );     // *AR2 = &map + ( row * col ) + col
   asm( "   LACC   *, 0, AR1 " );    // ACC = *AR2
} // next
```

```
TASKS.C MODULE
// -------------------------------------------------------------------
//   program name : NCP.OUT
//   module name  : TASKS.C
//     copyrights : Copyright (c) 2000 by Superconductor Technologies
//
//       synopsis : All the task functions are here
//                    MeasMotorCurrent
//                    MeasTemps
//                    ADCMeas
//                    StateMachine
//                    SciInputReady
//                    SciOutputReady
//                    OperationMonitor
//                    SysDataOut
// ------------------------------------------------------------------- include   "globals.h"
include   "tasks.h"              // includes kernel.h
include   "C_Regs.h"             // 243 regs for C code // ----- debugging macros (undefine to turn off) ---------------------

//#define    DB_ECHO
//#define    DB_EMU

// ----- macro definitions ------------------------------------------- define    ADCIN00         0x0000        // T_MOT
define    ADCIN01         0x0002        // T_AMB
#define    ADCIN02         0x0004        // V_LNA
#define    ADCIN03         0x0006        // I_LNA
#define    ADCIN04         0x0008        // ImotBuf (handled in ISR-3)
#define    ADCIN05         0x000A        // V_IN
#define    ADCIN06         0x000C        // CTS1_WR
define    ADCIN07         0x000E        // CTS1_NR // --- IO (Port B) definitions --------------------------------------- define    IOPB0           0x01
define    IOPB1           0x02
#define    IOPB2           0x04
#define    IOPB3           0x08
#define    IOPB4           0x10
#define    IOPB5           0x20
#define    IOPB6           0x40
define    IOPB7           0x80 define    TDX_OK          IOPB1         // bit line that controls the RS232 amp
```

```
// --- SmStatusBitFlag bit field definitions -----------------------------
// Among other things, the SmStatusBitFlag keeps the state of the
// following IO hardware;
//
//     FAULT    led      PA3
//     READY    led      PA4
//     ALIVE    led      PA5
//     LNA_SD   bit      PD5
//
//     FAULT    relay    PD6
//     BYPASS   relay    PD7
//
// The IO bit is set or reset depending on the desired action required. Then
// in the 'OperationMonitor' task (which is called every 500mS) the bit
// fields are examined and the ports updated.
//
// bit position    action
// ------------    -----------------------------------------------------
//
//        0     0 = state machine is in automatic mode
//              1 = state machine is in maunal mode
//        1     0 = debug string is not being output
//              1 = debug string is being output
//        2        no currently used
//        3     0 = FAULT led off
//              1 = FAULT led on
//        4     0 = READY led off
//              1 = READY led on
//        5     0 = ALIVE led off
//              1 = ALIVE led on
//        6     0 = FAULT led toggle off
//              1 = FAULT led toggle on
//        7     0 = READY led toggle off
//              1 = READY led toggle on
//        8     0 = ALIVE led toggle off
//              1 = ALIVE led toggle on
//        9     0 = LNA off
//              1 = LNA on
//       10     0 = FAULT relay off
//              1 = FAULT relay on
//       11     0 = BYPASS relay off
//              1 = BYPASS relay on
//       12     0 = disable the Tcsn data filter
//              1 = enable the Tcsn data filter
//       13        no currently used
//       14        no currently used
//       15        no currently used
//
#define  SMBF_MODE           0x0001    // auto/manual mode
#define  SMBF_DEBUG          0x0002    // debug string
#define  SMBF_NOTUSED_1      0x0004
#define  SMBF_FAULT_LED      0x0008    // FAULT led, matches IO port
bit
```

```
#define    SMBF_READY_LED           0x0010      // READY led, matches IO port bit
#define    SMBF_ALIVE_LED           0x0020      // ALIVE led, matches IO port bit
#define    SMBF_FAULT_LED_TOGGLE    0x0040      // FAULT led toggle
#define    SMBF_READY_LED_TOGGLE    0x0080      // READY led toggle
#define    SMBF_ALIVE_LED_TOGGLE    0x0100      // ALIVE led toggle
#define    SMBF_LNA_CTRL            0x0200      // LNA control, matches IO >> 4
#define    SMBF_FAULT_RELAY         0x0400      // FAULT relay, matches IO >> 4
#define    SMBF_BYPASS_RELAY        0x0800      // BYPASS relay, matches IO >> 4
#define    SMBF_TCSN_FILTER         0x1000      // enables | disables the Tcsn median filter
#define    SMBF_NOTUSED_2           0x2000
#define    SMBF_NOTUSED_3           0x4000
#define    SMBF_NOTUSED_4           0x8000

//
// Definitions to handle the LED states. Turning on an led implies it's not
// toggling. Toggling the led implies that it is on. Turning off the led requires
// disabling the toggling. LED's are on PORT A
//
#define    SHIFT_TO_TOGGLE    3
#define    LED_MASK           (SMBF_FAULT_LED|SMBF_READY_LED|SMBF_ALIVE_LED)
#define    LED_ON( x )        SmStatusBitFlag |= (x); SmStatusBitFlag &= ~(x<<SHIFT_TO_TOGGLE)
#define    LED_OFF( x )       SmStatusBitFlag &= ~(x); SmStatusBitFlag &= ~(x<<SHIFT_TO_TOGGLE)
#define    LED_TOGGLE( x )    SmStatusBitFlag |= (x); SmStatusBitFlag |= (x<<SHIFT_TO_TOGGLE)

//
// Definitions to handle FAULT, BYPASS relays and LNA shutdown
// These states are mutually exclusive
//
#define    SHIFT_TO_RELAY    4
#define    RELAY_MASK        ((SMBF_LNA_CTRL|SMBF_FAULT_RELAY|SMBF_BYPASS_RELAY)>>SHIFT_TO_RELAY)
#define    LNA_ON            (SmStatusBitFlag |= SMBF_LNA_CTRL)
#define    LNA_OFF           (SmStatusBitFlag &= ~SMBF_LNA_CTRL)
#define    RELAY_ON( x )     (SmStatusBitFlag &= ~(x))
#define    RELAY_OFF( x )    (SmStatusBitFlag |= (x))
//#define   RELAY_ON( x )     (SmStatusBitFlag |= (x))
//#define   RELAY_OFF( x )    (SmStatusBitFlag &= ~(x))

// --- SmErrorBitFlag bit field definitions --------------------------------

// The SmErrorBitFlag keeps the state of any errors while the state machine
// is operating
//
// bit position    description
```

```
// ------------    ----------------------------------------------------------
//       0    indicates Trej is out of range
//       1    indicates Tamb is out of range
//       2    indicates Ilna is out of range
//       3    indicates Vin  is out of range
//       4    indicates Tcsw is out of range
//       5    indicates Tcsn is out of range
//       6    indicates that Tcsn no tracking TcSp
//       7    currently not used
//       8    currently not used
//       9    currently not used
//      10    currently not used
//      11    currently not used
//      12    currently not used
//      13    currently not used
//      14    currently not used
//      15    currently not used define    SM_ERROR_TREJ_RANGE    0x0001    // major fault
define    SM_ERROR_TAMB_RANGE    0x0002    // minor fault
#define    SM_ERROR_ILNA_RANGE    0x0004    // minor fault
#define    SM_ERROR_VIN_RANGE     0x0008    // major fault
#define    SM_ERROR_TCSW_RANGE    0x0010    // major fault
#define    SM_ERROR_TCSN_RANGE    0x0020    // major fault
#define    SM_ERROR_TCSP_RANGE    0x0040    //

//#define    SM_MINOR_FAULT         (SM_ERROR_TAMB_RANGE | \
//                                   SM_ERROR_ILNA_RANGE)
//#define    SM_MAJOR_FAULT         (SM_ERROR_TREJ_RANGE | \
//                                   SM_ERROR_VIN_RANGE  | \
//                                   SM_ERROR_TCSW_RANGE | \
//                                   SM_ERROR_TCSN_RANGE)

// --- state machine state definitions ---------------------------------- define    SM_INIT        0    // SM initialization state
define    SM_IDLE        1    // SM idle state
#define    SM_COOLDOWN    2    // SM cooldown state
#define    SM_CONTROL     3    // SM temp control state
#define    SM_POWERDOWN   4    // SM power down state
define    SM_FINAL       5    // SM final (error) state // --- digital filter definitions -------------------------------------- define    TCSN_DATA_SIZE  5    // circular array for Tcsn data

// ----- global variables ----------------------------------------------

UINT   NvAddress;                   // S12 sets variable, S13 read/write it
ULONG  RunTimeAcc;                  // run time accumulator, 2^32s = 136y
pSCI   SCI    = (pSCI) 0x7050;
pADC   ADC    = (pADC) 0x7032;
pDIO   DIO    = (pDIO) 0x7090;
```

```
pSPI    SPI     = (pSPI) 0x7040;

// ----- state machine variables ------------------------------------------
int     SmCurrentState;             // current state of the state machine
int     SmLastState;                // remember the last state we were in
int     SmCurrentPhase;             // current phase of the state machine
UINT    SmStatusBitFlag;            // bit flag to hold state machine status
UINT    SmErrorBitFlag;             // bit flag to hold state machine errors
UINT    LastSmErrorBitFlag;         // bit flag to hold previous errors // ----- motor current variables ------------------------------------------
long    ImOut;                      // RMS motor current estimate, U(16,16)
long    ImSp;                       // current setpoint, U(16,16)
long    ImEk0;                      // the following variables are used
long    ImEk1;                      // in the control loop routine
long    ImUk0;                      // 'ImServo' to close the motor
long    ImUk1;                      // current control loop.
long    ImSpCoolDown_m;
long    ImSpCoolDown_b;
long    lCdSp;
long    lPidSp;

// ----- temperature variables --------------------------------------------
int     Trej;                       // motor heat reject temperature
int     Tamb;                       // ambient temperature
int     Vlna;                       // LNA power supply output voltage
int     Ilna;                       // LNA power supply current draw
int     Vin;                        // motor driver input voltage
int     Tcsw;                       // Cold Stage, wide range temp sensor
int     Tcsn;                       // Cold Stage, narrow range temp sensor
int     TcsnData[ TCSN_DATA_SIZE ]; // data array to keep sample data
int     TcsnDataIndex;              // index into Tcsn data array // ----- temp control variables (used in the PID calculations) -----------
long    TcUk0;
long    TcUk1;
long    TcLastI;
int     TcLastTcsn;
int     TcLastD;
int     TcEk0;
int     TcEk1;

// ----- limit variables (read from EEPROM on reset) ----------------------
long    TcLimI;                     // integrator saturation limit
int     TcKp;                       // proportional gain
int     TcKi;                       // integrator gain
```

```
        int     TcKd;                           // derivative gain
        int     TcSp;                           // Tc setpoint
        int     TrejLoTemp;                     // Trej lower temperature limit
        int     TrejHiTemp;                     // Trej upper temperature limit
 5      int     TambLoTemp;                     // Tamb lower temperature limit
        int     TambHiTemp;                     // Tamb upper temperature limit
        int     IlnaLoCurrent;                  // Ilna lower current limit
        int     IlnaHiCurrent;                  // Ilna upper current limit
        int     VinLoVolts;                     // Vin lower voltage limit
10      int     VinHiVolts;                     // Vin upper voltage limit
        int     TcswLoTemp;                     // Tcsw lower temperature limit
        int     TcswHiTemp;                     // Tcsw upper temperature limit
        int     TcsnLoTemp;                     // Tcsn lower temperature limit
        int     TcsnHiTemp;                     // Tcsn upper temperature limit
15      long    ImLoLimit;                      // lower drive limit in the idle state
        long    ImHiLimit;                      // upper drive limit in all states // ----- local function prototypes ----------------------------------------
20      static int SetCommand (int index, char operator, long argument);
        static int InquireCommand (int index, char operator, long argument);
        static void MotorOn (BOOL arg);
        static long CoolDownSp (void);
        static long PidSp (void);
25      static void ImServo (void);
        static unsigned long iSqrt (unsigned long x);
        static void SystemDataOut (void);
        static void LoadRtConstants (void);
        static int MedianFilter (int data[]);
30      static void logEvent (void);

// ------------------------------------------------------------------------
        //       function : MeasMotorCurrent
35      //           task : MEASURE_MOTOR_CURRENT
        //       pends on : nothing
        //          posts : nothing
        //      arguments : pTCB - pointer to TCB for this task
        //        returns : nothing
40      //       synopsis : Runs every tick. Takes the 8 new values in the ImotBuf
        //                  array and calculates the average current
        // ------------------------------------------------------------------------ void MeasMotorCurrent( pTCB tcb )
45      {
          long          tmp;
          long          gMotAvg;
          long          gMotVar;
          unsigned      i;
50
          if( tcb->state == 0 )    // --- task in run state
            {
              // calculate the average
              gMotAvg = 0L;
55            for( i=0 ; i<=(BUF8-1) ; i++ )
```

```
      gMotAvg += ImotBuf[ i ];
      gMotAvg >>= 3;                    // divide by 8

// calculate the variance
      gMotVar = 0L;
      for( i=0 ; i<=(BUF8-1) ; i++ )
        {
          tmp = gMotAvg - ImotBuf[i];
          gMotVar += (tmp*tmp);
        }
      gMotVar >>= 3;                    // divide by 8

// and the standard deviation
      ImOut = iSqrt( gMotVar );
      ImServo();
    }
  else                          // --- initialization
    {
      tcb->state = 0;
      tcb->delay = 0;
      tcb->pends = 0;
      tcb->posts = 0;
    }
  } // MeasMotorCurrent // -------------------------------------------------------------------
//      function : MeasTemps
//          task : MEASURE_TEMPS
//      pends on : nothing
//         posts : nothing
//     arguments : pTCB - pointer to TCB for this task
//       returns : nothing
//      synopsis : Runs every tick to alternately measure ...
//                 CTS1_WR - ADCIN06, Tcsw
//                 CTS1_NR - ADCIN07, Tcsn
//                 this means that the sample time for these measurements
//                 2/60 = 1/30 sec.
// ------------------------------------------------------------------- void MeasTemps( pTCB tcb )
  {
    int    tmp, state;

tmp   = 0;
    state = tcb->state;

// we need to turn off the INT3 because we're going to use
    // the ADC. Otherwise we might disrupt the ImotBuf measurement
    asm( " SETC    INTM"    );      // disable interrupts
    asm( " LDP     #0"      );      // load data page 0
    asm( " LACL    0004h"   );      // get IMR into ACC
    asm( " AND     #0FFFBh" );      // mask INT3 in ACC
    asm( " SACL    0004h"   );      // and write back to IMR
    asm( " CLRC    INTM"    );      // re-enable interrupts
```

```
switch( state )
  {
   case 0 :                       // --- measure Tcsw
    {
      ADC->ADCTRL1 &= 0xFFF1;      // clear any previous ch
      ADC->ADCTRL1 |= ADCIN06;     // and select ch 6
      ADC->ADCTRL1 |= 0x0001;      // start the conversion
      while( !(ADC->ADCTRL2 & 0x0018) ); // spin waiting for data
      tmp = ADC->ADCFIFO1 >> 6;    // shift and save it
    }
    break;

case 1 :                       // --- measure Tcsn
    {
      ADC->ADCTRL1 &= 0xFFF1;      // clear any previous ch
      ADC->ADCTRL1 |= ADCIN07;     // and select ch 7
      ADC->ADCTRL1 |= 0x0001;      // start the conversion
      while( !(ADC->ADCTRL2 & 0x0018) ); // spin waiting for data
      tmp = ADC->ADCFIFO1 >> 6;    // shift and save it
    }
    break;

default :                      // --- initialize
    {
      tcb->state = 0;
      tcb->delay = 0;
      tcb->pends = 0;
      tcb->posts = 0;
    }
  } // switch( #1

// OK, we're done with the ADC so release INT3
  asm( " SETC    INTM"   );       // disable interrupts
  asm( " LDP     #0"     );       // load IMR data page
  asm( " LACL    0004h"  );       // get IMR into ACC
  asm( " OR      #0004h" );       // unmask INT3 in ACC
  asm( " SACL    0004h"  );       // and write back to IMR
  asm( " CLRC    INTM"   );       // re-enable interrupts // we've released the interrupt handler so we can continue
  // with our calculations and filtering ...

switch( state )
  {
   case  0 :
    {
      Tcsw = tmp;
    }
    break;
   case  1 :
    {
      if( ++TcsnDataIndex >= TCSN_DATA_SIZE )
        TcsnDataIndex = 0;
      TcsnData[ TcsnDataIndex ] = tmp;
```

```c
      if( SmStatusBitFlag & SMBF_TCSN_FILTER )
        Tcsn = MedianFilter( TcsnData );    // filter the temperature data
      else
        Tcsn = tmp;                         // use raw temperature data
      }
      break;
    default :
      break;
    } // switch( #2 )

tcb->state = (++state % 2);
  } // MeasTemps

// ----------------------------------------------------------------------
//
//       function : ADCMeas
//           task : ADC_MEASUREMENTS
//       pends on : nothing
//          posts : nothing
//      arguments : pTCB - pointer to TCB for this task
//        returns : nothing
//       synopsis : Measures each of the following once a second
//                      T_MOT   - ADCIN00, Trej
//                      T_AMB   - ADCIN01, Tamb
//                      V_LNA   - ADCIN02, Vlna
//                      I_LNA   - ADCIN03, Ilna
//                      V_IN    - ADCIN05, Vin
// ----------------------------------------------------------------------
//
void ADCMeas( pTCB tcb )
{
  int      tmp, state;

tmp   = 0;
  state = tcb->state;

// we need to turn off the INT3 because we're going to use
  // the ADC. Otherwise we might disrupt the ImotBuf measurement
  asm( " SETC    INTM"    );      // disable interrupts
  asm( " LDP     #0"      );      // load data page 0
  asm( " LACL    0004h"   );      // get IMR into ACC
  asm( " AND     #0FFFBh" );      // mask INT3 in ACC
  asm( " SACL    0004h"   );      // and write back to IMR
  asm( " CLRC    INTM"    );      // re-enable interrupts switch( state )
    {
    case 0 :                      // measure Trej - motor heat reject temperature
      {
        ADC->ADCTRL1 &= 0xFFF1;         // clear any previous ch
        ADC->ADCTRL1 |= ADCIN00;        // and select ch 0
        ADC->ADCTRL1 |= 0x0001;         // start the conversion
        while( !(ADC->ADCTRL2 & 0x0018) ); // spin waiting for data
        tmp = ADC->ADCFIFO1 >> 6;       // shift and store it
```

```
      }
      break;
    case  1 :                   // measure Tamb - ambient temperature
      {
      ADC->ADCTRL1 &= 0xFFF1;    // clear any previous ch
      ADC->ADCTRL1 |= ADCIN01;   // and select ch 1
      ADC->ADCTRL1 |= 0x0001;    // start the conversion
      while( !(ADC->ADCTRL2 & 0x0018) ); // spin waiting for data
      tmp = ADC->ADCFIFO1 >> 6;  // shift and store it
      }
      break;
    case  2 :                   // measure Vlna - LNA power supply output
voltage
      {
      ADC->ADCTRL1 &= 0xFFF1;    // clear any previous ch
      ADC->ADCTRL1 |= ADCIN02;   // and select ch 2
      ADC->ADCTRL1 |= 0x0001;    // start the conversion
      while( !(ADC->ADCTRL2 & 0x0018) ); // spin waiting for data
      tmp = ADC->ADCFIFO1 >> 6;  // shift and store it
      }
      break;
    case  3 :                   // measure Ilna - LNA power supply current
draw
      {
      ADC->ADCTRL1 &= 0xFFF1;    // clear any previous ch
      ADC->ADCTRL1 |= ADCIN03;   // and select ch 3
      ADC->ADCTRL1 |= 0x0001;    // start the conversion
      while( !(ADC->ADCTRL2 & 0x0018) ); // spin waiting for data
      tmp = ADC->ADCFIFO1 >> 6;  // shift and store it
      }
      break;
    case  4 :                   // measure Vin - motor driver input voltage
      {
      ADC->ADCTRL1 &= 0xFFF1;    // clear any previous ch
      ADC->ADCTRL1 |= ADCIN05;   // and select ch 5
      ADC->ADCTRL1 |= 0x0001;    // start the conversion
      while( !(ADC->ADCTRL2 & 0x0018) ); // spin waiting for data
      tmp = ADC->ADCFIFO1 >> 6;  // shift and store it
      }
      break;
    default :                   // --- initialization
      {
      tcb->state = 0;
      tcb->delay = 0;
      tcb->pends = 0;
      tcb->posts = 0;
      }
      break;
    } // switch( #1 asm( " SETC    INTM"   );    // disable interrupts
    asm( " LDP     #0"     );    // load IMR data page
    asm( " LACL    0004h"  );    // get IMR into ACC
    asm( " OR      #0004h" );    // unmask INT3 in ACC
    asm( " SACL    0004h"  );    // and write back to IMR
```

```
      asm( " CLRC    INTM" );           // re-enable interrupts

// after the interrupts are re-enabled we can do the signal processing
      switch( state )
      {
        case 0 :
        {
          Trej = tmp;
        }
        break;
        case 1 :
        {
          Tamb = tmp;
        }
        break;
        case 2 :
        {
          Vlna = tmp;
        }
        break;
        case 3 :
        {
          Ilna = tmp;
        }
        break;
        case 4 :
        {
          Vin = tmp;
        }
        break;
        default:
        break;
      } // switch( #2 tcb->state = (++state % 5);         // setup next state
      tcb->delay = CLOCKS_PER_SEC / 5;    // setup next capture time
    } // ADCMeas // -----------------------------------------------------------------------
    -
    //      function : StateMachine
    //          task : STATEMACHINE
    //      pends on : nothing
    //         posts : nothing
    //     arguments : pTCB - pointer to TCB for this task
    //       returns : nothing
    //      synopsis : Implements a nested state machine for "automatic" control
    //                 of the system.
    //
    //         Notes : Error Checking
    //                 Some errors are checked for on entry while other require
    //                 examination only in certain states. In all events the
    //                 system error flag is updated and the error is handled
    //                 in the state machine. The error is logged in the
    //                 OPERATION_INDICATOR task.
```

264/278

```
    //
    // ----------------------------------------------------------------
    -
    void StateMachine( pTCB tcb )
 5  {
      static clock_t   start_time, t1, t2 ,t3;

#if !defined( DB_EMU )
        // --- Do fatal error check ------------------------------------
10  -
      if( Trej < TrejHiTemp )                    // check the motor temp
        {                                        // inequality is reversed
    because
          SmErrorBitFlag |= SM_ERROR_TREJ_RANGE; // thermocouple has neg tempco
15        SmCurrentState = SM_POWERDOWN;
        } if( Vin < VinLoVolts || Vin > VinHiVolts )  // check the input voltage
        {
20        SmErrorBitFlag |= SM_ERROR_VIN_RANGE;
          SmCurrentState = SM_POWERDOWN;
        }
    #else
      Tamb = 614;                                // 300K
25    ImLoLimit = 1638400L;                      // 25.0
      Trej = 200;                                // 64C
      Tcsn = 0;
      TcSp = 512;
    #endif
30
        // --- Begin State Machine -------------------------------------
    -
      if( tcb->state == 0 )     // --- task in run state
        {
35        if( SmCurrentState != SmLastState )    // initialize the phase if we've
            SmCurrentPhase = 0;                  // changed state
          SmLastState = SmCurrentState;

switch( SmCurrentState )
40        {
            // ----------------------------------------------------------
    -
            // SM_INIT (0) : Initialize the state machine
            //               No error checking here, just a 15s delay to
45  facilitate
            //               stopping the state machint before it gets a chance to
            //               get started (programming, debug, etc.)
            // ----------------------------------------------------------
    -
50          case SM_INIT :
            {
              switch( SmCurrentPhase )
              {
                case 0 :   // --- start the timer, setup the IO
55              {
```

OC-82240.2                         78

```
              LED_ON( SMBF_FAULT_LED );        // FAULT LED
              LED_ON( SMBF_READY_LED );        // READY LED
              RELAY_ON( SMBF_FAULT_RELAY );    // FAULT RELAY
              RELAY_ON( SMBF_BYPASS_RELAY );   // BYPASS RELAY
              LNA_OFF;                         // LNA start_time = clock();
              t3 = CLOCKS_PER_SEC * 15;
              SmCurrentPhase = 1;
            }
            break;

case 1 :    // --- wait 15 seconds before beginning
            {
              t1 = clock();
              t2 = t1 - start_time;
              if( t2 > t3 )
                SmCurrentPhase = 2;
            }
            break;

case 2 :    // --- transition to SM_IDLE in automatic mode
            {
              if( !(SmStatusBitFlag & SMBF_MODE) )
                {
                  SmCurrentState = SM_IDLE;
                }
            }
            break;

default :   // --- Something went wrong so start over
            {
              SmCurrentPhase = 0;
            }
            break;
          } // SM_INIT : switch( SmCurrentPhase )
        }
        break;

// ----------------------------------------------------------------

// SM_IDLE (1) : Throttle power to ~40W either up or down. This state
        //               is used to check for bad temp sensors and will
        //               transition to SM_POWERDOWN if 70K < Tcsw > 300K.
        //               Should this condition be detected in higher states
        //               there will be a transition back here.
        // ---------------------------------------------------------------- case SM_IDLE :
        {
          switch( SmCurrentPhase )
          {
            case 0 :    // --- initialize the local's, timer, motor and IO
            {
              LED_ON( SMBF_FAULT_LED );        // FAULT LED
```

```
              LED_OFF( SMBF_READY_LED );         // READY LED
              RELAY_ON( SMBF_FAULT_RELAY );      // FAULT RELAY
              RELAY_ON( SMBF_BYPASS_RELAY );     // BYPASS RELAY
              LNA_OFF;                           // LNA start_time = clock();
              ImSp = 0L;
              MotorOn( TRUE );
              SmCurrentPhase = 1;
            }
            break;

case 1 :      // --- get to idle power
            {
              t1 = clock();              // calculate the elapsed time
              t2 = t1 - start_time;      // then ...
              if( t2 > CLOCKS_PER_SEC )  // every second until we reach the
              {                          // idle power
                start_time = t1;

if( ImSp < ImLoLimit )
                  ImSp += POWER_INCR;
                else if( ImSp >= ImLoLimit )
                  SmCurrentPhase = 2;
              }
            }
            break;

case 2 :      // --- wait here until we're within range (or fail)
            {
              if( Tcsw > TcswHiTemp && Tcsw < TcswLoTemp )   // Tcsw == OK
              {
                SmErrorBitFlag &= ~SM_ERROR_TCSW_RANGE;
                if( !(SmStatusBitFlag & SMBF_MODE) )
                  SmCurrentState = SM_COOLDOWN;
              }
            }
            break;

default :     // --- Something went wrong so start over
            {
              SmCurrentPhase = 0;
            }
            break;

} // SM_IDLE : switch( SmCurrentPhase )
      }
      break;

// ---------------------------------------------------------------

// SM_COOLDOWN (2) : Calculates the target cooldown setpoint end
      //                  temperature based on Tamb and Tcsw and applies
      //                  drive to tne motor based on the calculation. Once
      //                  Tcsn > TcSp control is passed to the PID
```

```
//                    (i.e., SM_CONTROL) state.
// --------------------------------------------------------------- case SM_COOLDOWN :
        {
          switch( SmCurrentPhase )
          {
            case 0 :    // --- start the timer, initialize the state variables
            {
              LED_TOGGLE( SMBF_FAULT_LED );       // FAULT LED
              LED_TOGGLE( SMBF_READY_LED );       // READY LED
              RELAY_ON( SMBF_FAULT_RELAY );       // FAULT RELAY
              RELAY_ON( SMBF_BYPASS_RELAY );      // BYPASS RELAY
              LNA_OFF;                            // LNA TcUk0 = 0;
              TcUk0 = 0;                          // initialize the PID
variables
              TcUk1 = 0;
              TcEk0 = 0;
              TcEk1 = 0;
              TcLastI = 0;
              start_time = 0L;                    // use start_time as a counter
in this state SmCurrentPhase = 1;
            }
            break;

case 1 :    // --- calculate the slope and intercept, once
            {
#if defined( TOWER_MOUNT_CODE )
    // slope and intercept based on 90W max drive
              // 48V cooler: Im = 0.20979*Tamb - 52.86047
              t1 = Tamb * 13748;                  // U(16, 0) * U( 0,16) = U(16,16)
              t1 -= 3464364;                      // U(16,16) + U(16,16) = U(16,16)
              //              : m = (Im-ImLoLimit)/735
              t2 = (long)t1 - ImLoLimit;          // U(16,16) - U(16,16)
              t2 >>= 16;                          // U(16, 0)

ImSpCoolDown_m = (long)t2 * 0x00000059;  // U(16, 0) * U( 0,16) =
U(16,16)
                                                  // but this will always be < 1
              //              : b = ImLoLimit - m * 230 (230 = 300K)
              t1 = ImSpCoolDown_m * 0x00E6;       // U( 0,16) * U(16, 0) = U(16,16)
              ImSpCoolDown_b = ImLoLimit - (long)t1;   // U(16,16) - U(16,16) =
U(16,16)

//        // slope and intercept based on 75W max drive
//              // 48V cooler: Im = 0.105*Tamb + 3.566
//              t1 = Tamb * 0x1AE1;               // U(16, 0) * U( 0,16) =
U(16,16)
//              t1 += 0x000390E5;                 // U(16,16) + U(16,16) =
U(16,16)
//              //              : m = (Im-ImLoLimit)/735
```

264/278

```
//         t2 = (long)t1 - ImLoLimit;      // U(16,16) - U(16,16)
//         t2 >>= 16;                      // U(16, 0)
//
//         ImSpCoolDown_m = (long)t2 * 0x00000059;  // U(16, 0) * U( 0,16)
// = U(16,16)
//                                         // but this will always be < 1
//         //          : b = ImLoLimit - m * 230 (230 = 300K)
//         t1 = ImSpCoolDown_m * 0x00E6;   // U( 0,16) * U(16, 0) =
U(16,16)
//         ImSpCoolDown_b = ImLoLimit - (long)t1;   // U(16,16) - U(16,16)
= U(16,16)
#else
//         // 12V cooler: Im = 0.307692 * Tamb + 1.461539
//         t1 = Tamb * 0x4EC4;             // U(16, 0) * U( 0,16) =
U(16,16)
//         t1 += 0x00017627;               // U(16,16) + U(16,16) =
U(16,16)
//         //          : m = (Im-44)/735
//         t2 = (long)t1 - 0x002C0000;     // U(16,16) - U(16,16)
//         t2 >>= 16;                      // U(16, 0)
//
//         ImSpCoolDown_m = (long)t2 * 0x00000059;  // U(16, 0) * U( 0,16)
= U(16,16)
//                                         // but this will always be < 1
//         //          : b = 44 - m * 230
//         t1 = ImSpCoolDown_m * 0x00E6;   // U( 0,16) * U(16, 0) =
U(16,16)
//         ImSpCoolDown_b = 0x002C0000 - (long)t1;  // U(16,16) - U916,16)
= U(16,16)
endif SmCurrentPhase = 2;
        }
        break;

case 2 :         // --- approach the cooldown current
        {
          lCdSp = CoolDownSp();           // calc the cooldown sp
          lPidSp = PidSp();               // and the pid setpoint
          if( (Tcsn < TcSp) && (ImSp <= lCdSp) )
            ImSp += 0x00000456;           // ~3App/min
          else
            SmCurrentPhase = 3;
        }
        break;

case 3 :         // --- maintain cooldown drive until 78K
        {
          lCdSp = CoolDownSp();           // calc the cooldown sp
          lPidSp = PidSp();               // and the pid setpoint if( (Tcsn < TcSp) && (lCdSp < lPidSp) )
            ImSp = lCdSp;                 // keep tracking the cool down sp
```

```
                  else                           // impiles Tcsn > TcSp,
coolder
                    SmCurrentPhase = 4;          // than we need to be
                  }                              // so shift control to the PID
code
                  break; // --- case 3 case 4 :    // --- transition to SM_CONTROL in automatic mode
                  {
                    ImSp = lPidSp;
                    if( !(SmStatusBitFlag & SMBF_MODE) )
                      SmCurrentState = SM_CONTROL;
                    else
                      SmCurrentPhase = 4;
                  }
                  break;

default :   // --- Something went wrong so start over
                  {
                    SmCurrentPhase = 0;
                  }
                  break;
                } // SM_COOLDOWN : switch( SmCurrentPhase )

// --- error checking ------------------------------------------
--
#if !defined( DB_EMU )
                if( Tcsw < TcswHiTemp || Tcsw > TcswLoTemp )    // Tcsw != OK
                {
                  SmErrorBitFlag |= SM_ERROR_TCSW_RANGE;
                  SmCurrentState = SM_IDLE;
                }
#endif
              }
              break;

// -------------------------------------------------------------
-
              // SM_CONTROL (3) : Applies drive to the motor based on TcSp and Tcsn
              //                  using closed-loop PID control
              // -------------------------------------------------------------
-
              case SM_CONTROL :
              {
                int     tmp;

switch( SmCurrentPhase )
                {
                  case 0 :    // --- start the timer, initialize IO
                  {
                    LED_OFF( SMBF_FAULT_LED );       // FAULT LED
                    LED_ON( SMBF_READY_LED );        // READY LED
                    RELAY_OFF( SMBF_FAULT_RELAY );   // FAULT RELAY
                    RELAY_OFF( SMBF_BYPASS_RELAY );  // BYPASS RELAY
                    LNA_ON;                          // LNA
```

```
    ImSp = PidSp();
    start_time = clock();
    t3 = CLOCKS_PER_SEC;
    t3 *= 300L;            // 5 min delay
    SmCurrentPhase = 1;
  }
  break;

case 1 :    // --- wait to turn on the Tscn filter
  {
    ImSp = PidSp();
    t1 = clock();
    t2 = t1 - start_time;
    if( t2 > t3 )
      SmCurrentPhase = 2;
  }
  break;

case 2 :    // --- engage the Tscn filter and run forever
  {
    ImSp = PidSp();
    SmStatusBitFlag |= SMBF_TCSN_FILTER;
    SmCurrentPhase = 3;
  }
  break;

case 3 :    // --- loop here forever
  {
    ImSp = PidSp();

// error checking for ABS(TcSp-Tcsn) > someLimit
    tmp = ( TcEk0 < 0 ) ? -TcEk0 : TcEk0;
    if( tmp > 200 )
      {
        RELAY_OFF( SMBF_BYPASS_RELAY );
        SmErrorBitFlag |= SM_ERROR_TCSP_RANGE;
      }
    else
      {
        RELAY_ON( SMBF_BYPASS_RELAY );
        SmErrorBitFlag &= ~SM_ERROR_TCSP_RANGE;
      }

SmCurrentPhase = 3;
  }
  break;

default :   // --- Something went wrong so start over
  {
    SmCurrentPhase = 0;
  }
  break;
} // SM_CONTROL : switch( SmCurrentPhase )
```

```
              // --- error checking ---------------------------------------
                --
#if !defined( DB_EMU )
        if( Tcsw < TcswHiTemp || Tcsw > TcswLoTemp )    // Tcsw != OK
          {
            SmErrorBitFlag |= SM_ERROR_TCSW_RANGE;
            SmCurrentState = SM_IDLE;
          } if( Ilna < IlnaLoCurrent || Ilna > IlnaHiCurrent ) // Ilna != OK
          {
            SmErrorBitFlag |= SM_ERROR_ILNA_RANGE;
          }
        else
          {
            SmErrorBitFlag &= ~SM_ERROR_ILNA_RANGE;
          }
#endif
          }
          break;

// ------------------------------------------------------------------
        -
        // SM_POWERDOWN (4) : At whatever drive level we're at, throttle down
        //                   to zero in preparation to enter the SM_FINAL
        //                   state
        // ------------------------------------------------------------------
        -
        case SM_POWERDOWN :
          {
            switch( SmCurrentPhase )
              {
                case 0 :    // --- start the timer
                  {
                    LED_ON( SMBF_FAULT_LED );           // FAULT LED
                    LED_OFF( SMBF_READY_LED );          // READY LED
                    RELAY_ON( SMBF_FAULT_RELAY );       // FAULT RELAY
                    RELAY_ON( SMBF_BYPASS_RELAY );      // BYPASS RELAY
                    LNA_OFF;                            // LNA start_time = clock();
                    t3 = CLOCKS_PER_SEC * 15;
                    SmCurrentPhase = 1;
                  }
                  break;

case 1 :      // --- ramp ImSp to 0.0
                  {
                    t1 = clock();                       // calculate the elapsed time
                    t2 = t1 - start_time;               // then ...
                    if( (t2/(CLOCKS_PER_SEC>>4)) > 0 )  // decrement the power setpoint
                      {                                 // until we reach 0
                        start_time = clock();
                        if( ImSp > POWER_INCR )
```

```
              ImSp -= POWER_INCR;
            else
              {
                ImSp = 0L;                    // we're done so drop to error
                MotorOn( FALSE );             // after turning the motor off
                SmCurrentPhase = 2;           // and wait
              }
          }
        }
        break;

case 2 :    // --- transition to SM_FINAL in any mode
        {
          SmCurrentState = SM_FINAL;
        }
        break;

default :   // --- Something went wrong so start over
        {
          SmCurrentPhase = 0;
        }
        break;
      } // SM_POWERDOWN : switch( SmCurrentPhase )
    }
    break;

// -----------------------------------------------------------------

// SM_FINAL (5) : This amounts to an off state, either by choice
    //                (i.e. entering manual mode) or because of a system
    //                error. System errors are checked here and if they
    //                (Trej, Vin) resolve themselves the system starts
    //                over.
    // ----------------------------------------------------------------- case SM_FINAL :
    {
      switch( SmCurrentPhase )
      {
        default :
        case 0 :    // --- shut down
        {
          LED_ON( SMBF_FAULT_LED );           // FAULT LED
          LED_OFF( SMBF_READY_LED );          // READY LED
          RELAY_ON( SMBF_FAULT_RELAY );       // FAULT RELAY
          RELAY_ON( SMBF_BYPASS_RELAY );      // BYPASS RELAY
          LNA_OFF;                            // LNA SmCurrentPhase = 1;
        }
        break;

// -----------------------------------------------------------------

// We might be here because of a hard error (Trej, Vin).
```

```
            //  If so we need to see if it fixed itself and resume normal
            //  operation.
            // ----------------------------------------------------------
            case 1 :
            {
              if( SmErrorBitFlag & SM_ERROR_TREJ_RANGE )    // motor temp was
              {                                             // too hot. check
                if( Trej > TrejLoTemp )                     // to see if we've
                {                                           // cooled enough
to
                  SmErrorBitFlag &= ~SM_ERROR_TREJ_RANGE;   // restart and do
                  SmCurrentState = SM_INIT;                 // so if we have.
                }
              } // Trej check if( SmErrorBitFlag & SM_ERROR_VIN_RANGE )
              {
                if( Vin > VinLoVolts && Vin < VinHiVolts )
                {
                  SmErrorBitFlag &= ~SM_ERROR_VIN_RANGE;
                  SmCurrentState = SM_INIT;
                }
              } // Vin check
              else
                SmCurrentPhase = 1;        // keep in this state
            }
            break;
          } // SM_FINAL : switch( SmCurrentPhase )
        }
        break;

// ----------------------------------------------------------------
        // If we get to the default state there is a problem so shut the
        // whole system down
        // ---------------------------------------------------------------- default :
        {
          SmCurrentState = SM_POWERDOWN;
          SmCurrentPhase = 0;
        }
        break;
      } // switch( SmCurrentState )
    }
    else                          // --- initialization
    {
      SmCurrentState = SM_INIT;         // start in the init state
      SmLastState    = SM_FINAL;        // synchronize phase first time through
      SmCurrentPhase = 0;               // redundant
      tcb->state     = 0;               // setup run state
      tcb->delay     = 0;               // no delay, run 60 times/sec
      tcb->pends     = 0;               // no pends
      tcb->posts     = 0;               // and no posts
```

```
      } // else-if( ...
    } // StateMachine
// -------------------------------------------------------------------------
//
//      function : SciInputReady
//          task : SCI_INPUT_READY
//       pends on : SCI_RX_DATA_READY
//         posts : nothing
//     arguments : pTCB - pointer to TCB for this task
//       returns : nothing
//       synopsis : If input is ready (i.e. a CR was found) copy the input
//                  to a temporary buffer and parse it to see what the user
//                  wants.
// -------------------------------------------------------------------------
void SciInputReady( pTCB tcb )
  {
  int         i, j, retval;
  char        sbuf[ BUF16 ];
  char        command, operator;
  int         index;
  long        argument;

if( tcb->state == 0 )    // --- task in run state
    {
    retval = 0;
    i = SciRxHead;
    j = 0;
    while( i != SciRxTail )            // copy the input data to the output
      {                                // buffer. This makes it easier to
      sbuf[ j++ ] = SciRxBuf[ i ];     // examine the data without having
      i = (++SciRxHead) % BUF16;       // to wory about wrap-around problems
      SciRxHead = i;
      } retval = parse( sbuf, &command, &index, &operator, &argument );
    if( retval != -1 )
      {
      if( command == 'S' )             // SET command
        retval = SetCommand( index, operator, argument );
      else if( command == 'I' )        // INQUIRE command
        retval = InquireCommand( index, operator, argument );
      else if( command == CR )         // possible carriage return
        retval = 0;
      else                             // otherwise,
        retval = -1;                   // indicates problem with command
      } if !defined( TOWER_MOUNT_CODE )
    if( retval == 0 )                  // indicates no data copied to
SciTxBuf
      BlockMove( &csACK, SciTxBuf );   // so just send ACK
      else if( retval == -1 )          // else if the scan or command failed
      BlockMove( &csNAK, SciTxBuf );   // send NAK
```

```
        #endif
                                        // else the command handler copied
        data into
                                        // SciTxBuf
 5        if( retval > 0 )
          {
            gPosts |= SCI_TX_DATA_READY;    // post the SCI_TX_DATA_READY event
          }
          gPosts &= ~SCI_RX_DATA_READY;    // clear SCI_RX_DATA_READY event
10

} // if( 'in run state'
        else                    // --- initialization
        {
15        SciRxHead  = 0;                // reset the head and tail pointers
          SciRxTail  = 0;                // for the SCI receive buffer
          tcb->state = 0;                // and increment the state variable
          tcb->delay = 0;                // no delay, we wait on events
          tcb->pends |= SCI_RX_DATA_READY;  // pend on data in the receive buffer
20        tcb->posts  = 0;
        }

} // SciInputReady

25 // -----------------------------------------------------------------------
   //      function : SciOutputReady
   //          task : SCI_OUTPUT_READY
   //      pends on : SCI_TX_DATA_READY
30 //         posts : nothing
   //     arguments : pTCB - pointer to TCB for this task
   //       returns : nothing
   //      synopsis : Expects a NULL terminated string in SciTxBuf. This task
   //                 will wait until the SCI_TX_DATA_READY event is signaled
35 //                 and then send the first character of the SciTxBuf[]
        letting
   //                 the interrupt handler do the rest.
   // -----------------------------------------------------------------------

40 void SciOutputReady( pTCB tcb )
   {
     unsigned    cnt, tmp;

if( tcb->state == 0 )   // --- task in run state
45     {
           // --- test to see if we're finished with the serial output
         if( gPosts & SCI_TX_BUSY )      // and if we are then reset
         {                                // the busy event flag
           if( (SciTxBuf[SciTxIndex] == 0) || (SciTxIndex > BUF32) )
50         {
             gPosts &= ~SCI_TX_BUSY;
   #if defined( TOWER_MOUNT_CODE )
             tmp = DIO->PBDATDIR;
             tmp &= ~TDX_OK;
55           DIO->PBDATDIR = tmp;
```

```
#endif
        }
      }
         // --- else we might have data ready to send so...
      else if( gPosts & SCI_TX_DATA_READY )
         {
#if defined( TOWER_MOUNT_CODE )
         // --- this code sets the RS232 amplifier enable and generates
         //     a 300 us delay before it begins the transmit process.
         tmp = DIO->PBDATDIR;
         tmp |= TDX_OK;
         DIO->PBDATDIR = tmp;
         for( cnt=0 ; cnt<600 ; cnt++ );   // ~300 us delay
         // --- this code appends 2 space characters to the tx string
         tmp = 0;
         while( SciTxBuf[tmp] != 0 )
           tmp++;
         SciTxBuf[ tmp++ ] = ' ';
         SciTxBuf[ tmp++ ] = ' ';
         SciTxBuf[ tmp   ] = 0;
         // --- this code prepends 2 space characters to the tx string
         SciTxIndex = tmp + 2;
         while( (signed)tmp >= 0 )
           SciTxBuf[ SciTxIndex-- ] = SciTxBuf[ tmp-- ];
         while( SciTxIndex >= 0 )
             SciTxBuf[ SciTxIndex-- ] = ' ';
#endif
         gPosts &= ~SCI_TX_DATA_READY;    // clear the event that started the xmit
         gPosts |= SCI_TX_BUSY;           // but set the busy event flag
         SciTxIndex = 0;                  // and start the serial xmit
         SCI->SCITXBUF = SciTxBuf[ SciTxIndex ];
         }
         // --- we must be confused, just reset all events and start over
      else
         {
         gPosts &= ~SCI_TX_DATA_READY;
         gPosts &= ~SCI_TX_BUSY;
         }
      }
    else                         // --- initialization
      {
      tcb->state   = 0;
      tcb->delay   = 0;
      tcb->pends  |= SCI_TX_DATA_READY;    // run when data ready to send
      tcb->pends  |= SCI_TX_BUSY;          // and run when sending data
      tcb->posts   = 0;
      }
    } // SciOutputReady
// -----------------------------------------------------------------------
//      function : OperationMonitor
//          task : OPERATION_INDICATOR
//      pends on : nothing
```

```
//         posts : nothing
//     arguments : pTCB - pointer to TCB for this task
//       returns : nothing
//      synopsis : Task is responsible for turning the LED's on or off
//                 bit accessable hardware (fault, bypass relays)
//                 incrementing the run time accumulator
// ------------------------------------------------------------------------
-
void OperationMonitor( pTCB tcb )
{
  int        state = tcb->state;
  unsigned   tmp;

// If there's a new error, log the event
  if( SmErrorBitFlag ^ LastSmErrorBitFlag )
    logEvent();
  LastSmErrorBitFlag = SmErrorBitFlag;

switch( state )
    {
      case 0 :                  // --- LED's on
        {
          tmp  = DIO->PADATDIR;
          tmp &= ~LED_MASK;
          tmp |= (SmStatusBitFlag & LED_MASK);
          DIO->PADATDIR = tmp;
        }
        break;

case 1 :                  // --- LED's off, increment run time
accumulator
        {
          tmp  = DIO->PADATDIR;
          tmp ^= ((SmStatusBitFlag>>SHIFT_TO_TOGGLE) & LED_MASK);
          DIO->PADATDIR = tmp;
          RunTimeAcc++;
        }
        break;

default :
        {
          tcb->state = 0;
          tcb->delay = 0;
          tcb->pends = 0;
          tcb->posts = 0;
          LED_TOGGLE( SMBF_ALIVE_LED );
          DIO->PADATDIR |= LED3;        // turn the LED on
        }
    } // switch( ...

// SPI test - debug only

// update the other IO ports
  tmp  = DIO->PDDATDIR;
  tmp &= ~RELAY_MASK;
```

```
        tmp |= ((SmStatusBitFlag>>SHIFT_TO_RELAY) & RELAY_MASK);
        DIO->PDDATDIR = tmp;

// setup for the next trip through
        tcb->delay = CLOCKS_PER_SEC >> 1;    // reset delay for task
        tcb->state = (++state % 2);
      } // OperationMonitor // ---------------------------------------------------------------------------
//       function : SysDataOut
//           task : SYSDATAOUT
//        pends on : SYS_DATA_OUT
//          posts : nothing
//      arguments : pTCB - pointer to TCB for this task
//        returns : nothing
//        synopsis :
// ---------------------------------------------------------------------------
void SysDataOut( pTCB tcb )
  { switch( tcb->state )
      {
      case 0 :   // --- not sending data out, is it requested
        {
          if( gPosts & SYS_DATA_OUT )       // check to see if we're tunring on
            {
              tcb->pends &= ~SYS_DATA_OUT;  // quit pending, run on delay
              gPosts     &= ~SYS_DATA_OUT;  // clear the event
              tcb->state = 1;               // run the data out state
              tcb->delay = CLOCKS_PER_SEC;  // initialize delay for task
            }
        }
        break;

case 1 :   // --- sending data out
        {
          if( gPosts & SYS_DATA_OUT )       // check to see if if we're turning off
            {
              tcb->pends |= SYS_DATA_OUT;   // go back to pending on the event
              gPosts     &= ~SYS_DATA_OUT;  // clear the event
              tcb->state = 0;
            }
          else                              // else send the data out the pipe
            {
              SystemDataOut();
              tcb->delay = CLOCKS_PER_SEC;  // reset delay for task
            }
        }
        break;

default :  // --- initialization or screw-up
        {
```

```
            tcb->state = 0;
            tcb->delay = 0;
            tcb->pends |= SYS_DATA_OUT;
            tcb->posts = 0;
          }
      } // switch( state )
    } // SysDataOut /******************************************************************************
 * Helper functions
 *   InitTasksModule  - Initializes all the module global variables
 *   SetCommand       - Handles SET commands from the user
 *   InquireCommand   - Handles INQUIRE commands from the user
 *   MotorOn          - enables the PWM outputs
 *   CoolDownSp       - calculates the cool down profile setpoint
 *   PidSp            - calculates the cool down profile setpoint
 *   ImServo          - servos the motor current
 *   iSqrt            - called by MeasMotorCurrent task

******************************************************************************/

// ---------------------------------------------------------------------------
//
//       function : InitTasksModule
//      arguments : none
//        returns : nothing
//       synopsis : Initializes all variables associated with this module
// --------------------------------------------------------------------------- void InitTasksModule( void )
  {
    // initialize global variables
    NvAddress         = 0;
    RunTimeAcc        = 0L;

// initialize state machine variables
    SmCurrentState    = 0;
    SmLastState       = 0;
    SmCurrentPhase    = 0;
    SmStatusBitFlag   = 0;
    SmErrorBitFlag    = 0;
    LastSmErrorBitFlag = 0;

// initialize motor current variables
    ImOut             = 0L;
    ImSp              = 0L;
    ImEk0             = 0L;
    ImEk1             = 0L;
    ImUk0             = 0L;
    ImUk1             = 0L;
    ImSpCoolDown_m    = 0L;
    ImSpCoolDown_b    = 0L;
    lCdSp             = 0L;
    lPidSp            = 0L;
```

```
    // initialize temperature variables
    Trej            = 0;
    Tamb            = 0;
    Vlna            = 0;
    Ilna            = 0;
    Vin             = 0;
    Tcsw            = 0;
    Tcsn            = 0;
    for( TcsnDataIndex=TCSN_DATA_SIZE ; TcsnDataIndex ;  )
     TcsnData[--TcsnDataIndex] = 0;

// initialize control variables
    TcUk0           = 0L;
    TcUk1           = 0L;
    TcLimI          = 0L;
    TcLastI         = 0L;
    TcKp            = 0;
    TcKi            = 0;
    TcKd            = 0;
    TcSp            = 0;
    TcEk0           = 0;
    TcEk1           = 0;
    TcLastTcsn      = 0;
    TcLastD         = 0;

// load the run-time constants
    LoadRtConstants();
} // InitTasksModule

// -----------------------------------------------------------------------
//
//      function : SetCommand
//      arguments :    index - S number (i.e. index = 23 for S23...)
//                     operator - either '=' or '?'
//                     argument - positive integer
//         returns : -1 on error, otherwise number of characters written to
//                   SciTxBuf
//        synopsis : Handles SET commands from the user (see SciInputReady)
//                   Returns the number of characters copied to the SciTxBuf
//                   but it's up to the caller to actually post the event.
// ----------------------------------------------------------------------- static int SetCommand( int index, char operator, long argument )
{
    int     tmp, retval;
    char    tbuf[ BUF16 ];

// initialize the local variables
    retval = 0;

// select the command
    switch( index )
    {
      case  0 :         // ----- (S0) set|inquire proportional gain ----------
```

```
    {
      if( operator == '=' )           // set operation
        TcKp = (int)( argument & 0x00007FFF );
      else                            // inquiry operation
        retval = LongToAscii( (long)TcKp, SciTxBuf );
    }
    break;

case  1 :         // ----- (S1) set|inquire integral gain --------------
    {
      if( operator == '=' )           // set operation
        TcKi = (int)( argument & 0x00007FFF );
      else                            // inquiry operation
        retval = LongToAscii( (long)TcKi, SciTxBuf );
    }
    break;

case  2 :         // ----- (S2) set|inquire integrator saturation limit
    {
      if( operator == '=' )           // set operation
        TcLimI = (long)( argument & 0x7FFFFFFF );
      else                            // inquiry operation
        retval = LongToAscii( (long)TcLimI, SciTxBuf );
    }
    break;

case  3 :         // ----- (S3) set|inquire derivative gain ------------
    {
      if( operator == '=' )           // set operation
        TcKd = (int)( argument & 0x00007FFF );
      else                            // inquiry operation
        retval = LongToAscii( (long)TcKd, SciTxBuf );
    }
    break;

case  4 :         // ----- (S4) set|inquire temperature setpoint -------
    {
      if( operator == '=' )           // set operation
        TcSp = (int)( argument & 0x000003FF );
      else                            // inquiry operation
        retval = LongToAscii( (long)TcSp, SciTxBuf );
    }
    break;

case  5 :         // ----- (S5) enable|disable sending debug string ----
    {
      if( operator == '=' )           // set operation
      {
        tmp = 0;
        if( argument == 1 )
```

```
            tmp = SMBF_DEBUG;
            if( tmp ^ (SmStatusBitFlag&SMBF_DEBUG) )
            {
              gPosts |= SYS_DATA_OUT;      // set the event, this toggles the
task
              SmStatusBitFlag ^= SMBF_DEBUG;   // update the state machine flag
            }
          }
          else                                 // inquiry operation
            retval = LongToAscii( (long)((SmStatusBitFlag & SMBF_DEBUG)?1:0),
SciTxBuf );
        }
        break;

case 6 :         // ----- (S6) enable|disable state transition mode ----
        {
          if( operator == '=' )              // set operation
          {
            if( argument == 0 )              // set to automatic mode
              SmStatusBitFlag &= ~SMBF_MODE;
            else
              SmStatusBitFlag |= SMBF_MODE;  // set to manual mode
          }
          else                               // inquiry operation
            retval = LongToAscii( (long)((SmStatusBitFlag & SMBF_MODE)?1:0),
SciTxBuf );
        }
        break;

case 7 :         // ----- (S7) set|inquire ImSp
        {
          if( operator == '=' )              // set operation
          {
            if( (SmStatusBitFlag & SMBF_MODE) )
              ImSp = ( argument & 0x000000FF ) << 16;
          }
          else                               // inquiry operation
            retval = LongToAscii( (long)ImSp, SciTxBuf );
        }
        break;

case 8 :         // ----- (S8) set|inquire SmCurrentState.SmCurrentPhase
        {
          if( operator == '=' )              // set operation
          {
            if( SmStatusBitFlag & SMBF_MODE )    // must be in manual mode
            {
              if( !((argument < 0) || (argument > 5)) )
                SmCurrentState = (int)argument;
            }
          }
          else                               // inquiry operation
          {
            retval = 0;
```

264/278

```
            SciTxBuf[ retval++ ] = SmCurrentState + '0';
            SciTxBuf[ retval++ ] = '.';
            SciTxBuf[ retval++ ] = SmCurrentPhase + '0';
            SciTxBuf[ retval++ ] = 0;
          }
        }
        break;

case  9 :          // ----- (S9) set|inquire LNA shut down bit
        {
          if( operator == '=' )          // set operation
          {
            if( argument == 0 )
              LNA_OFF;
            else
              LNA_ON;
          }
          else                           // inquiry operation
            retval = LongToAscii( (long)((SmStatusBitFlag & SMBF_LNA_CTRL)?1:0),
   SciTxBuf );
        }
        break;

case 10 :          // ----- (S10) set|inquire FAULT relay setting
        {
          if( operator == '=' )          // set operation
          {
            if( argument == 0 )
              RELAY_ON( SMBF_FAULT_RELAY );
            else
              RELAY_OFF( SMBF_FAULT_RELAY );
          }
          else                           // inquiry operation
            retval = LongToAscii( (long)((SmStatusBitFlag &
   SMBF_FAULT_RELAY)?1:0), SciTxBuf );
        }
        break;

case 11 :          // ----- (S11) set|inquire BYPASS relay setting
        {
          if( operator == '=' )          // set operation
          {
            if( argument == 0 )
              RELAY_ON( SMBF_BYPASS_RELAY );
            else
              RELAY_OFF( SMBF_BYPASS_RELAY );
          }
          else                           // inquiry operation
            retval = LongToAscii( (long)((SmStatusBitFlag &
   SMBF_BYPASS_RELAY)?1:0), SciTxBuf );
        }
        break;

case 12 :          // ----- (S12) set|inquire NvAddress
        {
```

OC-82240.2

```
        if( operator == '=' )              // set operation
        {
          NvAddress = (int)(argument & 0x000007FF);
        }
        else                                // inquiry operation
        {
          retval = LongToAscii( (long)NvAddress, SciTxBuf );
        }
      }
      break;

case 13 :         // ----- (S13) set|inquire EEPROM word
      {
        if( operator == '=' )              // set operation
        {
          EEPROM_Write( NvAddress, (argument & 0x000000FF), 1 );
        }
        else                                // inquiry operation
        {
          int i = 0;
          retval = LongToAscii( (long)NvAddress, SciTxBuf );
          SciTxBuf[ --retval ] = ':';
          tmp = (int)EEPROM_Read( NvAddress, 1 );
          LongToAscii( (long)tmp, tbuf );
          while( tbuf[i] != 0 )
            SciTxBuf[ ++retval ] = tbuf[ i++ ];
          SciTxBuf[ ++retval ] = 0;
          retval++;
        }
      }
      break;

default :         // unhandled command
        retval = -1;
      break;
    } // switch( index )

// terminate any data that was copied to SciTxBuf
    if( retval > 0 )
    {
      SciTxBuf[ --retval ] = '\r';         // overwrite the NULL
      SciTxBuf[ ++retval ] = 0;            // then add one back
    } return retval;
  } // SetCommand

// ---------------------------------------------------------------------
  //
  //       function : InquireCommand
  //       arguments :    index - I number (i.e. index = 23 for I23...)
  //                      operator - either '=' or '?'
  //                      argument - positive integer
  //         returns : -1 on error, otherwise number of characters written to
  //                   SciTxBuf
```

264/278

```
//      synopsis : Handles INQUIRE commands from the user (see
SciInputReady).
//                 Returns the number of characters copied to the SciTxBuf
//                 but it's up to the caller to actually post the event.
// ----------------------------------------------------------------------- static int InquireCommand( int index, char operator, long argument )
  {
    int     retval;
    char    tbuf[ BUF16 ];

// initialize the local variables
    retval = 0;

// select the command
    switch( index )
      {
        case  0 :          // ----- (I0) Trej, motor heat reject temperature ----
          {
            retval = LongToAscii( (long)Trej, SciTxBuf );
          }
          break;
        case  1 :          // ----- (I1) Tamb, ambient temperature --------------
          {
            retval = LongToAscii( (long)Tamb, SciTxBuf );
          }
          break;
        case  2 :          // ----- (I2) Vlna, LNA power supply voltage ---------
          {
            retval = LongToAscii( (long)Vlna, SciTxBuf );
          }
          break;
        case  3 :          // ----- (I3) Ilna, LNA power supply current ---------
          {
            retval = LongToAscii( (long)Ilna, SciTxBuf );
          }
          break;
        case  4 :          // ----- (I4) ImOut, RMS motor current estimate ------
          {
            retval = LongToAscii( (long)ImOut, SciTxBuf );
          }
          break;
        case  5 :          // ----- (I5) Vin, motor driver input voltage --------
          {
            retval = LongToAscii( (long)Vin, SciTxBuf );
          }
          break;
        case  6 :          // ----- (I6) Tcsw, wide range temp sensor -----------
```

```
      {
        retval = LongToAscii( (long)Tcsw, SciTxBuf );
      }
      break;
    case  7 :           // ----- (I7) Tcsn, narrow range temp sensor ---------
      {
        retval = LongToAscii( (long)Tcsn, SciTxBuf );
      }
      break;
    case  8 :           // ----- (I8) software version -----------------------
      {
        BlockMove( &csVersion, SciTxBuf );   // copy version string into SciTxBuf
        while( SciTxBuf[retval++] != CR );   // use retval to count to the CR
      }
      break;
    case  9 :           // ----- (I9) error querry ---------------------------
      {
        retval = LongToAscii( (long)SmErrorBitFlag, SciTxBuf );
      }
      break;
    case 10 :           // ----- (I10) display run time accumulator ----------
      {
        retval = LongToAscii( RunTimeAcc, SciTxBuf );
      }
      break;
    } // switch( index )

// terminate any data that was copied to SciTxBuf
    if( retval > 0 )
    {
      SciTxBuf[ --retval ] = '\r';       // overwrite the NULL
      SciTxBuf[ ++retval ] = 0;          // then add one back
    }
  return retval;

} // InquireCommand

// -------------------------------------------------------------------
//      function  : MotorOn
//      arguments : TRUE = ON
//                  FALSE = OFF
//      returns   : nothing
//      synopsis  : Enables the PWM output ports
// -------------------------------------------------------------------
static void MotorOn( BOOL arg )
  {
    sGain = 0;
```

```
      if( arg == FALSE )
        {
          asm( " LDP      #0E8h" );
          asm( " SPLK     #000Fh, 07413h" );    // CMP1 forced hi , CMP2 forced hi
        }
      else
        {
          asm( " LDP      #0E8h" );
          asm( " SPLK     #0009h, 07413h" );    // CMP1 act lo, CMP2 act hi
        }
    } // MotorOn // ---------------------------------------------------------------------
    //      function : CoolDown
    //      arguments : none
    //        returns : Calculated ImotBuf setpoint in U(16,16)
    //        synopsis : Calculated ImotBuf setpoint based on Tcsw and Tamb
    // ---------------------------------------------------------------------
    static long CoolDownSp( void )
      {
        long result = ImSpCoolDown_m * Tcsw + ImSpCoolDown_b;
        long t1 = (long)( MAX_IMOT << 16 );
        long delta;

// check to see what Trej is and compensate for it (rem Trej xfer is inv)
        if( Trej < TrejLoTemp )
          {
            delta = TrejLoTemp - Trej;        // 16 bit number
            delta *= 0x00010000;              // now 32 bit number
            delta &= 0x7FFFFFFF;              // make sure it pos & < 128.0
            result -= delta;
          }

// bracket the allowable limits
        if( result >= ImLoLimit && result <= t1 )
          return result;
        else if( result > t1 )
          return t1;
        else
          return ImLoLimit;

//    return (result>ImLoLimit) ? result : ImLoLimit;
      } // CoolDown

// ---------------------------------------------------------------------
    //      function : PidSP
    //      arguments : none
    //        returns : Calculated ImotBuf setpoint in U(16,16)
    //        synopsis : Calculated ImotBuf setpoint based on Tcsn and ImSp
    // ---------------------------------------------------------------------
    static long PidSp( void )
```

```
    {
    long        pt, it, dt;
    long        tl;

5   TcEk0 = TcSp - Tcsn;           // calc the error

// proportional term, A(15,0)*A(15,0) = A(31,0)
    pt = (long)( TcKp * TcEk0 );

10      // integral term, A(15,0)*A(15,0) = A(31,0)
    it = (long)( TcKi * (( TcEk0 + TcEk1 ) >> 1 ) ) + TcLastI;
    if( it > TcLimI )              // limit windup to +TcLimI on the
    upside
        it = TcLimI;
15  else if( it < -TcLimI )        // and -TcLimI on the downside
        it = -TcLimI;
    TcLastI = it;                  // 'it' is bounded
    TcEk1 = TcEk0;

20      // differentiator term, A(15,0)*A(15,0) = A(31,0)
    dt = (long)((TcLastD - TcKd * (Tcsn - TcLastTcsn)) >> 1 );
    TcLastD = dt;
    TcLastTcsn = Tcsn;

25      // do the control
    TcUk0 = pt + it + dt;
    TcUk0 <<= 7;

tl = (long)( MAX_IMOT << 16 );
30  if( TcUk0 < MIN_IMOT )         // do the error checking
        TcUk0 = 0;
    if( TcUk0 > tl )               // ~30App current
        TcUk0 = tl;

35  return TcUk0;
    } // PidSp

// -----------------------------------------------------------------
    -
40  //      function  : ImServo
    //      arguments : none
    //      returns   : nothing
    //      synopsis  : Routine responsible to 'close-the-loop' around the motor
    //                  current setpoint and response.
45  //      notes     : 0x000032E4 = 0.1988
    //                  0x000001EB = 0.007503
    //                  The compensator transfer function into the motor drive:
    //                  u[k] = 0.1988*e[k] - 0.007503*e[k-1] + u[k-1]
    // -----------------------------------------------------------------
50  -
    static void ImServo( void )
    {
      ImEk0 = ImSp - ImOut;
      ImEk0 /= 256;
55
```

```
    ImUk0 = 0x000032E4 * ImEk0 - 0x000001EB * ImEk1;
    ImUk0 >>= 16;
    ImUk0 += ImUk1;

if( ImUk0 < 0x00000000 )
      ImUk0 = ImUk1;
    else if( ImUk0 > 0x00007FFF )
      ImUk0 = ImUk1;

ImUk1 = ImUk0;
    ImEk1 = ImEk0;

sGain = ImUk0;
  } // ImServo

// -----------------------------------------------------------------------
//      function : iSqrt - integer square root algorithm
//      arguments : x - number to take the square root of
//      returns : square root of x
//      synopsis : The algorithm is setup to return a 32-bit number in
U(16,16)
//                 format.
// ----------------------------------------------------------------------- static unsigned long iSqrt( unsigned long x )
  {
    int             i;
    unsigned long accumulator, trial, remainder;

accumulator = 0l;
    trial = 0l;
    remainder = 0l;

for( i=0 ; i<32 ; i++ )
      {
        remainder <<= 2;
        remainder = remainder + (x >> 30);
        x <<= 2;
        accumulator <<= 1;
        trial = (accumulator << 1) + 1;

if( remainder >= trial )
          {
            remainder -= trial;
            accumulator++;
          } // if( remainder...
      } // for( i=0 ;...

return accumulator;
  } // iSqrt

// -----------------------------------------------------------------------
//      function : SystemDataOut
```

```
//      arguments : none
//        returns : nothing
//       synopsis : Outputs the debug info string:
//                  state.phase,Tcsw,Tcsn,ImSp,ImOut
// ----------------------------------------------------------------------- static void SystemDataOut( void )
  {
    int     i, j;
    char    tbuf[ 16 ];

j = 0;
    SciTxBuf[ j++ ] = SmCurrentState + '0';
    SciTxBuf[ j++ ] = '.';
    SciTxBuf[ j++ ] = SmCurrentPhase + '0';
    SciTxBuf[ j++ ] = ',';

// add Tcsw
    LongToAscii( (long)Tcsw, tbuf );
    i = 0;
    while( tbuf[i] != 0 )
      SciTxBuf[ j++ ] = tbuf[ i++ ];
    SciTxBuf[ j++ ] = ',';

// add Tcsn
    LongToAscii( (long)Tcsn, tbuf );
    i = 0;
    while( tbuf[i] != 0 )
      SciTxBuf[ j++ ] = tbuf[ i++ ];
    SciTxBuf[ j++ ] = ',';

// add ImSp, integer part
    LongToAscii( (long)(ImSp>>16), tbuf );
    i = 0;
    while( tbuf[i] != 0 )
      SciTxBuf[ j++ ] = tbuf[ i++ ];
    SciTxBuf[ j++ ] = ',';

// add ImOut, integer part
    LongToAscii( (long)(ImOut>>16), tbuf );
    i = 0;
    while( tbuf[i] != 0 )
      SciTxBuf[ j++ ] = tbuf[ i++ ];

// // -----------------------------------------------------------------------
// // test code only!
// // -----------------------------------------------------------------------
//  SciTxBuf[ j++ ] = 'O';
//  SciTxBuf[ j++ ] = 'K';
// // -----------------------------------------------------------------------
// // test code only!
// // -----------------------------------------------------------------------

SciTxBuf[ j++ ] = '\r';
    SciTxBuf[ j++ ] = 0;
```

```
  gPosts |= SCI_TX_DATA_READY;
} // SystemDataOut

// -----------------------------------------------------------------------
//
//      function : LoadRtConstants
//      arguments : none
//      returns : nothing
//      synopsis : Loads all runtime constants from EEPROM (NV memory)
//                 IMPORTANT - ALL ERROR CHACKING HAS BEEN REMOVED!
// ----------------------------------------------------------------------- static void LoadRtConstants( void )
{
#if !defined( DB_ECHO )
    TcLimI       =       EEPROM_Read( NVADDR_KIL, 4 );
    TcKp         = (int) EEPROM_Read( NVADDR_KP, 2 );
    TcKi         = (int) EEPROM_Read( NVADDR_KI, 2 );
    TcKd         = (int) EEPROM_Read( NVADDR_KD, 2 );
    TcSp         = (int) EEPROM_Read( NVADDR_TSP, 2 );
    TrejLoTemp   = (int) EEPROM_Read( NVADDR_TREJ_LO, 2 );
    TrejHiTemp   = (int) EEPROM_Read( NVADDR_TREJ_HI, 2 );
    TambLoTemp   = (int) EEPROM_Read( NVADDR_TAMB_LO, 2 );
    TambHiTemp   = (int) EEPROM_Read( NVADDR_TAMB_HI, 2 );
    IlnaLoCurrent = (int) EEPROM_Read( NVADDR_ILNA_LO, 2 );
    IlnaHiCurrent = (int) EEPROM_Read( NVADDR_ILNA_HI, 2 );
    VinLoVolts   = (int) EEPROM_Read( NVADDR_VIN_LO, 2 );
    VinHiVolts   = (int) EEPROM_Read( NVADDR_VIN_HI, 2 );
    TcswLoTemp   = (int) EEPROM_Read( NVADDR_TCSW_LO, 2 );
    TcswHiTemp   = (int) EEPROM_Read( NVADDR_TCSW_HI, 2 );
    TcsnLoTemp   = (int) EEPROM_Read( NVADDR_TCSN_LO, 2 );
    TcsnHiTemp   = (int) EEPROM_Read( NVADDR_TCSN_HI, 2 );
    ImLoLimit    =       EEPROM_Read( NVADDR_IM_LO, 4 );
//  ImHiLimit    =       EEPROM_Read( NVADDR_IM_HI, 4 );
#else
    TcLimI       =       EEPROM_Read( NVADDR_KIL, 4 );        echo( (long)TcLimI );
    TcKp         = (int) EEPROM_Read( NVADDR_KP, 2 );         echo( (long)TcKp );
    TcKi         = (int) EEPROM_Read( NVADDR_KI, 2 );         echo( (long)TcKi );
    TcKd         = (int) EEPROM_Read( NVADDR_KD, 2 );         echo( (long)TcKd );
    TcSp         = (int) EEPROM_Read( NVADDR_TSP, 2 );        echo( (long)TcSp );
    TrejLoTemp   = (int) EEPROM_Read( NVADDR_TREJ_LO, 2 );    echo( (long)TrejLoTemp );
    TrejHiTemp   = (int) EEPROM_Read( NVADDR_TREJ_HI, 2 );    echo( (long)TrejHiTemp );
    TambLoTemp   = (int) EEPROM_Read( NVADDR_TAMB_LO, 2 );    echo( (long)TambLoTemp );
    TambHiTemp   = (int) EEPROM_Read( NVADDR_TAMB_HI, 2 );    echo( (long)TambHiTemp );
    IlnaLoCurrent = (int) EEPROM_Read( NVADDR_ILNA_LO, 2 );   echo( (long)IlnaLoCurrent );
```

```
    IlnaHiCurrent  = (int)EEPROM_Read( NVADDR_ILNA_HI, 2 );   echo(
(long)IlnaHiCurrent );
    VinLoVolts     = (int)EEPROM_Read( NVADDR_VIN_LO, 2 );    echo(
(long)VinLoVolts );
    VinHiVolts     = (int)EEPROM_Read( NVADDR_VIN_HI, 2 );    echo(
(long)VinHiVolts );
    TcswLoTemp     = (int)EEPROM_Read( NVADDR_TCSW_LO, 2 );   echo(
(long)TcswLoTemp );
    TcswHiTemp     = (int)EEPROM_Read( NVADDR_TCSW_HI, 2 );   echo(
(long)TcswHiTemp );
    TcsnLoTemp     = (int)EEPROM_Read( NVADDR_TCSN_LO, 2 );   echo(
(long)TcsnLoTemp );
    TcsnHiTemp     = (int)EEPROM_Read( NVADDR_TCSN_HI, 2 );   echo(
(long)TcsnHiTemp );
    ImLoLimit      =      EEPROM_Read( NVADDR_IM_LO, 4 );     echo(
(long)ImLoLimit );
//  ImHiLimit      =      EEPROM_Read( NVADDR_IM_HI, 4 );     echo(
(long)ImHiLimit );
#endif
  }

// ---------------------------------------------------------------------------
//      function : MedianFilter
//      arguments : data array to filter
//        returns : the median value from a sorted, odd length array
//       synopsis : Implements a non-linear median filter by sorting the
//                  argument array (using a bubble sort) and returning
//                  the median array member. The array should be odd length.
// --------------------------------------------------------------------------- static int MedianFilter( int data[] )
  {
  int  exchange, tmp, pass, index;

exchange = 1;
  for( pass=0 ; pass<TCSN_DATA_SIZE && exchange ; pass++ )
    {
    exchange = 0;
    for( index=0 ; index<(TCSN_DATA_SIZE-1-pass) ; index++ )
      {
      if( *(data+index) < *(data+index+1) )
        {
        exchange = 1;
        tmp = *(data+index);
        *(data+index) = *(data+index+1);
        *(data+index+1) = tmp;
        }
      }
    } return data[ TCSN_DATA_SIZE >> 1 ];
  }
```

```
//  -------------------------------------------------------------------------
//      function : logEvent
//      arguments : none
//       returns : nothing
//      synopsis : When an event (fault) is detected it is written to the
//                 EEPROM for later interrogation.
//  ------------------------------------------------------------------------- static void logEvent( void )
  {
  } if defined( DB_ECHO )
//  -------------------------------------------------------------------------
//      function : echo
//      arguments : arg - long
//       returns : nothing
//      synopsis : used to echo long arguments to the terminal before the
//                 state machine starts.
//  ------------------------------------------------------------------------- static void echo( long arg )
  {
  LongToAscii( arg, SciTxBuf );
  SciTxIndex = 0;
  while( SciTxBuf[SciTxIndex] != 0 )
    SciTxIndex++;
  SciTxBuf[SciTxIndex++] = '\r';
  SciTxBuf[SciTxIndex] = 0;
  myputs();
  }

//  -------------------------------------------------------------------------
//      function : myputs
//      arguments : none
//       returns : nothing
//      synopsis : Displays the contents of the SciTxBuf
//  ------------------------------------------------------------------------- static void myputs( void )
  {
  SciTxIndex = 0;
  SCI->SCITXBUF = SciTxBuf[ SciTxIndex ];
  while( SciTxBuf[SciTxIndex] != 0 );
  } // SignOn
endif //  -------------------------------------------------------------------------
//      function : SomeTask
//         task :
//      pends on :
```

```
//       posts :
//   arguments : pTCB - pointer to TCB for this task
//     returns : nothing
//    synopsis :
// -----------------------------------------------------------------------

//void SomeTask( pTCB tcb )
// {
//   if( tcb->state == 0 )    // --- task in run state
//   {
//   }
//   else                     // --- initialization
//   {
//     tcb->state = 0;
//     tcb->delay = 0;
//     tcb->pends = 0;
//     tcb->posts = 0;
//   }
// } // SomeTask
//
//   if( Tamb < TambLoTemp || Tamb > TambHiTemp )
//     SmErrorBitFlag |= SM_ERROR_TAMB_RANGE; // ambient temperature out-of-range
//   else                                      // are soft and only require a
//     SmErrorBitFlag &= ~SM_ERROR_TAMB_RANGE; // flashing RED led (see
//   if( SmErrorBitFlag & SM_MINOR_FAULT )
//   {
//     LED_TOGGLE( SMBF_FAULT_LED );
//   }
//   if( SmErrorBitFlag & SM_MAJOR_FAULT )
//   {
//     LED_ON( SMBF_FAULT_LED );
//   }

// -----------------------------------------------------------------------
//    function :
//   arguments :
//     returns :
//    synopsis :
// -----------------------------------------------------------------------
```

What is claimed is:

1. A temperature and drive controller for use with a Stirling cycle cryocooler, the temperature and drive controller comprising:
   a cryocooler drive control loop for controlling the cryocooler drive in response to a measured cryocooler driving current and a cryocooler driving current set point;
   a temperature control loop generating said cryocooler driving current set point in response to either a cooldown profile algorithm or a comparison between a measured temperature and a set point temperature stored in DSP memory;
   wherein the cryocooler drive control loop and the temperature control loop are implemented using a digital signal processor.

2. A temperature and drive controller according to claim 1, wherein the cooldown profile is calculated based one or more of the following parameters, heat-exchange temperature, cold finger temperature, ambient temperature, and motor back-EMF.

3. A temperature and drive controller according to claim 1, wherein the cryocooler driving current is produced by an H-bridge circuit external to the digital signal processor.

4. A temperature and drive controller according to claim 1, wherein the measured temperature is measured by a micro-enclosure temperature sensor.

5. A temperature and drive controller according to claim 1, wherein the measured temperature is measured by a cold finger temperature sensor.

6. A temperature and drive controller according to claim 1, wherein the measured temperature is measured by a cold stage temperature sensor.

7. A temperature and drive controller according to claim 1, wherein the measured temperature is measured by a heat sink temperature sensor.

8. A temperature and drive controller according to claim 1, wherein the comparison is made between at least two measured temperatures.

9. A HTSC thin film filter system for use with a Stirling cycle cryocooler having a temperature and drive controller, said system comprising:
   a Stirling cycle cryocooler having a cold finger;
   a heat-sink including a plurality HTSC thin film filter substrates mounted thereon in micro-enclosures, the cold finger of the Stirling cycle cryocooler mating with the heat-sink;
   at least one micro-enclosure temperature sensor;
   a temperature and drive controller further comprising:
      a cryocooler drive control loop for controlling the cryocooler drive in response to a measured cryocooler driving current and a cryocooler driving current set point;
      a temperature control loop generating said cryocooler driving current set point in response to either a cooldown profile algorithm or a comparison between a measured temperature from the micro-enclosure temperature sensor and a set point temperature stored in DSP memory;
      wherein the cryocooler drive control loop and the temperature control loop are implemented using a digital signal processor.

10. A method of controlling the temperature of a cryocooler cold finger that is used to regulate the temperature of a HTSC filter system cold stage, the method comprising the steps of:
   measuring the temperature from at least one temperature sensor;
   inputting a signal corresponding to the measured temperature of the at least one temperature sensor to a temperature controller;
   comparing the signal corresponding to the temperature of the at least one temperature sensor to a digital value stored in memory corresponding to a set point temperature;
   outputting a digital value corresponding to a set point cryocooler driving current to a cryocooler drive controller based on said comparison;
   measuring the cryocooler driving current;
   inputting a signal corresponding to the cryocooler driving current to said cryocooler drive controller;
   comparing the signal corresponding to the cryocooler driving current with said digital value corresponding to the set point cryocooler driving current; and
   outputting a cryocooler driving current to a cryocooler based on the comparison between the cryocooler driving current with said digital value corresponding to the set point cryocooler driving current.

11. A method according to claim 10 further comprising the step of determining whether the signal corresponding to the measured temperature of the at least one temperature sensor indicates an operating state or a cooldown state.

12. A temperature and drive controller for use with a Stirling cycle cryocooler, the temperature and drive controller comprising:
   a cryocooler drive control loop for controlling the cryocooler drive in response to a measured cryocooler driving current and a cryocooler driving current set point;
   a temperature control loop generating said cryocooler driving current set point in response to a cooldown profile algorithm stored in DSP memory;
   wherein the cryocooler drive control loop and the temperature control loop are implemented using a digital signal processor.

13. A temperature and drive controller for use with a Stirling cycle cryocooler, the temperature and drive controller comprising:
   a cryocooler drive control loop for controlling the cryocooler drive in response to a measured cryocooler driving current and a cryocooler driving current set point;
   a temperature control loop generating said cryocooler driving current set point in response to a comparison between a measured temperature and a set point temperature stored in DSP memory;
   wherein the cryocooler drive control loop and the temperature control loop are implemented using a digital signal processor.

* * * * *